US008332740B2

(12) United States Patent
Graham

(10) Patent No.: US 8,332,740 B2
(45) Date of Patent: Dec. 11, 2012

(54) SYSTEMS AND METHOD FOR MANAGEMENT OF INTANGIBLE ASSETS

(76) Inventor: John D. Graham, New York, NY (US)

(*) Notice: Subject to any disclaimer, the term of this patent is extended or adjusted under 35 U.S.C. 154(b) by 281 days.

(21) Appl. No.: 12/632,303

(22) Filed: Dec. 7, 2009

(65) Prior Publication Data

US 2010/0153282 A1    Jun. 17, 2010

Related U.S. Application Data

(63) Continuation-in-part of application No. 12/221,334, filed on Aug. 1, 2008, which is a continuation of application No. 09/766,067, filed on Jan. 19, 2001, now abandoned.

(60) Provisional application No. 60/176,860, filed on Jan. 19, 2000, provisional application No. 61/201,128, filed on Dec. 5, 2008.

(51) Int. Cl.
*G06F 17/00* (2006.01)
(52) U.S. Cl. .......................... 715/200; 715/255
(58) Field of Classification Search ................. 715/200, 715/209, 255
See application file for complete search history.

(56) References Cited

U.S. PATENT DOCUMENTS

| | | | |
|---|---|---|---|
| 5,347,477 A | 9/1994 | Lee | |
| 5,592,607 A | 1/1997 | Weber et al. | |
| 5,692,073 A | 11/1997 | Cass | |
| 5,713,793 A | 2/1998 | Holte | |
| 5,748,738 A | 5/1998 | Bisbee et al. | |
| 5,752,244 A * | 5/1998 | Rose et al. | 1/1 |
| 5,999,907 A | 12/1999 | Donner | |
| 6,314,425 B1 | 11/2001 | Serbinis et al. | |
| 6,321,212 B1 | 11/2001 | Lange | |
| 6,418,457 B1 | 7/2002 | Schmidt et al. | |
| 6,665,656 B1 | 12/2003 | Carter | |
| 6,671,818 B1 * | 12/2003 | Mikurak | 714/4.21 |
| 6,694,315 B1 | 2/2004 | Grow | |
| 6,868,402 B1 | 3/2005 | Hirota et al. | |
| 6,947,959 B1 * | 9/2005 | Gill | 715/202 |

(Continued)

FOREIGN PATENT DOCUMENTS

GB    2337613 A    11/1999

(Continued)

OTHER PUBLICATIONS http://web,archive,org/web/19991115094516/http://wew.techex. com, archived on Nov. 15, 1908 at www.archive.org.

(Continued)

*Primary Examiner* — Stephen Hong
(74) *Attorney, Agent, or Firm* — IM IP Law PLLC; C. Andrew Im

(57) ABSTRACT

System and method for storing, managing, disseminating and sharing intellectual property asset information among users over a communications network. The system comprises a processor based server, a client processor based device, and a centralized database. The server processes each intellectual property information received from the client device through a hash function to provide a message digest, thereby providing a digital fingerprint and an attestation trail for each intellectual property information. The server aggregates all message digests to provide a system level message digest, thereby providing an attestation trail for the centralized database. The server transmits the system level message digest to a third party for storage or publication to prevent tampering and to maintain integrity of the centralized database.

20 Claims, 37 Drawing Sheets

U.S. PATENT DOCUMENTS

| | | | |
|---|---|---|---|
| 6,961,687 B1 * | 11/2005 | Myers et al. | 703/6 |
| 7,124,101 B1 * | 10/2006 | Mikurak | 705/35 |
| 7,127,405 B1 | 10/2006 | Frank et al. | |
| 7,603,357 B1 * | 10/2009 | Gourdol et al. | 1/1 |
| 7,624,435 B1 * | 11/2009 | Huang | 726/12 |
| 7,680,719 B1 * | 3/2010 | Brady et al. | 705/36 R |
| 7,689,493 B1 * | 3/2010 | Sullivan et al. | 705/36 R |
| 7,716,077 B1 * | 5/2010 | Mikurak | 705/7.12 |
| 7,925,891 B2 * | 4/2011 | Crispin et al. | 713/190 |
| 2002/0032643 A1 | 3/2002 | Himmelstein | |
| 2002/0095368 A1 * | 7/2002 | Tran | 705/37 |
| 2005/0210249 A1 * | 9/2005 | Lee et al. | 713/168 |
| 2005/0267845 A1 * | 12/2005 | Oh et al. | 705/51 |
| 2006/0085219 A1 * | 4/2006 | Frank et al. | 705/1 |
| 2007/0255674 A1 * | 11/2007 | Mahoney | 707/1 |
| 2008/0114668 A1 * | 5/2008 | Peters et al. | 705/32 |
| 2011/0047217 A1 * | 2/2011 | Arnaud et al. | 709/205 |
| 2011/0137774 A1 * | 6/2011 | Jakilinki et al. | 705/34 |

FOREIGN PATENT DOCUMENTS

| | | |
|---|---|---|
| WO | WO-92/03000 A1 | 2/1992 |
| WO | WO-99/59081 A1 | 11/1999 |
| WO | WO-01/08031 A2 | 2/2001 |

OTHER PUBLICATIONS

Electronic Record-Keeping for Patent Purposes: Cautions and Pitfalls, ACS Government Affiairs Publications, http://tungsten.acs.org/government/publications/tech_rkpatent.html, Nov. 20, 2000.

Charles R. Merrill, It's a Matter of Time: The Use of Secure Time Stamping to Protect Intellectual Protect, The Corporate Counselllor, Nov. 20, 2000.

Overview of the lnnobook Software, redPatent, http://www.redpatent.com/InnbookOverview.htm. Nov. 20, 2000.

Sandercock et al., Under Strict Rules, electronic Records Can Enter—PTO Allows Electronic Evidence in Patent Interferences Now, But FRE Must Still Be Followed, The National Law Journal, vol. 20, No. 43, Jun. 22, 1998.

Lysakowski, Comparing Paper and Electronic Laboratory Notebooks—Part 1, http://www.censa.org, Nov. 20, 2000.

Dolak, Patents Without Paper: Proving a Date of Invention with Electronic Evidence, Houston Law Review, pp. 471-530, Summer 1999.

Akash Joshi, "And now, intellectual capital can be traded on net," Financial Exeress, Nov. 3, 1999.

* cited by examiner

Fig. 1: Database Modules

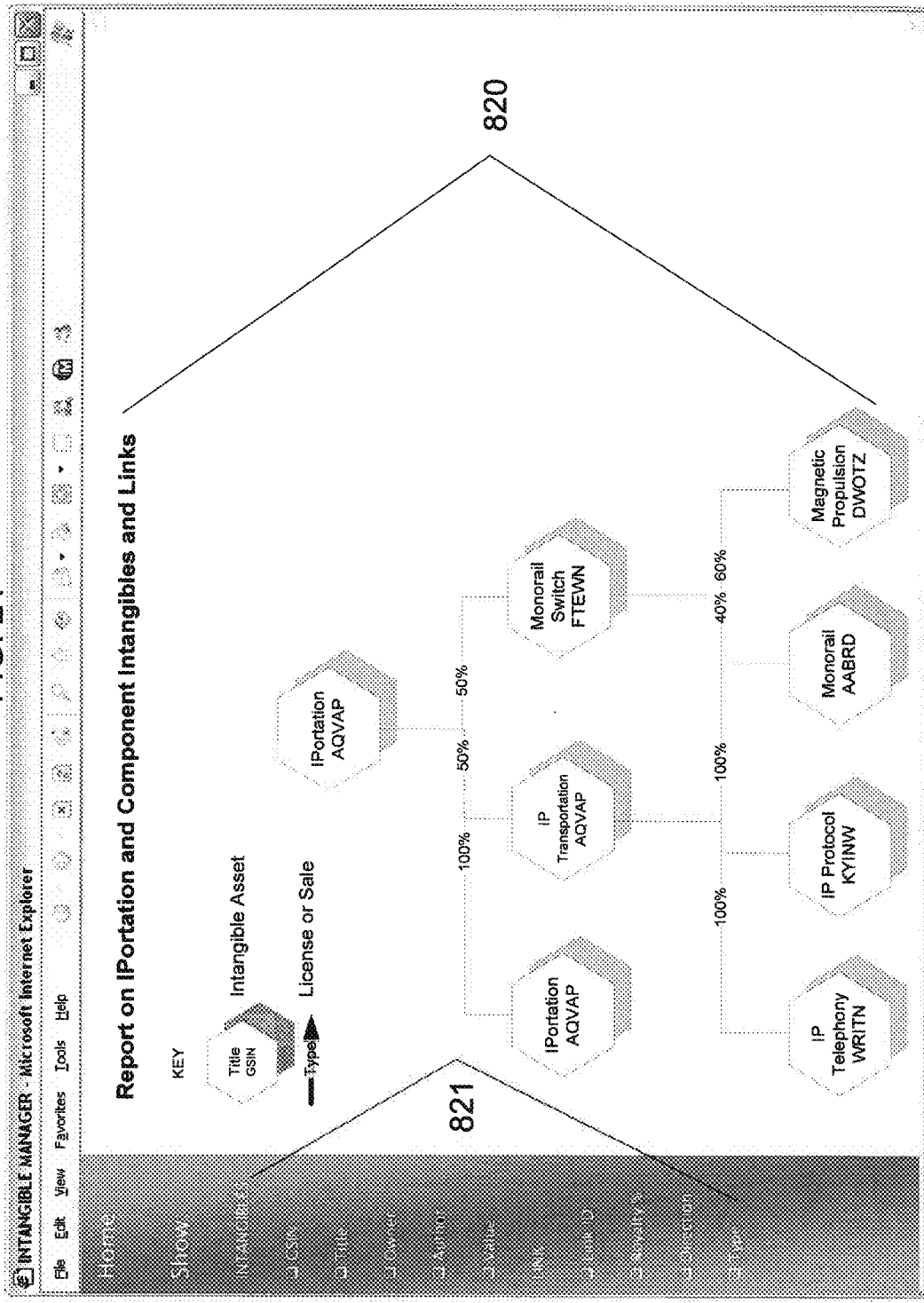

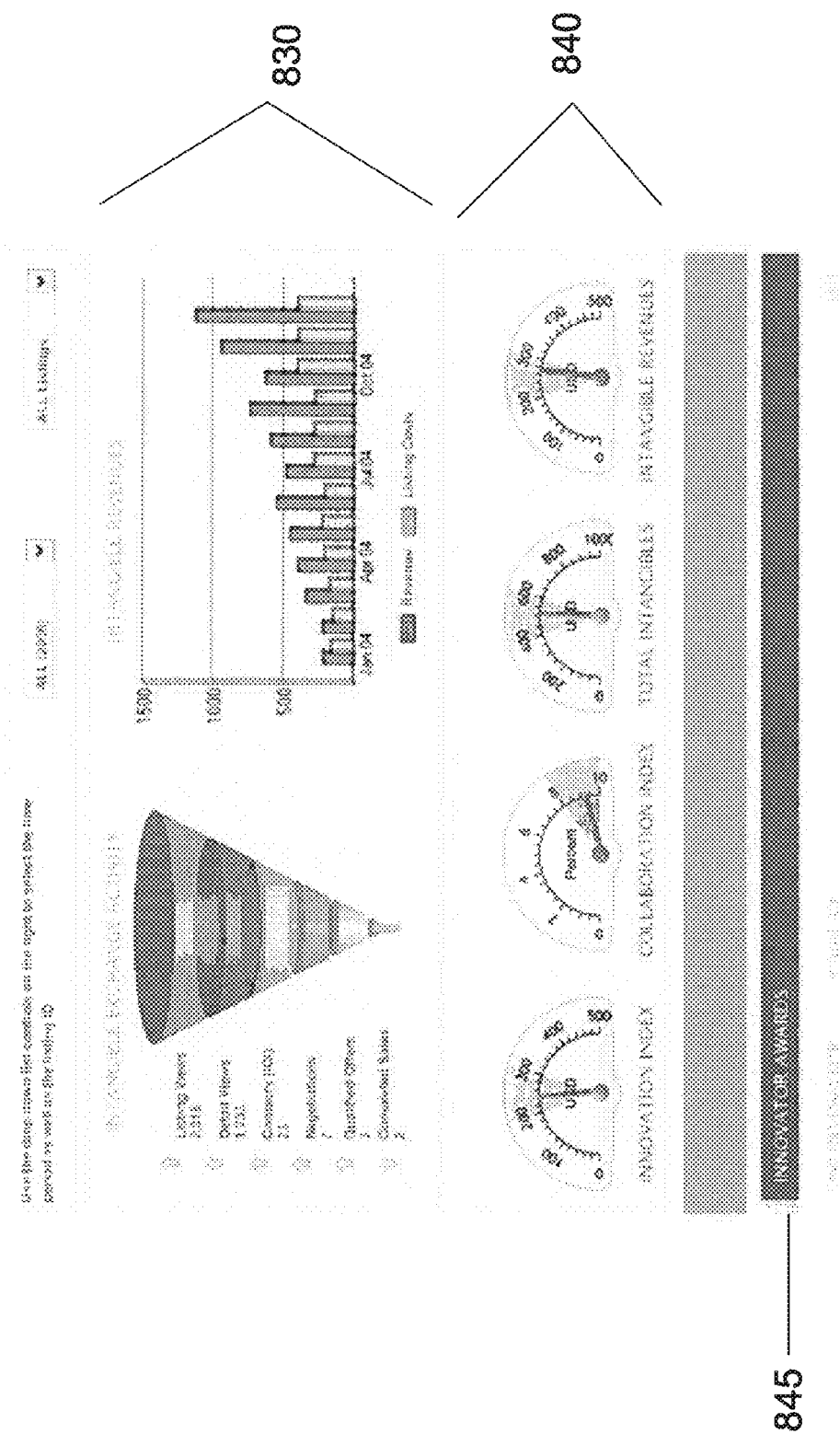

FIG. 23

INTANGIBLES CONTRIBUTED TO XYZ CORPORATION BY PETER SMITH — 850

| Date | GSIN | Title | Trade Secret |
|---|---|---|---|
| 04/11/04 | BWAER | | Yes |
| 06/12/04 | AABEF | | Yes |
| 06/21/05 | BASSA | | No |
| 02/20/06 | AWYON | | Yes |
| 02/21/06 | BATSA | | No |
| 03/27/06 | ALEON | | Yes |

I acknowledge that the above items were contributed by myself (possibly in collaboration with others) to the XYZ Corporation and that they are the property of XYZ corporation and I have been fully compensated for this contribution.

Signed _____  Date _____
Title _____

TRADE SECRETS OF XYZ CORPORATION ACCESSED BY PETER SMITH — 860

| Date | GSIN | Title | Trade Secret |
|---|---|---|---|
| 04/04/04 | BAXYE | | Yes |
| 05/12/04 | ASEFI | | Yes |
| 06/23/04 | BEGAJ | | Yes |
| 06/26/04 | AXENO | | Yes |
| 04/04/05 | BAXYB | | Yes |
| 05/12/05 | ESEFI | | Yes |
| 06/23/05 | BQGAJ | | Yes |
| 06/26/05 | RXENO | | Yes |
| 07/4/05 | CAWYE | | Yes |
| 08/23/05 | REWAJ | | Yes |
| 09/26/05 | DQUNO | | Yes |
| 11/4/05 | TSRWE | | Yes |
| 01/4/06 | ASDRI | | Yes |
| 01/12/06 | BANAJ | | Yes |
| 02/23/06 | AQYTO | | Yes |
| 02/26/06 | DYEYE | | Yes |
| 03/04/06 | ASSTI | | Yes |
| 03/12/06 | BSDIR | | Yes |
| 03/23/06 | RWTR | | Yes |

I acknowledge that the above items are trade secrets of the XYZ Corporation and that they are to be kept confidential and not be disclosed without written permission from the XYZ corporation.

Signed _____  Date _____
Title _____

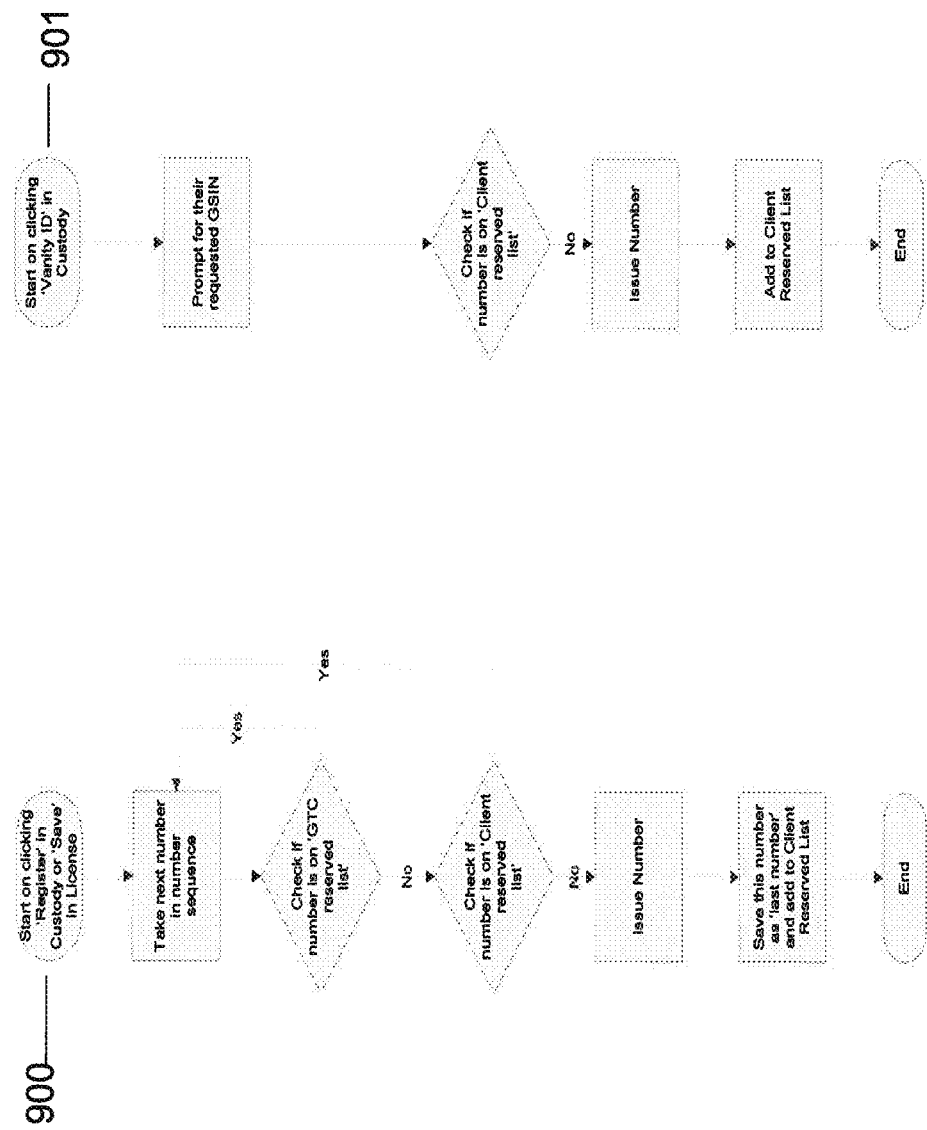

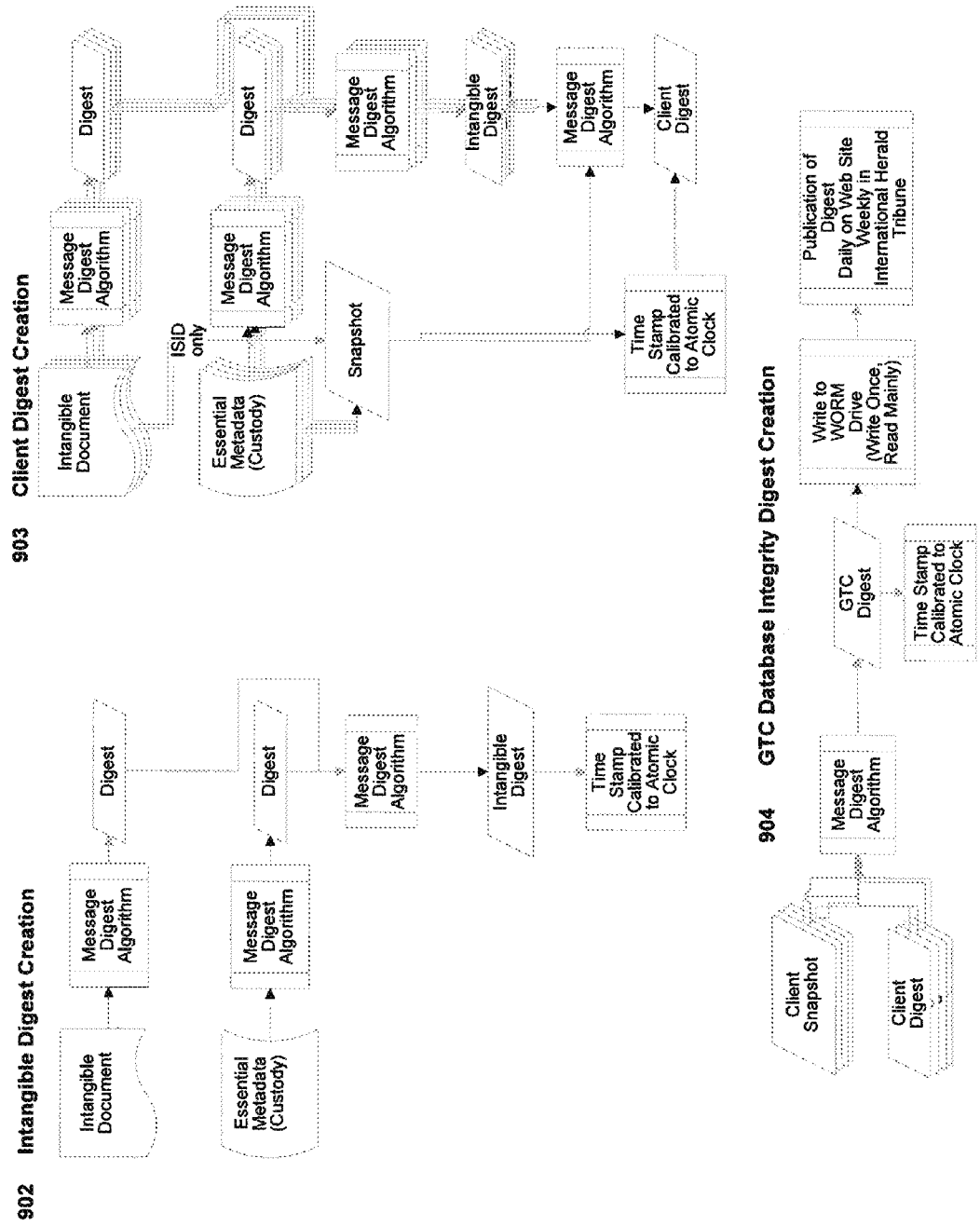
Fig. 25 Digest Hierarchy to Provide Strong Attestation Trail

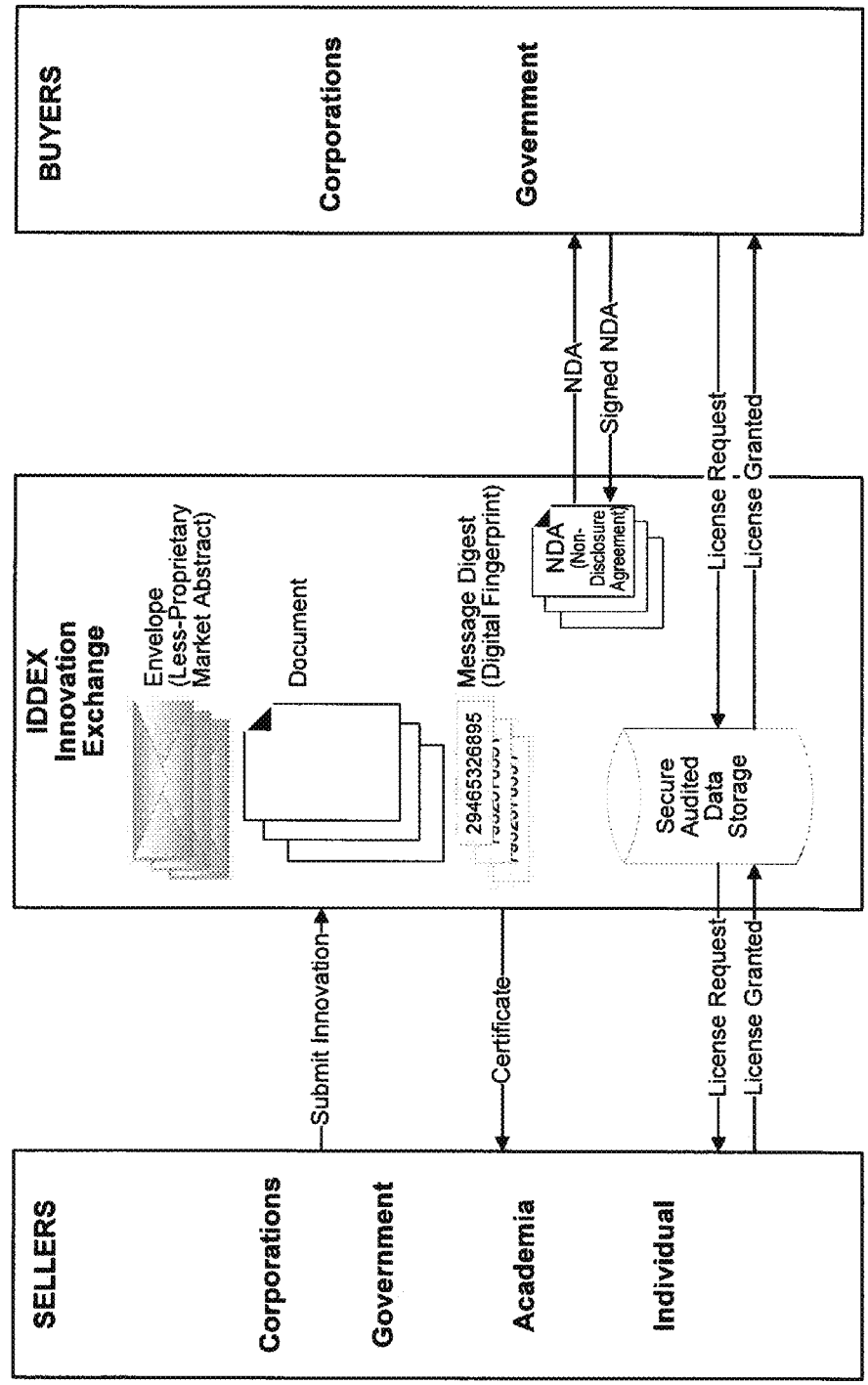
FIG. 27: Innovation Exchange

Intangible Asset Fund

Collaboration and trade in innovation of all types at all stages between research institutions, universities, companies, individuals and nations.

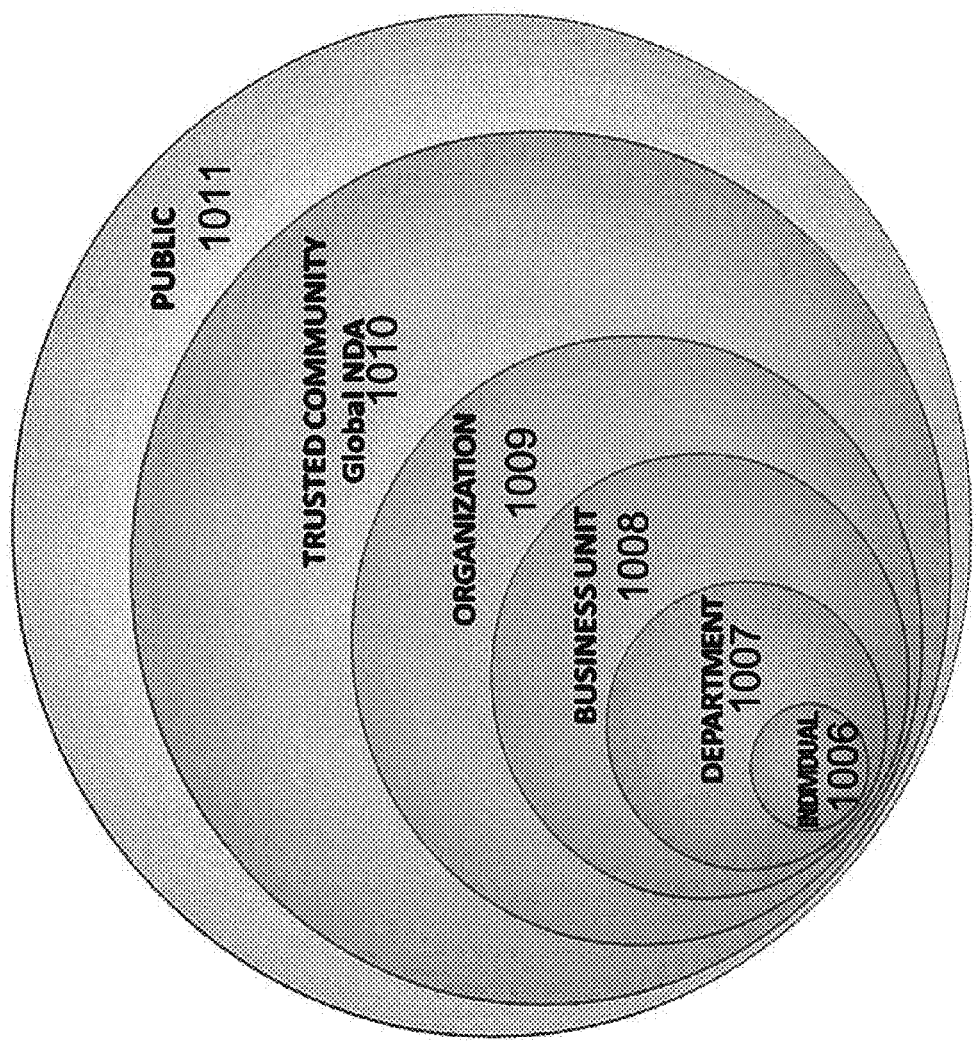
Figure 32: Access Hierarchy

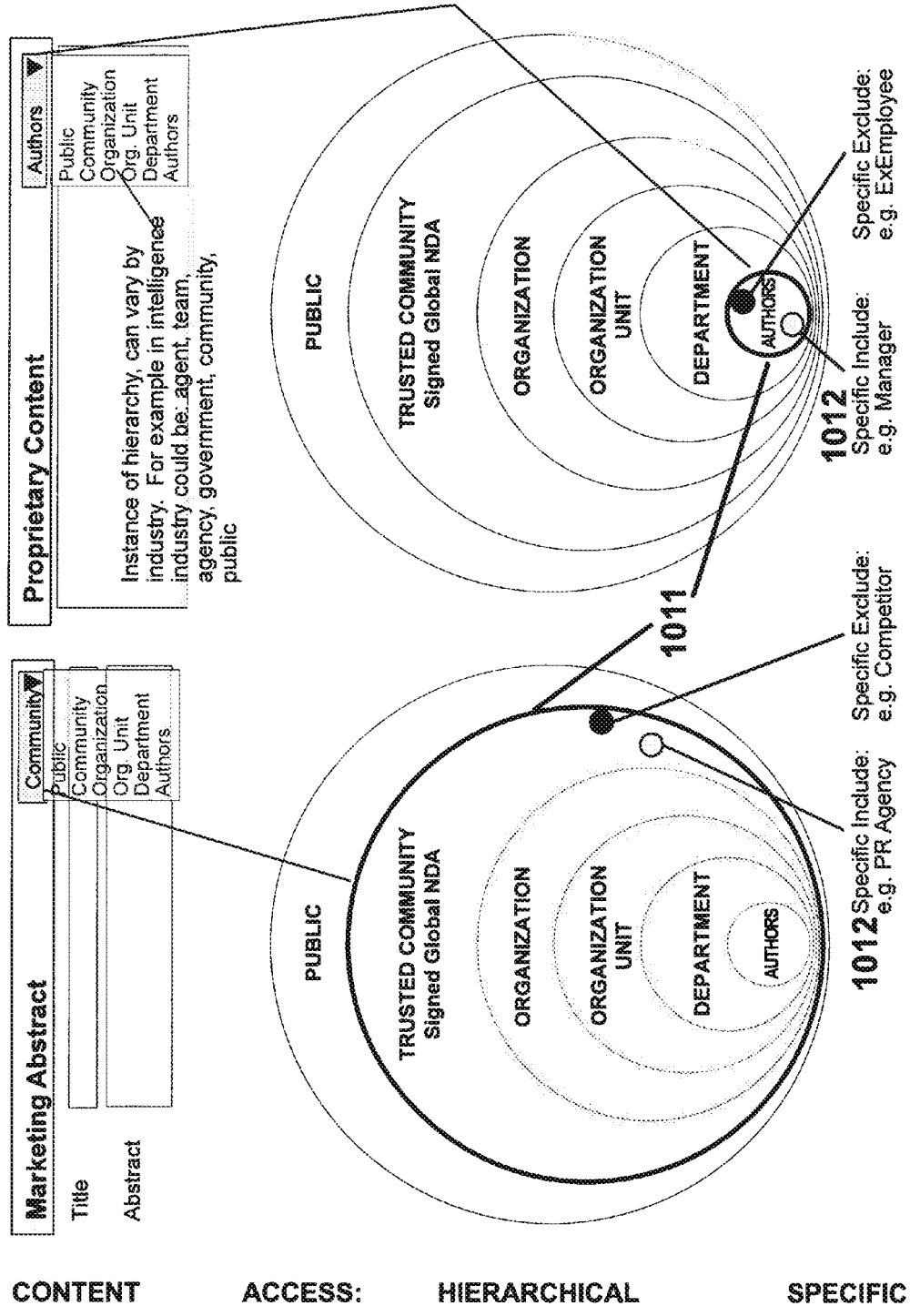

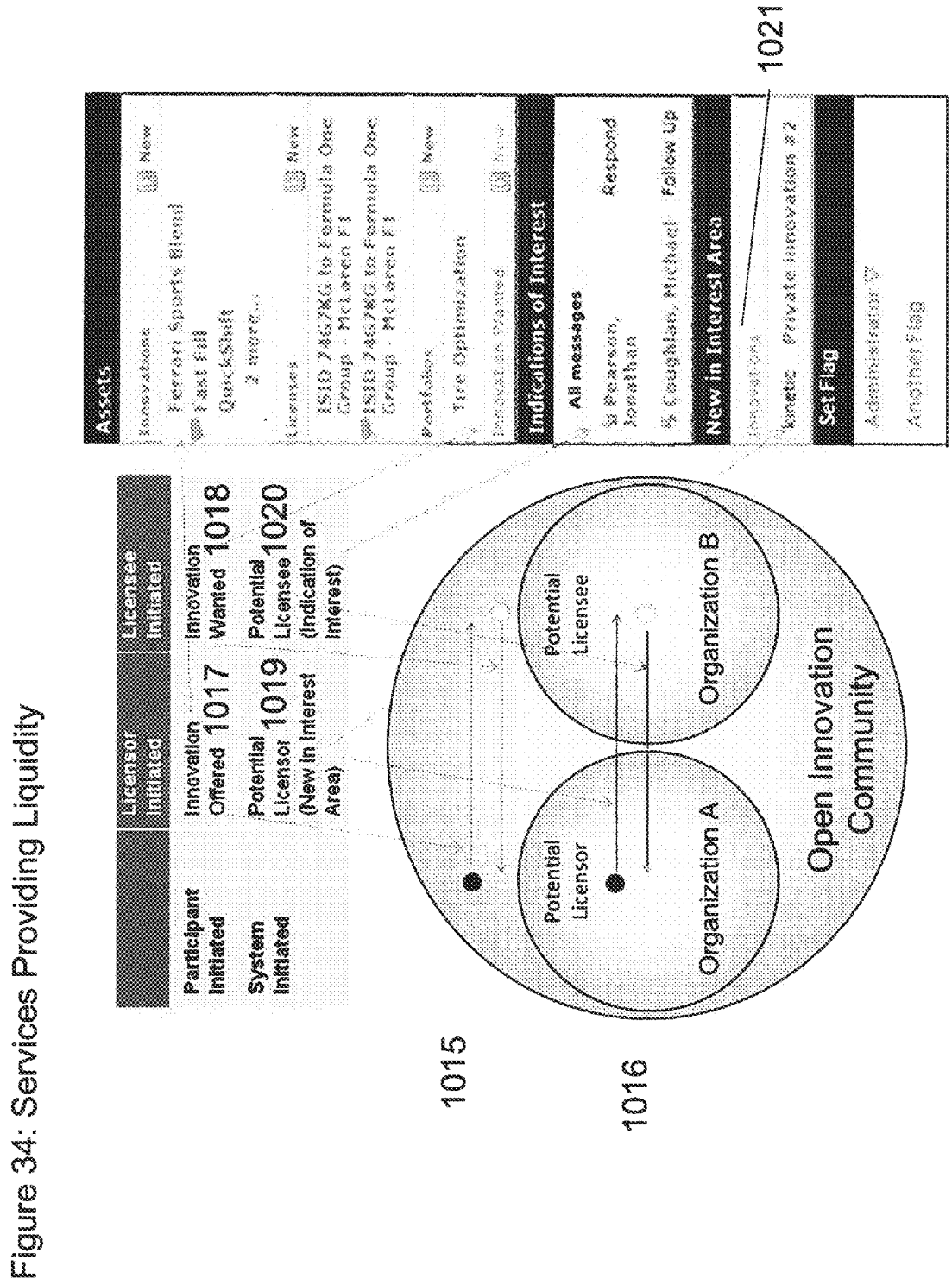
Figure 34: Services Providing Liquidity

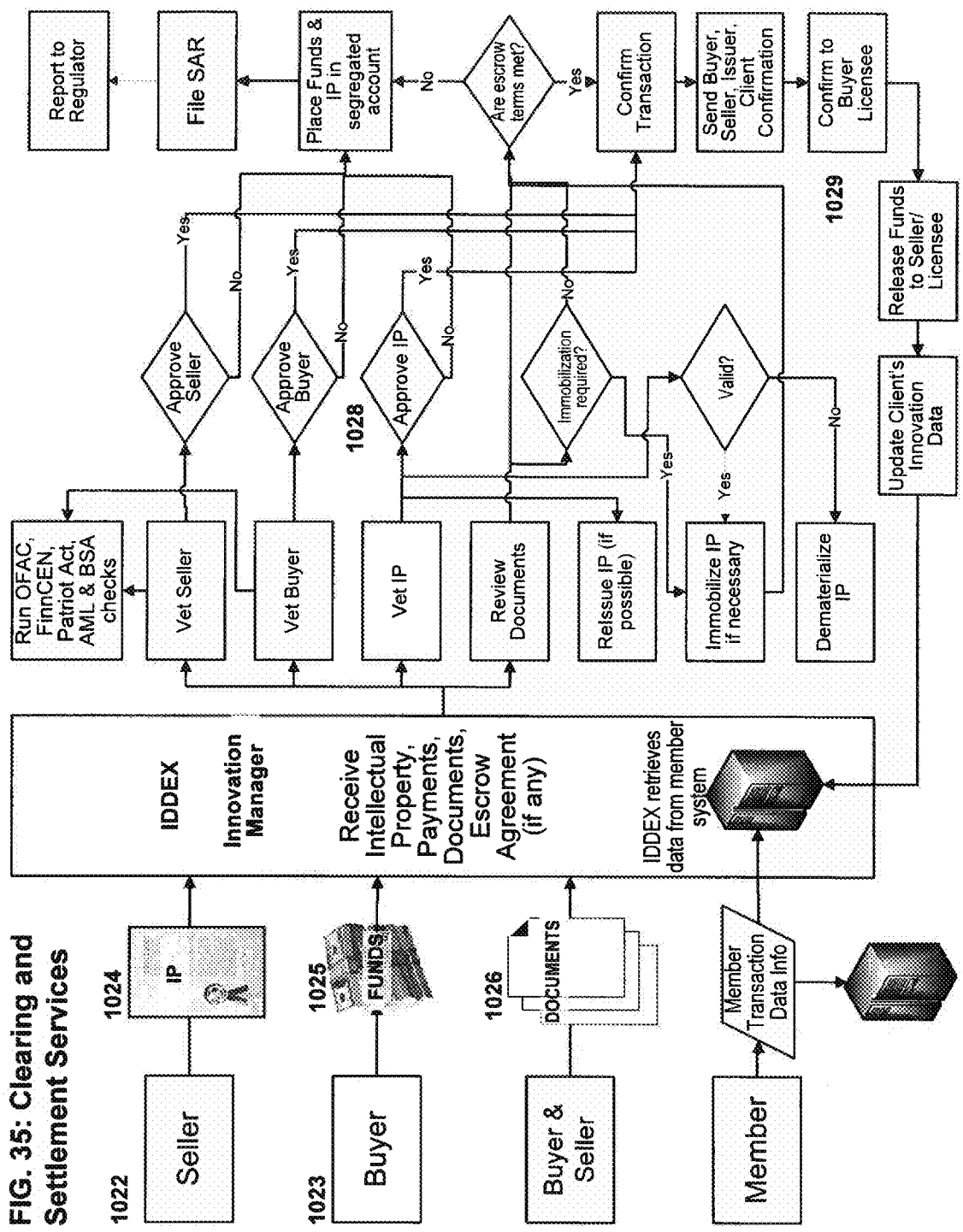

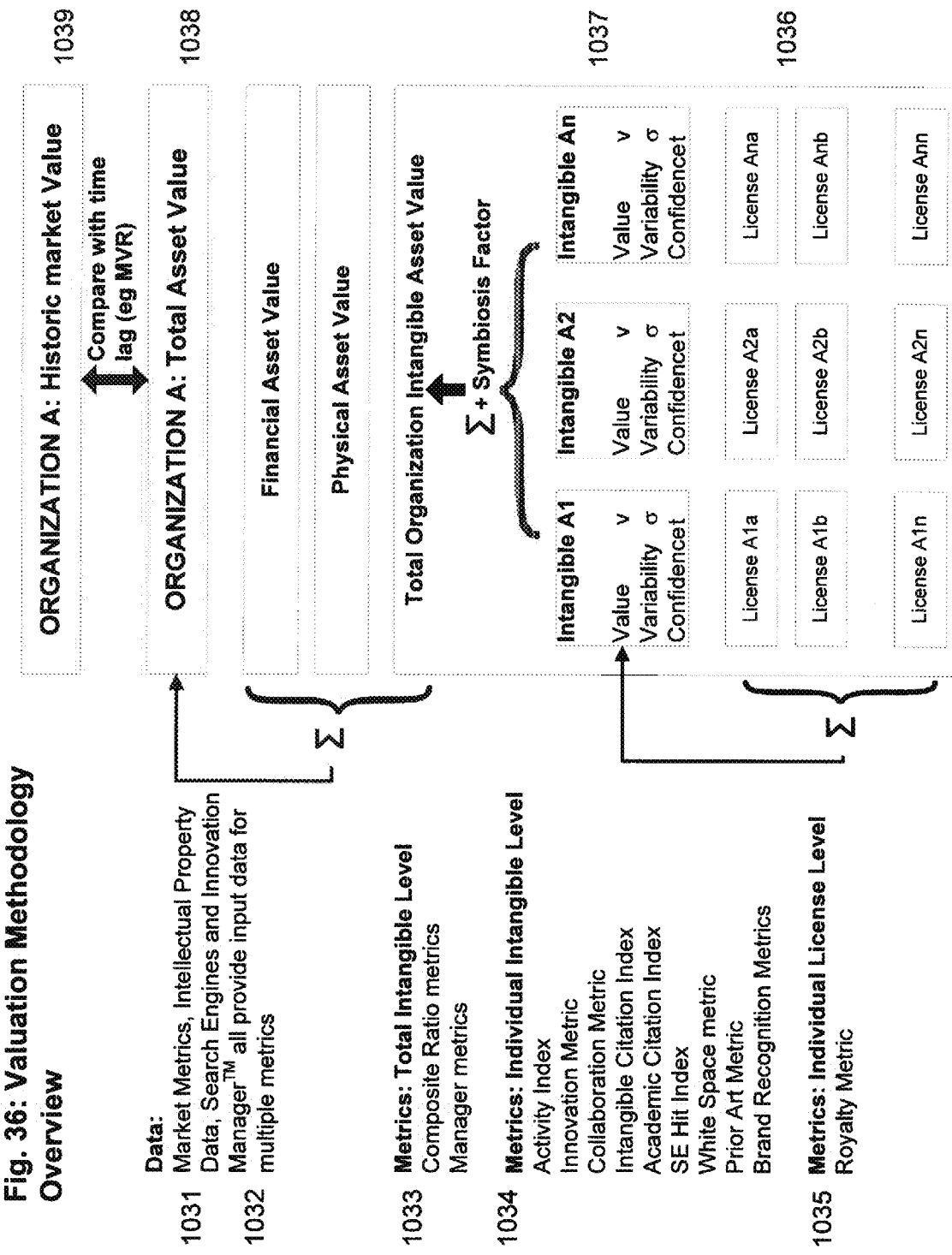
Fig. 36: Valuation Methodology Overview

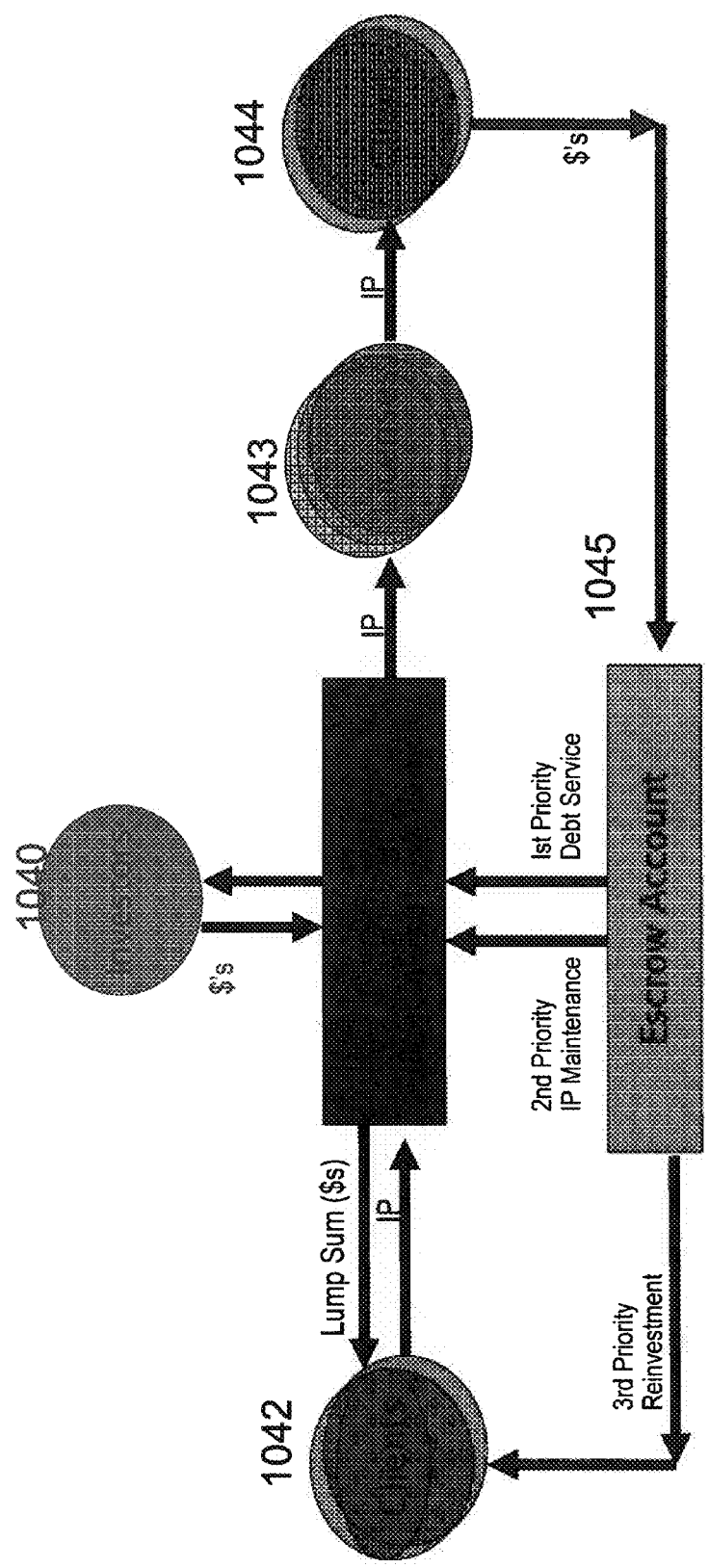
Figure 37  Intangible Asset Backed Securities

SYSTEMS AND METHOD FOR MANAGEMENT OF INTANGIBLE ASSETS

RELATED APPLICATION

This application claims the benefit of Provisional Application Ser. No. 61/201,128, filed Dec. 5, 2008. This application is a continuation-in-part of U.S. application Ser. No. 12/221,334, filed Aug. 1, 2008, which is a continuation of U.S. application Ser. No. 09/766,067, filed Jan. 19, 2001 now abandoned, which claims the benefit of U.S. Provisional Patent Application Ser. No. 60/176,860, filed Jan. 19, 2000. All of these applications are incorporated herein in their entireties.

BACKGROUND OF THE INVENTION

Intangible assets are essential for business success. Maintaining a strong intangible asset portfolio (e.g., patents, trademarks, copyrights, trade secrets, good will, etc.) is critical to the successful growth of any business. Studies have estimated that close to 80% of organizational value lies in the organization's intellectual assets. In just our public companies this represents a value of over $50 trillion. Yet other studies show that:
  Less than 2% of these assets are ever licensed
  Although accounting regulations (FASB 141/142, IAS 36, 38, SEC SX, IFRS 3) require companies to identify, value and report these assets less than 6% of these are reported
  Over 30% of all R&D is totally wasted re-inventing what has already been discovered before (often in the same organization)
  An estimated $1 Trillion of intellectual assets are stolen or misappropriated every year
  This is the 'Innovation Paradox'. Our largest asset class by far (intellectual assets) is the only asset class that has does not have an effective, comprehensive management system, have not spawned an ERP from solutions developed to manage the asset class and is by far the least liquid of the asset classes. This is due to two major factors (and numerous minor factors that we also address in this invention):
  Most organizations have no inventory of their intellectual assets
  Once they are able to inventory their intellectual assets most are then kept secret making collaboration (even within the organization and certainly between organizations) and commercial development difficult if not impossible
  The solution to this paradox lies in meeting several needs:
  Organizations need a simple tool to facilitate their capture of their intellectual assets into a secure repository and then to effectively manage them over their life cycle
  This process of capture needs to enable to recognition of 'complex' intellectual assets that are comprised of two or more intellectual assets as this is the way innovation has traditionally developed—through a series a continuous evolution and combination
  Having built their secure repository organizations need to be able to manage access controls to these assets in such a way that they can address previously incompatible goals of protecting competitive advantage and effectively marketing these assets to potentially interested parties
  Organizations need to be able to accurately and affordably value their intellectual assets distinct from other corporate value—and to track this value over time as it inevitably changes—this is not only sensible business practice but is also required under the new accounting rules
  Organizations need to manage risk in the intellectual asset class—insurance is available for all other asset classes but has been largely unavailable for this asset class
  There needs to be an infrastructure parallel to that that exists in the financial services industry for the clearing and settlement of these assets—this will enable the tools and liquidity of the financial services industry to apply to this enormously valuable asset class. Just as innovators need funds to develop their innovations investors are continually seeking new investment opportunities and new asset classes (particularly ones that do not correlate with other asset classes—an important consideration in risk management for asset managers)

Recent changes in the accounting and tax laws emphasize how important intangible assets are to a company. These new laws impose an affirmative duty on the company to monitor and manage their intangible assets for the benefit of the shareholders.

To keep a strong intangible asset portfolio, businesses should continuously develop new intangible assets and evaluate those intangible assets lying dormant, with the primary goal of maximizing those assets for commercial benefit. Typically, companies build up their intangible asset portfolio by not only protecting their intangible assets, e.g., applying for patent, trademark and copyright protection, but also by licensing and cross-licensing the technology related to that intangible asset.

Despite widespread acceptance of intangible assets as critical to the future of a company's business and the changes to laws surrounding them, many businesses put intangible assets in the "too difficult box" in terms of managing and communicating their value. Many experts maintain that intangible assets are great importance at creating shareholder wealth, yet they remain under utilized part of many businesses. In fact, many businesses barely keep inventory of their intangible assets, much less aggressively try to maximize their value over their lifecycle.

Many CEOs, general or intellectual property counsels would love to have at their fingertips updated information about their company's intangible assets including currently developing or licensed intangible assets, problems that still need to be solved and/or intangible assets that are lying dormant. They would use this information in the company's business strategy to protect or improve current or future product or service positions and provide competitive advantage. All information adding further value to the company and potentially more profit.

Electronic laboratory notebooks have been utilized by some companies as first attempts to capture their inventions. These electronic notebooks allow the user to enter, search, store and report data. They also have the capabilities of having the notebook electronically witnessed. Electronic notebooks, however, fall short of providing a practical solution to managing intangible assets and maximizing their profitability.

Based on the critical role that intangible assets play in a company's business, there is a need for new systems and methods for managing intangible assets to maximize their value in the market place. There is also a need for systems and methods that provide updated intangible asset information and track and encourage innovation within the company.

SUMMARY OF THE INVENTION

In various embodiments, the system and methods provided encourage a collaborative and innovative culture that every CEO strives to encourage. In various embodiments, the system and methods provided facilitate this process through facilitating versioning and collaboration and keeping an audit trail so that appropriate kudos, incentive compensation, royalties, etc. find their way to those who contribute. The methods and systems described herein break down the silos and "not invented here" problems that plague virtually every organization.

In various embodiments, new systems and methods for managing intangible assets to maximize their value are provided. The systems and methods provide updated intangible asset information that allows efficient ways to manage intangible assets (particularly intellectual property) to maximize their value in the market place and during the lifecycle of the intangible asset. In various embodiments, the systems and methods allow the user to merge intangible assets to create a new intangible asset. In various embodiments, the systems and methods provided allow the intangible asset to be valued, so that the company can determine in real time the net worth of the asset. In various embodiments, the systems and methods provided allow the intangible asset to be securitized and traded among buyers to realize maximum profit for the company.

In accordance with an exemplary embodiment of the claimed invention, a network-based intangible asset management system for storing, managing, disseminating and sharing intangible asset information of an entity among users over a communications network comprises a processor based server, a client processor based system and a centralized database. The processor based server is connected to the communications network, such as the Internet, a telecommunications network, a wireless network and the like. The processor based server comprises at least one innovate module, protect module, value module, Collaborate Module, securitize module, license module and manage module. The client processor based system is connected to the communications network and comprises an interface to access the processor based server to display options for a user to enter, view, and edit some or all of the intangible asset information from one or more modules, said user being associated with said client processor based system. The centralized database is connected to the communications network to store the intangible asset information. The processor based server is configured to be coupled to the client processor based system and the centralized database. The processor based server receives the intangible asset information from the client processor based system, processes and organizes the intangible asset information into at least one innovate module, protect module, value module, Collaborate Module, securitize module, license module and/or manage module. The processor based server stores the intangible asset information in the centralized database categorized by module, updates the centralized database with any new intangible asset information received from the client processor based system. The processor based server provides the updated intangible asset information in response to an inquiry from another user.

In accordance with an exemplary embodiment of the claimed invention, a computer readable storage medium storing computer executable instructions that, when executed by a computer, cause the computer to display options for a user to enter, view, and edit some or all of intangible asset information and manage, disseminate and share intangible asset information of an entity among users by accessing a database coupled to a user interface. The database stores the intangible asset information and a processor coupled to the user interface and the database. The processor receives intangible asset information from the user; processes and organizes the intangible asset information into at least one custody module, protect module, value module, develop module, securitize module, and/or analyze module. The processor stores the intangible asset information in the database by module, and updates the database with any new intangible asset information received from the user. The processor also provides the updated intangible asset information in response to an inquiry from a user.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

BRIEF DESCRIPTION OF THE DRAWINGS

These and other advantages of the claimed invention will be described in detail with reference to the following drawings in which like reference numbers refer to the like elements.

FIG. 10 is an exemplary embodiment of the user interface for the value module of the intangible asset management system of the claimed invention, which has fields for a user, in this example, to select a particular field for valuation of the intangible asset and set benchmarks for the value as well as save the valuation.

FIG. 12 is an exemplary embodiment of the user interface for the manage module of the intangible asset management system of the claimed invention, which has fields for a user, in this example, to select a particular field to enter a rating for marketability, protectability, activity and viability of the intangible asset. These ratings may be calculated automatically by the system or placed in by the user. The manage module also has expansion bars and fields for the user to recommend whether the intangible asset should be developed, donated, published or the subject of a joint venture and tracks the progress for the intangible asset. The manage module also gives the user the option to print reports related to the intangible asset.

FIG. 15 is an exemplary embodiment of the user interface for the license module of the intangible asset management system of the claimed invention, which has fields for a user, in this example, to populate and/or track information about the license including, for example, the type of license, revenue associated with the license, the particular geography for the license, and the particular industry for the license. There is also a field for selecting various security levels, which grant certain users access to this information and there is a reports generator that allows various reports to be generated concerning the license including template licensing or collaboration agreements. The user may also have access to solutions needed data.

FIG. 21 is an exemplary embodiment of a typical flow chart report generated by the system, which describes the percentage licensing/sales links associated with a particular intangible asset or component intangible.

FIG. 22 is an exemplary embodiment of a typical CEO report generated for the company by the reports module. Shown graphically in a dashboard are economic flows for the intangibles, e.g., what proportion of the value or revenue is from the intangible asset, who are the most contributors and what are the most important ideas contributed to the company.

The reports generator also allows innovative and collaborative indexes to be generated by the system and can identify the top innovator in the company.

FIG. 23 is an exemplary embodiment of a typical report generated for the general counsel of the company by the reports module. Shown are exemplary exit reports that the intangible asset manager can generate for the employee leaving the company. The system can also generate a report as to what trade secrets the employee accessed and provide a title, date and signature line for the employee to sign and acknowledge as company property during the exit interview.

FIG. 24 is an exemplary flow diagram of the creation of an international standard intangible asset identifier (ISID or GSM) or vanity identifier, which will be associated with the particular intangible asset or the component intangible asset. The innovate module has a routine to determine if the number or vanity identifier is in use already or is on the customer-reserved list.

FIG. 25 is an exemplary flow diagram illustrating the pathway for the creation of a message digest for the intangible, user's database and the trusted third party's database. The message digest can be time stamped with an atomic clock calibrated server to ensure that the intangible asset, or asset portfolio has not been altered and was created at the time it was created.

FIG. 26 illustrates an exemplary flow diagram illustrating how a new user (new client) establishes an account to access the intangible asset management system of the claimed invention, which is controlled by a trusted third party.

FIG. 27 illustrates an exemplary flow of the intangible exchange, where a trusted third party maintains the intangible asset exchange.

Figure 28:
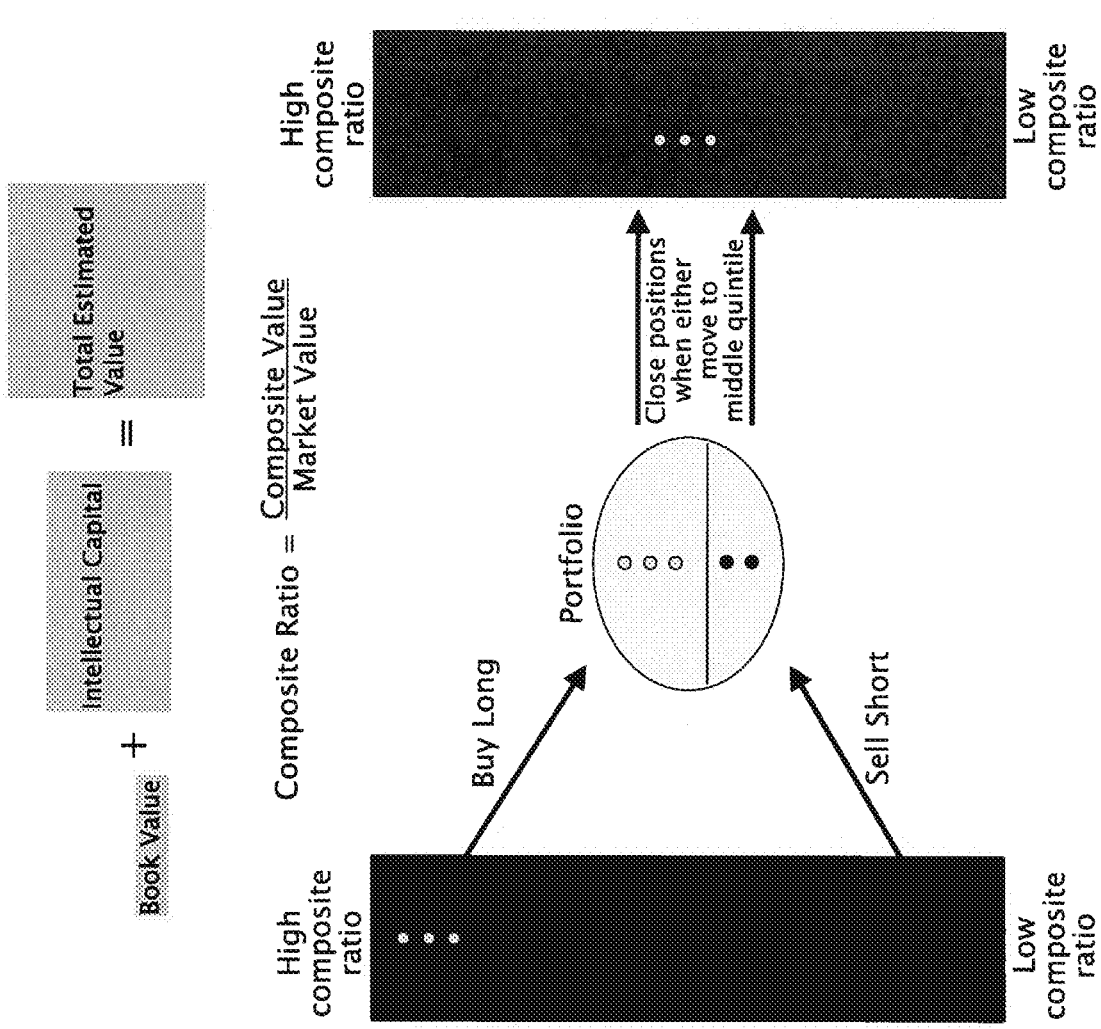

FIG. 28 is an exemplary embodiment illustrating the intangible asset value fund, where intangible assets or portfolio of intangible assets can be used to exchange value when a certain composite ratio is reached. This allows profiles for investors to invest in the company based on the company's intangible asset portfolio.

Figure 29:
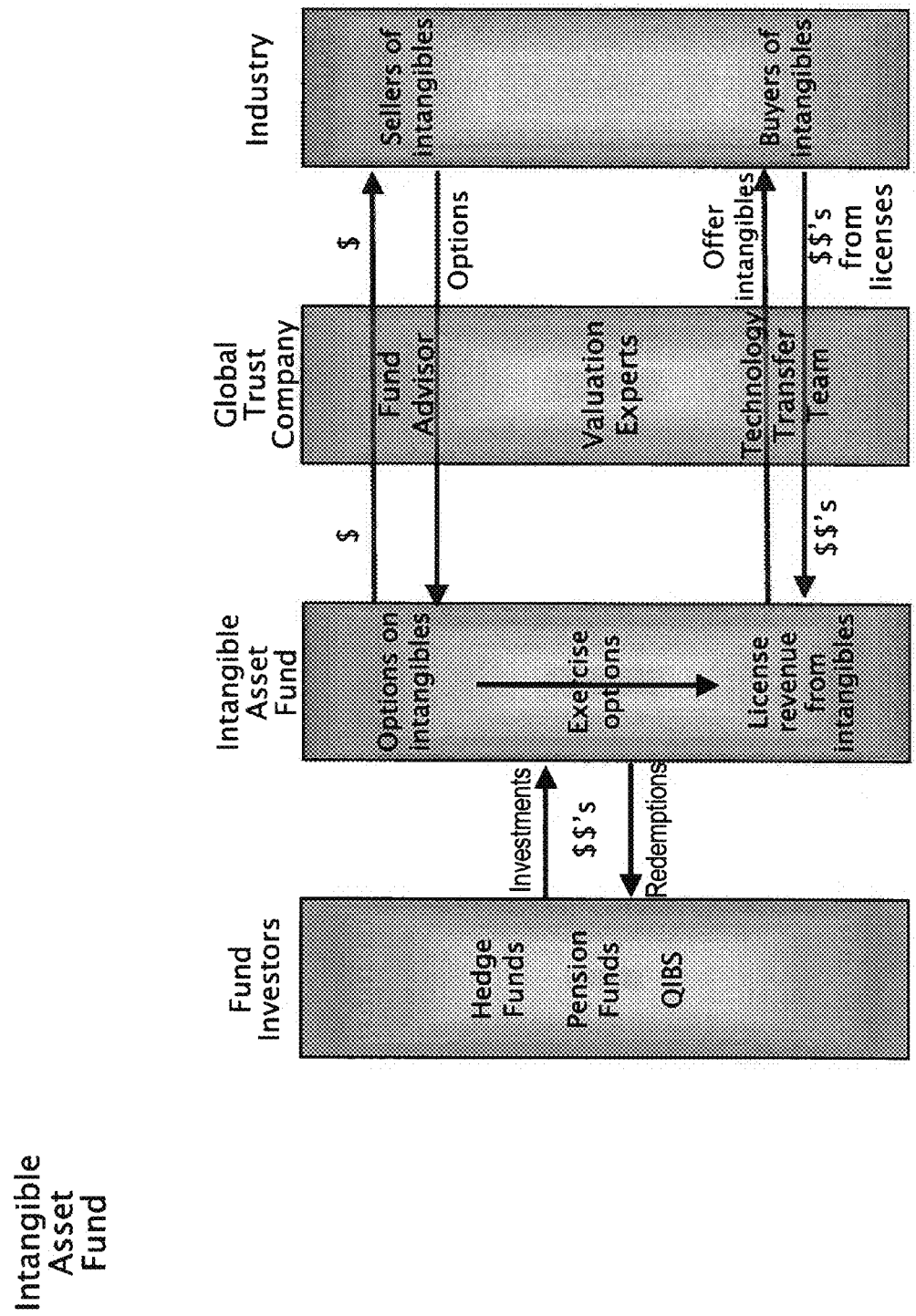

FIG. 29 is an exemplary embodiment illustrating the intangible asset fund, where investors can invest via the fund directly in individual intangible assets or portfolios of intangible assets without necessarily taking any equity in the company that owns the assets. Investors may, in one embodiment initially only purchase an option to buy or license the intangible assets or portfolios of intangible assets and then subsequently, possibly based on further analysis of those assets, exercise the option to complete the purchase or license.

Figure 30:
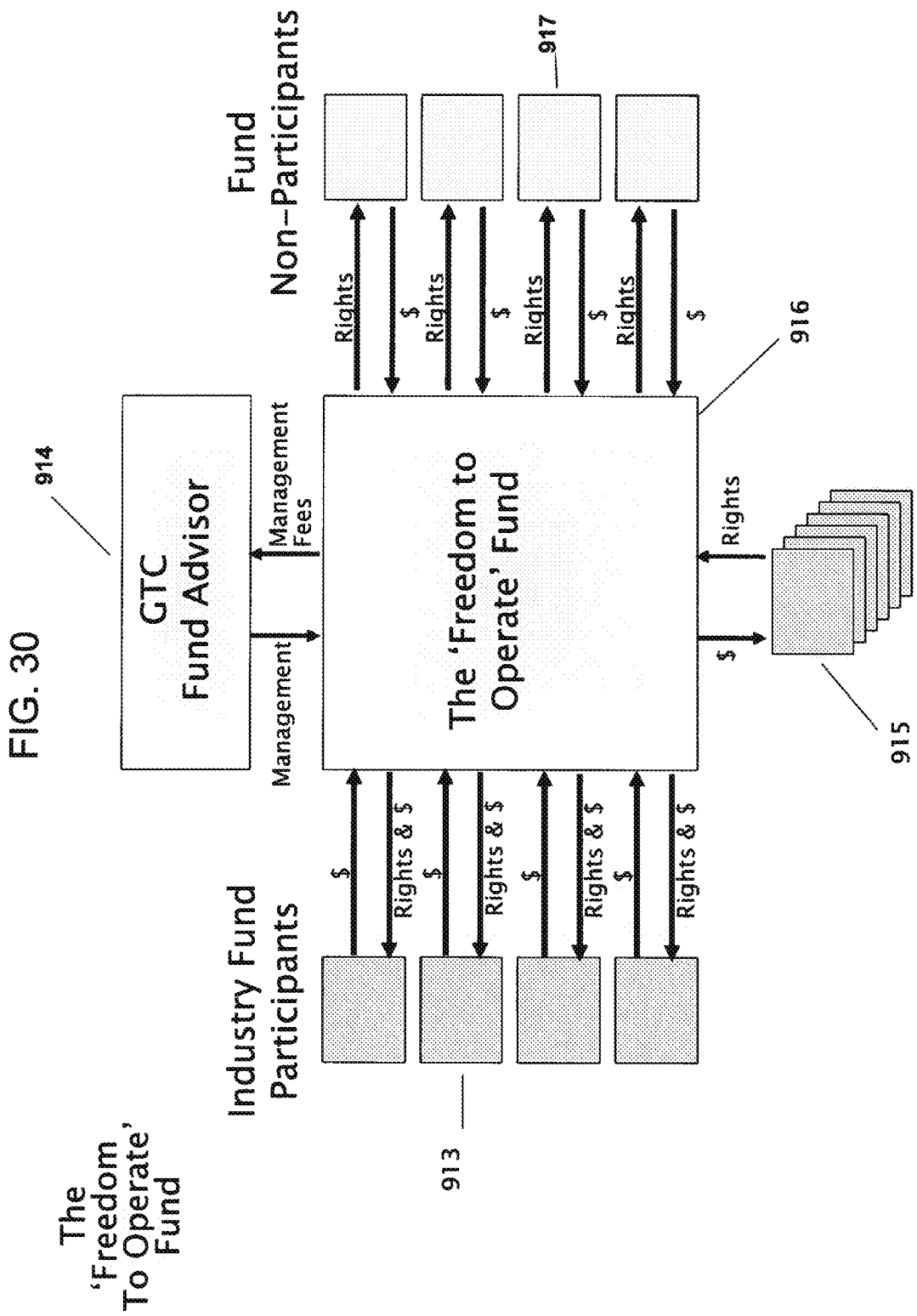

FIG. 30 is an exemplary embodiment illustrating how the intangible asset management system can be used to create a freedom to operate (FTO) fund, where various industries can participate in the fund investing in the fund which would in turn acquire rights to certain intellectual assets that the fund would deem important to that industry. The fund could agree to license these assets to the fund investors for defensive purposes. A trusted third party (IDDEX) may also manage the FTO fund.

Figure 31:
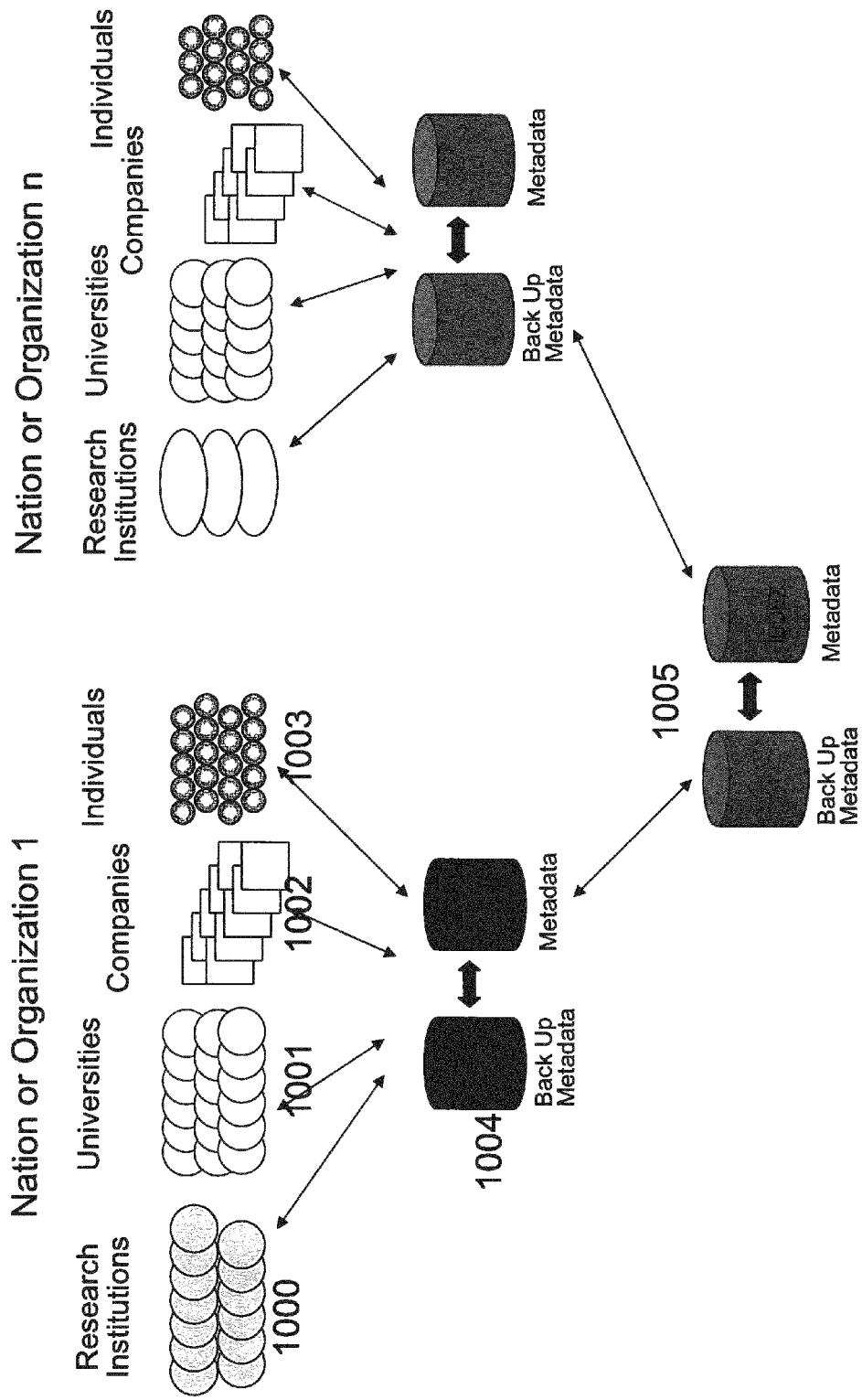

FIG. 31 is an exemplary embodiment showing the way multiple participants can form their own networks of users and how those multiple networks of users can be linked together to form a global network.

FIG. 32 is an exemplary embodiment showing the access hierarchy that allows the user to set the default limits of access to a particular invention.

FIG. 33 is an exemplary embodiment showing how the access levels shown in FIG. 32 combine to provide graduated access for the 'marketing abstract' and the 'proprietary content' for each innovation and how specific includes and excludes can modify these initial access settings.

FIG. 34 is an exemplary embodiment showing how features such as 'Innovation Offered' and 'Innovation Wanted' facilitate Open Innovation and how features such as 'New in your Interest Area' and 'Potential Licensor' enable the benefits of Open Innovation while still maintaining the confidentiality and even anonymity of Closed Innovation.

FIG. 35 is an exemplary embodiment illustrating the system and methods for clearing and settling intellectual asset transactions.

FIG. 36 is an exemplary embodiment illustrating the systems and methods for determining an accurate estimate of the value of licenses, intangibles, and organizations.

FIG. 37 is an exemplary embodiment illustrating the process by which clients can securitize their intellectual assets.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION OF THE EMBODIMENTS

Reference will now be made in detail to certain embodiments of the invention, examples of which are illustrated in the accompanying drawings. While the claimed invention will be described in conjunction with the illustrated embodiments, it will be understood that they are not intended to limit the invention to those embodiments. On the contrary, the claimed invention is intended to cover all alternatives, modifications, and equivalents, which may be included within the invention as defined by the appended claims.

It is noted that, as used in this specification and the appended claims, the singular forms "a," "an," and "the," include plural referents unless expressly and unequivocally limited to one referent. Thus, for example, reference to "a database" includes one, two, three or more databases. Various terms are used to describe innovation including intangibles, intangible assets, intellectual property, IP and intellectual assets. They are largely synonymous and tend to vary according to context (e.g. a CFO might refer to intangible assets, the GC refer to intellectual property and the CEO to innovation. They are all referring to the same assets within the organization. IP often refers to the more formally recognized innovation such as a patent.

The headings below are not meant to limit the disclosure in any way; embodiments under any one heading may be used in conjunction with embodiments under any other heading.

New systems and methods for managing intangible assets to maximize their value are provided. The systems and methods provide real time intangible asset information that allows efficient ways to manage intangible assets (particularly intellectual property) to maximize their value in the market place and during the lifecycle of the intangible asset. In various embodiments, the systems and methods provided allow a company's intangible asset or intangible asset portfolio to be securitized or retained in the innovate of a trusted third party and traded among buyers to realize maximum profit for the company. In various embodiments, the systems and methods allow users to seek intangible assets that can solve a problem for the user or seek users that need solutions to which their intangible asset addresses.

These organizations could be companies, universities, associations or even governments. These 'local' ecosystems can be linked together to form a global ecosystem using a hierarchical process illustrated in FIG. 31 in which organizations such as governments or universities or large companies or associations are keen to build an inventory of all of their intellectual assets and this invention enables them to do so in an efficient manner by collecting information from research institutions 1000, universities 1001, companies 1002, and individuals 1003. These organizational inventories of intellectual assets can be combined into regional inventories 1004 and one global innovation ecosystem 1005.

Intangible Assets: An intangible asset includes an asset that has no physical substance. Intangible asset, as used herein includes, but is not limited to, goodwill, an idea, invention disclosure or other intellectual property disclosure, patent, patent application, trademark, trademark application, service mark, service mark application, trade secret, trade dress, copyright, assignment, license or other agreements (e.g., NDA, CDA, MTA, or collaboration agreement, etc.) or the like. A portfolio or pool of intangible assets includes more than one intangible asset belonging to one or more of the same or different individuals or entities.

Intangible asset information includes any communication associated with the particular intangible asset, component intangible and/or the intangible asset itself. In one embodiment, intangible asset information is created and maintained in the central database to facilitate performance of various aspects of the invention. Intangible asset information includes, but is not limited to, component intangible assets, electronic versions of the intangible assets themselves, and data associated with the intangible asset (e.g., log elements, essential and non-essential metadata, user records. Essential metadata is that information about an innovation that is important for the innovation and does not change throughout it s lifecycle. It includes the name/s of the inventor/s, time and date of invention, the context (why it was developed e.g. as part of a grant or a research project), where it was developed (IP law varies by geography), how it was acquired (e.g., internal development or by acquisition—impacts accounting treatment). Each of these types of information may be stored in any suitable data structure, such as a data set, record, an array, a linked list, etc.

Metadata may include information about a particular intangible data set, which may describe, for example, how, when, and by whom it was received, created, formatted, accessed, and/or modified. Metadata elements may be used to store metadata relating to an intangible asset or component intangible asset and may include, indicators of the author/inventor, the owner, values, the meaning, and dates of use, sale, and public disclosure of the intangible asset or component intangible. Metadata elements may also contain a link to one or more log elements.

Log elements may be used to record changes to any intangible asset information. For example, when a change is made to metadata relating to a component intangible asset or intangible asset, a log element may be created that indicates the date, time, author and change to the component intangible or intangible asset. Intangible asset information includes, for example, name of the asset, date created, author/inventor, title, application no., issue date, registration number, filing date, summary of the asset, and the like.

In various embodiments, the database includes at least one innovate module, protect module, value module, Collaborate Module, manage module, securitize module, and/or other module. These modules are designed to at least track documents, foster collaboration and innovation. The individual module may control processing of the individual searching and/or organizing operations described in (or apparent from) the instant disclosure. Each module may be one or more processors or processor-based systems executing one or more executable programs (locally or remotely) stored in a memory component (or other article of manufacture).

Figure 1:
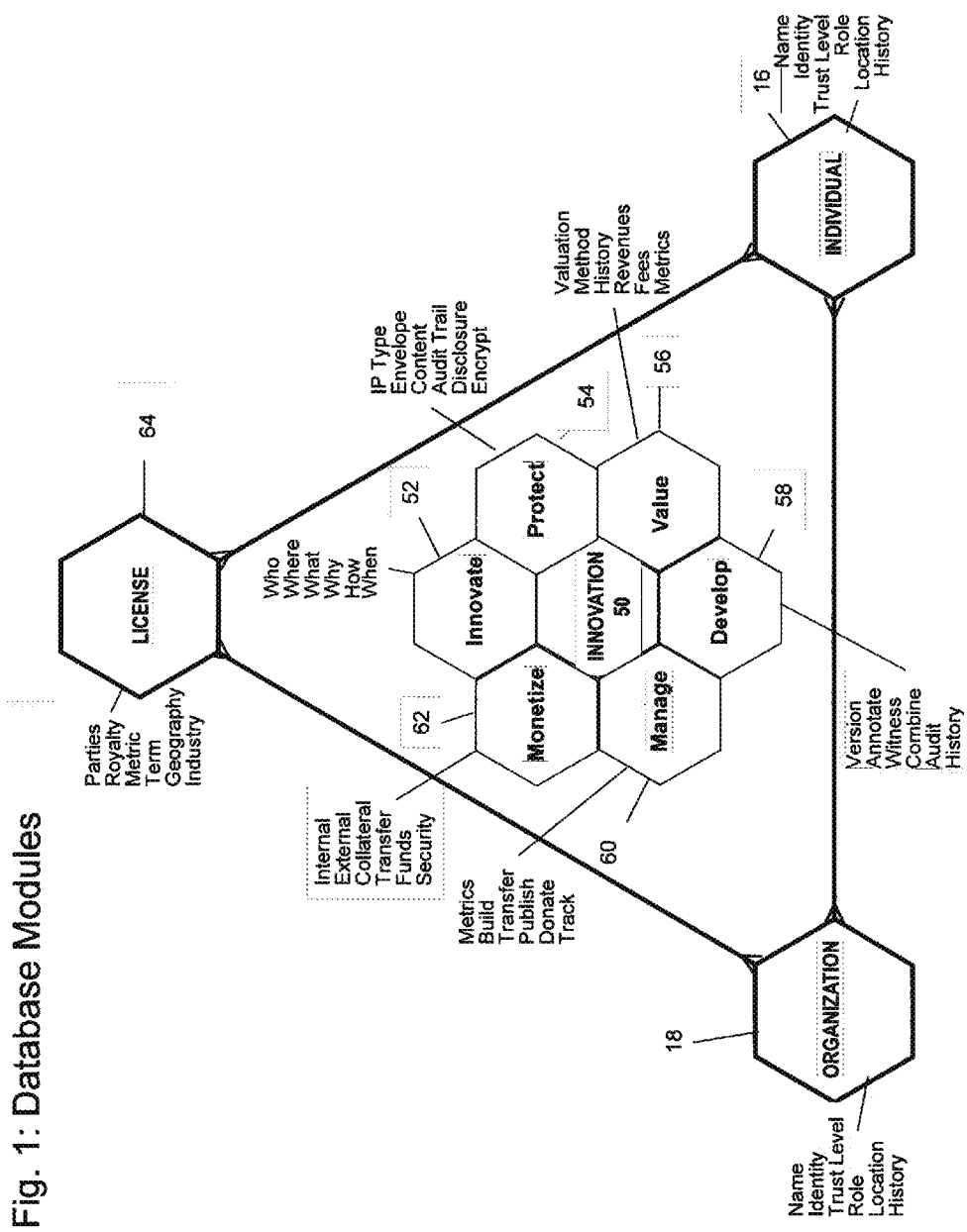
FIG. 1 illustrates database modules including innovate, protect, value, develop, manage, and securitize modules of an intangible asset management system in accordance with an exemplary embodiment of the claimed invention.

Referring to FIG. 1, in accordance with an exemplary embodiment of the claimed invention, it illustrates database modules including the innovate 52, protect 54, value 56, develop 58, manage 60, and securitize 62 modules of the intangible asset management system. Intangible asset information is stored in at least one of these modules. The modules described herein, particularly those illustrated or inherent in the instant disclosure, may be one or more hardware, software, or hybrid components residing in (or distributed among) one or more local or remote computer systems. Although the modules may be shown or described herein as physically separated components (e.g., innovate module 52, protect module 54, manage module 60, etc.), it should be readily apparent that the modules as described herein may be merely logical constructs or routines that are implemented as physical components combined or further separated into a variety of different components, sharing different resources (including processing units, memory, clock devices, software routines, logic commands, etc.) as required for the particular implementation of the embodiments disclosed. Indeed, even a single general purpose computer (or other processor-controlled device) executing a program stored on an article of manufacture (e.g., recording medium or other memory units) to produce the functionality referred to herein may be utilized to implement the illustrated embodiments.

The database comprising at least one module is accessible by one or more user interfaces 16 (individual user) and/or 18 (organizational user). The user will have access to the database or to other users utilizing a network, and have ability to license out or license in intangible assets 64 to or from other users based on, for example, their history of dealings (e.g., collaborator or competitor) with the database and other users of the database, their individual trust ratings, their geographic or industrial location for that technology area. The flexibility of the system derives from the structure of the data model for the database as a many to many relationship between intangibles (intellectual assets 50 in the various stages of their life cycle 52, 54, 56, 58, 60, 62), organizations 18, individuals 16 and licenses 64.

It should be readily apparent that a "user" of the various aspects of the inventive systems or methods disclosed herein may be any creator or recipient of information. For example, a user may be one or more of the same or different individuals (e.g., CEO, GC, VP of IP, technology transfer group, inventors, managers, client, business developers, economists, researchers, etc.), or a combination of the same or different individuals, entities, including trustees, a trust company, government agency, corporation, devices, without departing from the scope of the invention.

Users may also include one or more of the same or different custodians or administrators. A custodian may be a party who is responsible for verifying the integrity of the information contained in the system (e.g., IDDEX Corp). An administrator may be a party with the ability to oversee the work and access to the system by other users of the system.

Figure 2:
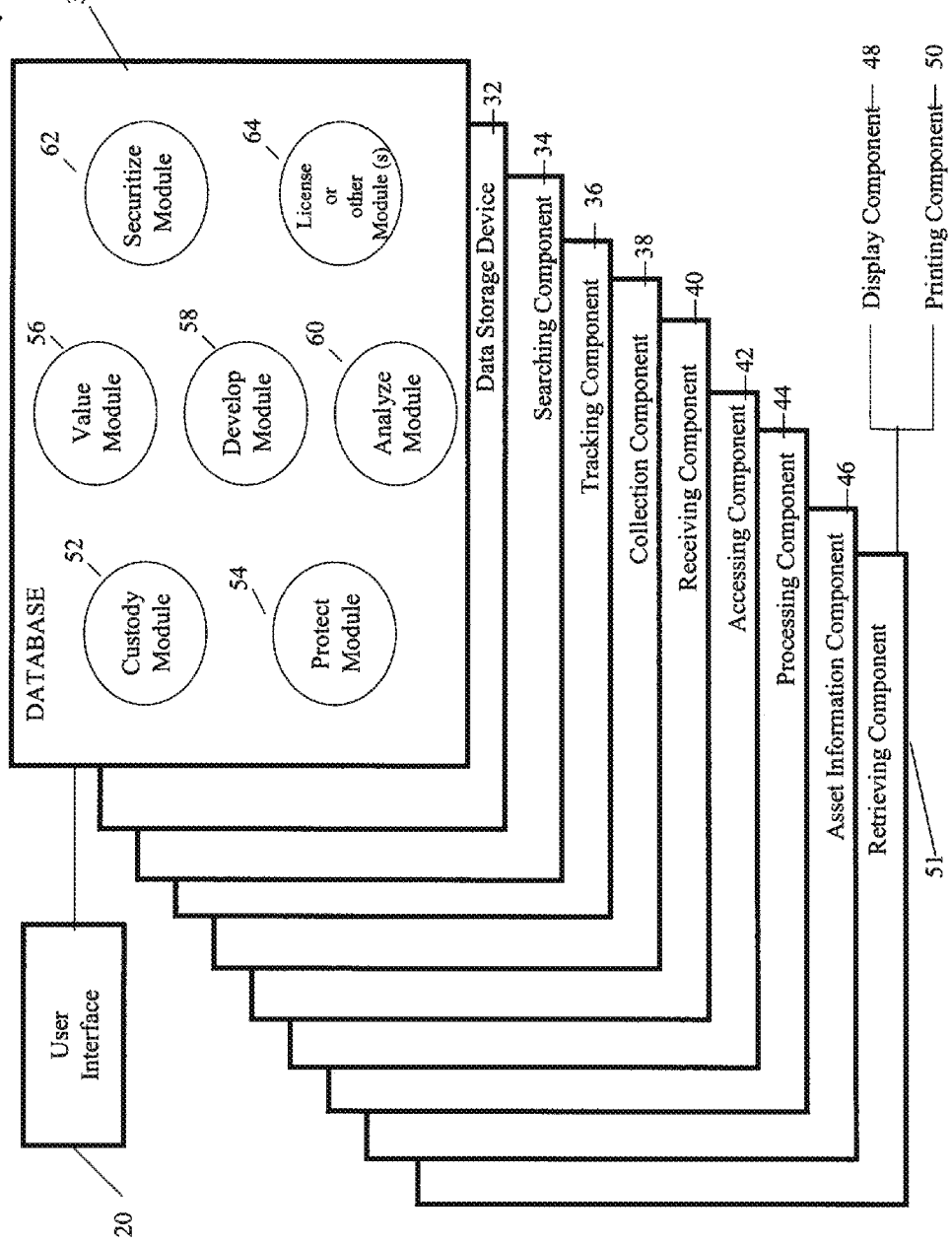
FIG. 2 illustrates system architecture in accordance with an exemplary embodiment of the claimed invention, where the intangible asset management system is a standalone computer system having user interface, which allows a user to at least enter, view, store and edit some or all of the intangible asset information in one or more modules of the database.

An exemplary embodiment of the computer system architecture is illustrated in FIG. 2. The exemplary system architecture may be used to effectuate any one or more aspects of the storing, managing, disseminating and sharing intangible asset information.

Some components in the intangible asset management system (10 in FIGS. 2-4) that are employed in the architecture include one or more databases (30), and one or more users interfaces (20). Database hardware and software have been developed for access by users through personal computers, mainframes, and other processor-based devices. Users may access and view intangible information stored locally on hard drives, CD-ROMs, stored on network storage devices through a local area network, or stored on remote database systems through one or more disparate network paths (e.g., the Internet). The database is configured to be protected from access by unauthorized users (e.g., hackers, viruses, worms, spy ware, etc.).

Figure 4:
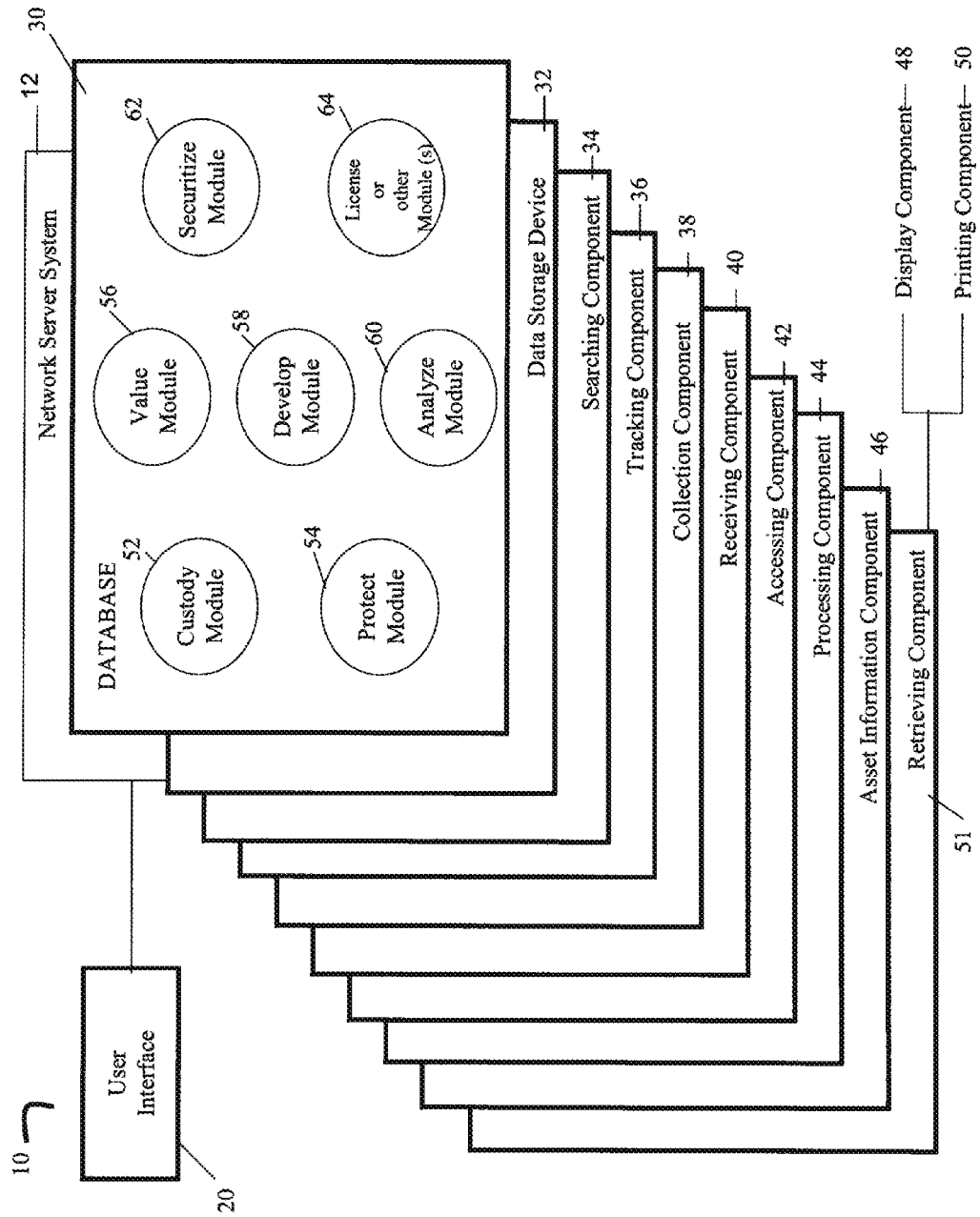
FIG. 4 illustrates system architecture in accordance with an exemplary embodiment of the claimed invention, where the intangible asset management system comprises a network-based system having a server which allows multiple users to access the database and enter, view, edit, save and/or store some or all of the intangible asset information from one or more modules of the database.

Now referring to FIGS. 2 and 4, user interface 20 may include one or more display devices (e.g., CRT, LCD, or other known displays) or other output devices (e.g., printer, etc.), and one or more input devices (e.g., keyboard, mouse, stylus, touch screen interface, or other known input mechanisms) for facilitating interaction of a user with the system via user interface 20. As illustrated, user interface 20 may be directly coupled to database 30, or directly coupled to a network server system (12 in FIG. 4).

In accordance with an exemplary embodiment of the claimed invention, one or more user interfaces are provided as part of (or in conjunction with) the illustrated systems to permit users to interact with the systems. The user interface device may be implemented as a graphical user interface (GUI) containing a display or the like, or may be a link to other user input/output devices known in the art. Individual ones of a plurality of devices (e.g., network/stand-alone computers, personal digital assistants (PDAs), WebTV (or other Internet-only) terminals, set-top boxes, cellular phones, screen phones, pagers, blackberry, peer/non-peer technologies, kiosks, or other known (wired or wireless) communication devices, etc.) may similarly be used to execute one or more computer programs (e.g., universal Internet browser programs, dedicated interface programs, etc.) to allow users to interface with the systems in the manner described.

Database (30) may be any one or more of the known storage devices or systems (e.g., Random Access Memory (RAM), Read Only Memory (ROM), hard disk drive (HDD), floppy drive, zip drive, compact disk-ROM, DVD, bubble memory, redundant array of independent disks (RAID), network accessible storage (NAS) systems, storage area network (SAN) systems, etc.), may also be one or more memory devices embedded within a CPU, or shared with one or more of the other components, and may be deployed locally or remotely relative to one or more components interacting with the memory or one or more modules.

In the stand-alone system as exemplary shown in FIG. 2, database 30 may include data storage device 32, a collection component 38 for collecting information from users or other computers into centralized database 30, a tracking component 36 for tracking information received and entered, a search component 34 to search information in the database or other databases, a receiving component 40 to receive a specific query from a user interface 20, and an accessing component 42 to access centralized database 30. Receiving component 40 is programmed for receiving a specific query from one of a plurality of users. Database 30 further includes a processing component 44 for searching and processing received queries against data storage device 32 containing a variety of information collected by collection component 34.

An intangible asset information fulfillment component 46, located in database downloads the requested information and sends it to the user or plurality of users in the order in which the requests were received by receiving component 40 or stores it in the data storage device 32. Intangible asset information fulfillment component 46 downloads the information after the information is retrieved from data storage device 32 by a retrieving component 51. Retrieving component 51 retrieves, downloads and sends information to user interface 20 based on a query received from user interface 20.

Retrieving component 51 further includes a display component 48 configured to download information to be displayed on a user interface 20 and a printing component 50 configured to print information. Retrieving component 51 generates various reports requested by the user 20.

In various embodiments, to help users start the process of identifying intangibles, the management system comprises a routine that will search for their affiliated companies and intellectual holding companies and then search for all of these with the USPTO, foreign, international, or multi-national patent publications (e.g., issued patents or equivalents, published patent applications, statutory invention registrations, abstracts, etc.), including Japanese, Patent Cooperation Treaty (PCT), and European Convention patent publications, as well as other related information (e.g., technical publications, sequence listings, file histories, government records, public notices, etc.) that may be associated or otherwise pertinent to such intangible. This information will be used to further populate the database. The collected data can be collected utilizing the collection component and associated them with one or more entities and/or credit ratings.

In an exemplary embodiment, system 10 includes an administrative component (not shown) that allows the administrator to set security levels, provide user names and passwords, run hashing algorithms, check vanity identifiers, GSIN numbers, message digests, and facilitate other administrative functions. The system administrator may be responsible for access and security of the intangible asset management system.

In an exemplary embodiment, database 30 is divided into seven different modules including a innovate module 52, protect module 54, value module 56, Collaborate Module 58, manage module 60, securitize module 62, and/or license or other module 64. These modules within database 30 are interconnected to update and retrieve the information as required, to cater to the user, and/or administrator responsible for access and security of the intangible asset management system.

Figure 3:
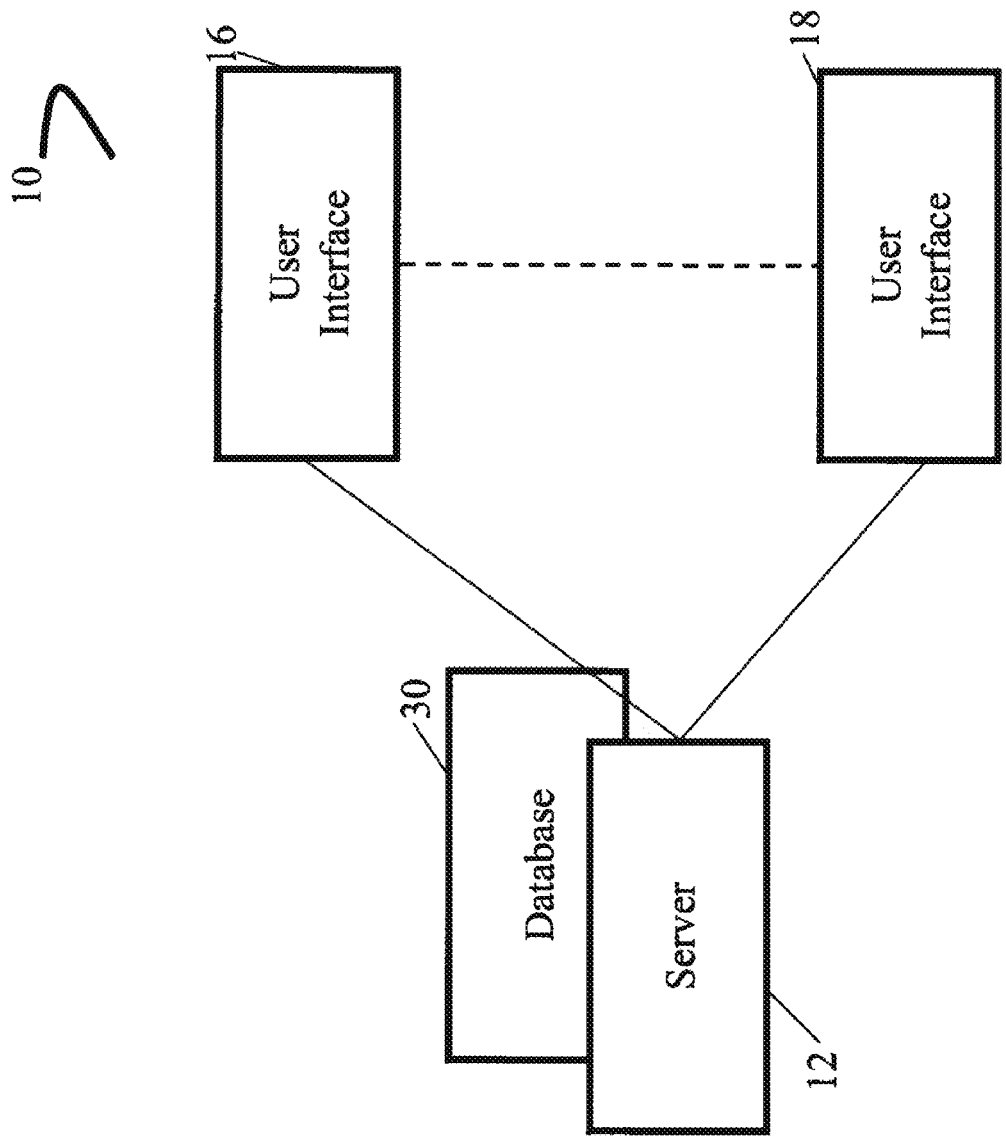
FIG. 3 illustrates system architecture in accordance with an exemplary embodiment of the claimed invention, where the intangible asset management system is a network based system having a database for the one or more modules, a network based server and two or more user interface computers, which allows each user to at least enter, view, edit, and/or print some or all of the intangible asset information from one or more modules of the database which is then stored in the database or in the user's computer.

FIG. 3 is a simplified block diagram of the intangible asset management system 10 in accordance with an exemplary embodiment of the claimed invention, which in this figure, is a network based system having network server 12 coupled to database 30 and at least two user interfaces 16 and 18 coupled to the network server. The computer network may take any wired/wireless form of known connective technology (e.g., corporate or individual LAN, enterprise WAN, intranet, Internet, Virtual Private Network (VPN), combinations of network systems, etc.) to allow network server 12 provide local/remote information and control data to/from other locations (e.g., other remote database servers, remote databases, network servers/user interfaces, etc.). In accordance with an aspect of the claimed invention, network server 12 may be serving one or more users over a collection of remote and disparate networks (e.g., Internet, intranet, VPN, etc.).

In accordance with an exemplary embodiment of the claimed invention, the intangible asset management system 10 includes computers as the user interface 16 and 18, which have web browsers that are accessible to the users via the Internet. The network server 12 can be coupled to the Internet through many interfaces including a local area network (LAN) or a wider area network (WAN), dial-up connection, cable or DSL modems or special high-speed ISDN lines.

FIG. 3 shows a configuration of database 30 coupled to server system 12 in accordance with an exemplary embodiment of the claimed invention, which are then coupled to two separate user interfaces 16 and 18. In one embodiment, network server 12, database 30, and/or user interfaces 16 and 18 may include one or more central processing units used to provide processing of input/output data between server 12, and user interfaces 16 and 18. The server and/or user interfaces may utilize any known processor or processor-based system that typically executes one or more executable instructions or programs stored in the one or more (local or remote) memory devices (or other articles of manufacture).

In accordance with an exemplary embodiment of the claimed invention, the intangible asset, component intangibles, and/or intangible asset information is stored in a central database and/or in one or more remote database systems. The different information may be stored as a continuous set of data, segmented to form a contiguous whole, or separated into different segments to reside in and among one or more server databases, as well as partitioned for storage in one or more files to achieve efficiencies in storage, access, and processing of data. The stored information may be stored in one or more database structures for use in their raw, natural, or unmodified data states (e.g., as delivered from the data source). Data may be stored in a variety of formats including document types such as PDF, RTF, TIF, HTML, Word, WordPerfect, Excel, etc.

In various embodiments, intangible assets, component intangible and/or intangible asset information, may include one or more specific references, data fields, links, or other indications of subsequent history of the item or document. The subsequent history information when used in connection with patent information, for example, may refer to the existence of pending or completed reexamination, reissue, opposition, arbitration, litigation, or other proceedings. Where documentation of the subsequent history (e.g., reexamination certificate, file history, complaint, notice, etc.) is available (e.g., from the database or a remote database, etc.), links or other identification of the resource location of the documentation may be included in the subsequent history information to allow the documentation to be easily accessed, retrieved, and/or output for use (e.g., viewing, printing, etc.) by one or more users.

Figure 5:
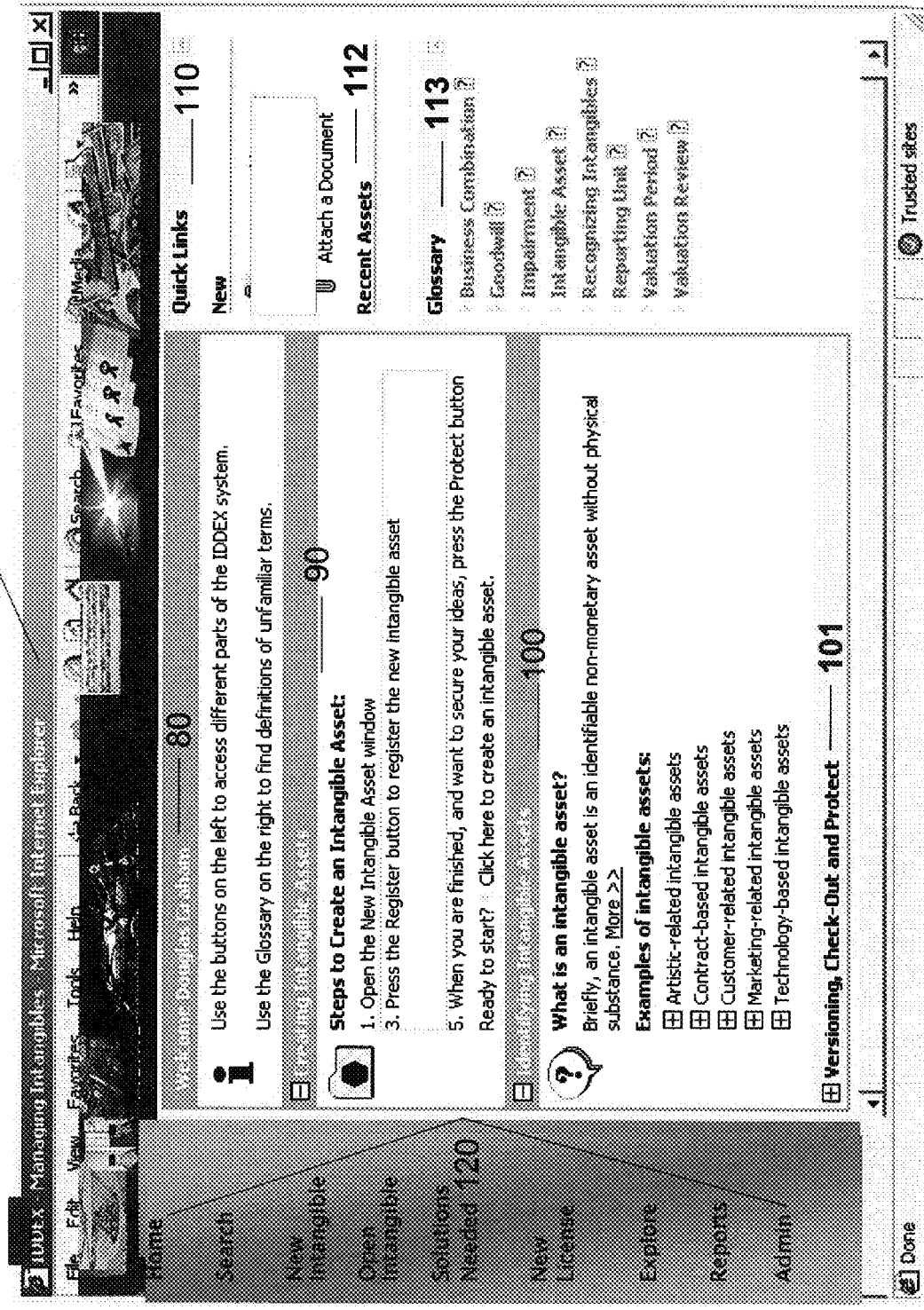
FIG. 5 is an exemplary embodiment of a typical user interface welcome screen of the intangible asset management system, which includes selections where the user can enter information about a new intangible asset, open, view and edit an existing intangible asset, and register a new intangible asset. The user also has an option to link an intangible with another intangible or document, use the glossary for unfamiliar terms or launch other modules of the intangible asset managements system (e.g., solutions needed, reports, etc.)

FIG. 5 is an exemplary embodiment of the typical user interface welcome page 80 of the intangible asset management system that may be displayed when a user logs on the system. The welcome page allows the user to access different parts of the system 120 (e.g., innovate, protect, Collaborate Modules, etc.). The welcome page also has a glossary for different terms 113 and allows quick links to different intangible assets and documents 110. At the welcome page, the user has the option to create and register a new intangible asset 90, and/or protect the new intangible asset. To encourage innovation, the welcome page also allows a user to identify the various types of intangible assets 100 and select various expansion bars and links to view examples of intangible assets. At the welcome page, the user can view various versions of an intangible and its history as well as documents checked out by users 101. At 70 on the welcome page the user can have access to various tool bars and the Internet.

Innovate Module: In various embodiments, the intangible asset management systems and methods comprise an innovate module. The innovate module, in general, keeps track of the intangible and any changes made to the intangible. The innovate module allows the user to enter, view, and edit and save some or all of the intangible asset information in the database and insures security for the intangible asset, verifies ownership and conducts transactions for that particular intangible as instructed by the server or user.

The innovate module keeps electronic records for every intangible asset, component intangible asset or intangible asset information populated in the database. In various embodiments, the database is kept in the innovate module of a trusted third party. A company's intangibles, in various embodiments, can be kept in a highly secure, central electronic repository for all of a company's intangible assets, where the intangible asset, component intangible asset or intangible asset information can be accessed, and documents can be submitted, for example, through an internet based ASP (Application Service Provider) service from any location. This allows a user to identify, inventory and store all pertinent information related to their intangibles.

In various embodiments, the innovate module allows many layers of protection for the intangible asset, component intangible and intangible asset information including a time stamped message digest of their documents that establishes an irrefutable record of what the user sent to the trusted third party for innovate and when they sent it. In various embodiments, the time stamp uses a rack mounted unit that is calibrated against the atomic clock and is designed to protect its integrity. If its integrity is ever breached it disables itself.

A message digest helps verify that a communication has not been altered because altering the communication would change the digest. A message digest includes a fixed-length output from a hash function, (e.g. MDC, MD1, MD2, MD3, MD4, MD5 algorithms). In various embodiments, the systems and methods have a routine to run a message digest for each intangible submitted by a particular user. A message digest is then created for all information submitted by the user, and an ultimate message digest is created that provides an attestation trail for the centralized database. The message digest for each asset, all intangible assets for a company, or an ultimate message digest for the entire database may be sent to a trusted third party, entity, and/or newspaper.

In various embodiments, the intangible asset information comprises initial, essential, and non-changing metadata for each intangible asset, which is processed with a message digest algorithm to provide an attestation trail for each intangible asset.

In various embodiments, the intangible asset management system processes a first message digest with a second message digest to produce a third message digest for the intangible asset. The system then aggregates the first, second and third message digests to form a ultimate message digest that provides an attestation trail for the centralized database. The ultimate message digest can be sent to the user, trusted third party, entity, and/or newspaper. Thus, a message digest can be created for an individual intangible asset, portfolio of intangible assets, component intangible or intangible asset information or for the whole database of the user or users.

In various embodiments, the message digest is permanently stored in one or more databases and typically the user will store the intangible asset, component intangible or intangible asset information in a separate location or database. This greatly strengthens the integrity of the documents as a clear attestation trail can be provided. Particularly, for example, in an interference proceeding, where the date of invention is in question.

In addition the company may assert discretionary access controls that limit access to the intangible asset, component intangible and/or intangible asset information. The system also maintains an audit trail of every access to every document. Stored with each document is the essential metadata that is unchanging for every intangible asset. Metadata for an intangible may include any suitable information relating to the intangible. For example, metadata may include indicators of the author, the owner, values, the meaning, and dates of use, sale, and public disclosure of the intangible.

In various embodiments, the intangible asset, component intangible and/or intangible asset information itself and the associated metadata is time stamped and the message digest is associated with it. In various embodiments, the message digest is a small file that is enough to establish an incontrovertible evidence trail that the user had created a certain document at a certain time (and the ideas described within it), however, the original cannot be re-created. In this way, there is virtually no risk of a security breach.

In various embodiments, the message digest remains on the database (and is replicated to another database (e.g., public database) as incontrovertible evidence of the time of invention and the inventor. Although this message digest can be used at any time to establish beyond reasonable doubt that the intangible asset, component intangible and/or intangible asset information the user holds in innovate is the same as that being produced in evidence, it cannot be used to reconstruct the document itself and thus full security is maintained.

In various embodiments, for additional security, users can elect to encrypt some or all of their documents with keys being held at a secure offshore database. In addition to providing protection from technology based attacks, it provides another layer of legal protection as any hostile party attempting to gain access to the documents through legal means (such as frivolous intellectual property litigation which is often started for discovery rather than an ultimate judgment) would have to deal with a much more privacy conscious offshore jurisdiction.

In various embodiments, for additional security, the user can elect not to put some or all of their intangible asset, component intangible and/or intangible asset information in the central database in the innovate of a trusted third party, but instead, the user can run the message digest on their local system and only deposit the resulting message digest in the central database in the innovate of the trusted third party.

FIG. 25 is an exemplary flow diagram of the intangible digest creation, where a message digest is created for the intangible asset 902, the client 903 and/or for the database of the trusted third party 904. A message digest is created for each intangible 902, component intangible and/or intangible asset information by a programmed algorithm (e.g., authentication protocol) executed by the computer that results in a digest (including non-essential and essential metadata) for the intangible. A separate digest is created for the essential metadata associated with the intangible and the two are combined to create a final message digest, which is then time stamped based on the atomic clock. For the client's database 903, a message digest is created for each intangible, component intangible and/or intangible asset information by a programmed algorithm (e.g., authentication protocol) executed by the computer that results in a digest (including non-essential and essential metadata, GSIN, etc.) for the intangible. A separate digest is created for the essential metadata, and GSIN associated with an intangible. The two are combined and a final message digest is created, which is then time stamped based on the atomic clock. A snapshot of the client's message digest is also created, which can also be time stamped based on the atomic clock.

The integrity of the trusted third party's database (e.g. IDDEX Corp) is also assured by a separate digest ran for its database 904. All client snapshots and client digests received by IDDEX Corp are stored in the IDDEX Corp database and a programmed message digest algorithm is executed by the computer that results in a IDDEX Corp digest created for one or more client(s) or the entire database, which is time stamped based on the atomic clock. In various embodiments, the digest is written on a WORM (write once read mainly) drive and the digest is sent for publication on a website (daily, weekly, monthly, yearly, etc.) and/or in a newspaper. In this way, the integrity of the client database, third party database is assured and the authenticity maintained.

In various embodiments, when an intangible is registered, the intangible is directed to another user who acts as one or more witnesses for the intangible and digitally signs the intangible record. Once an intangible is made final, the intangible, in various embodiments, cannot be subsequently altered.

In various embodiments, the intangible may contain a unique identifier ISID or GSIN (e.g., a serial number, worldwide identification number) and/or vanity identifier for that intangible. The unique identifier for the intangible may be a simple sequentially assigned serial number or may be any other desirable unique identifier. The user may assign the ISID or GSIN or the system may do so automatically. By using a sequentially assigned serial number, a rough indicator of the sequence of creation of intangible can be determined from the order of the unique identifiers. The time stamp may be used to determine the time of creation of an intangible. The time stamp may indicate date and time, date only, or any other suitable time indicator, and may use any desired level of precision (e.g., accurate to the second, minute, hour, day, month, or year) or calibrated to the atomic clock. Additional data associated with the intangible may be the creator of the intangible by name, a number to identify the creator, a link to the user record of the creator, or any other suitable indicator of the creator.

In various embodiments, a vanity identifier can also be provided for each intangible. A vanity identifier is a particular word or number that a user would like to use to identify their intangible. When the ISID is allocated first, the routine in the intangible asset management system will check to see if a Vanity ISID has already been allocated. The system may also charge a user to use particular vanity identifiers.

Figure 6:
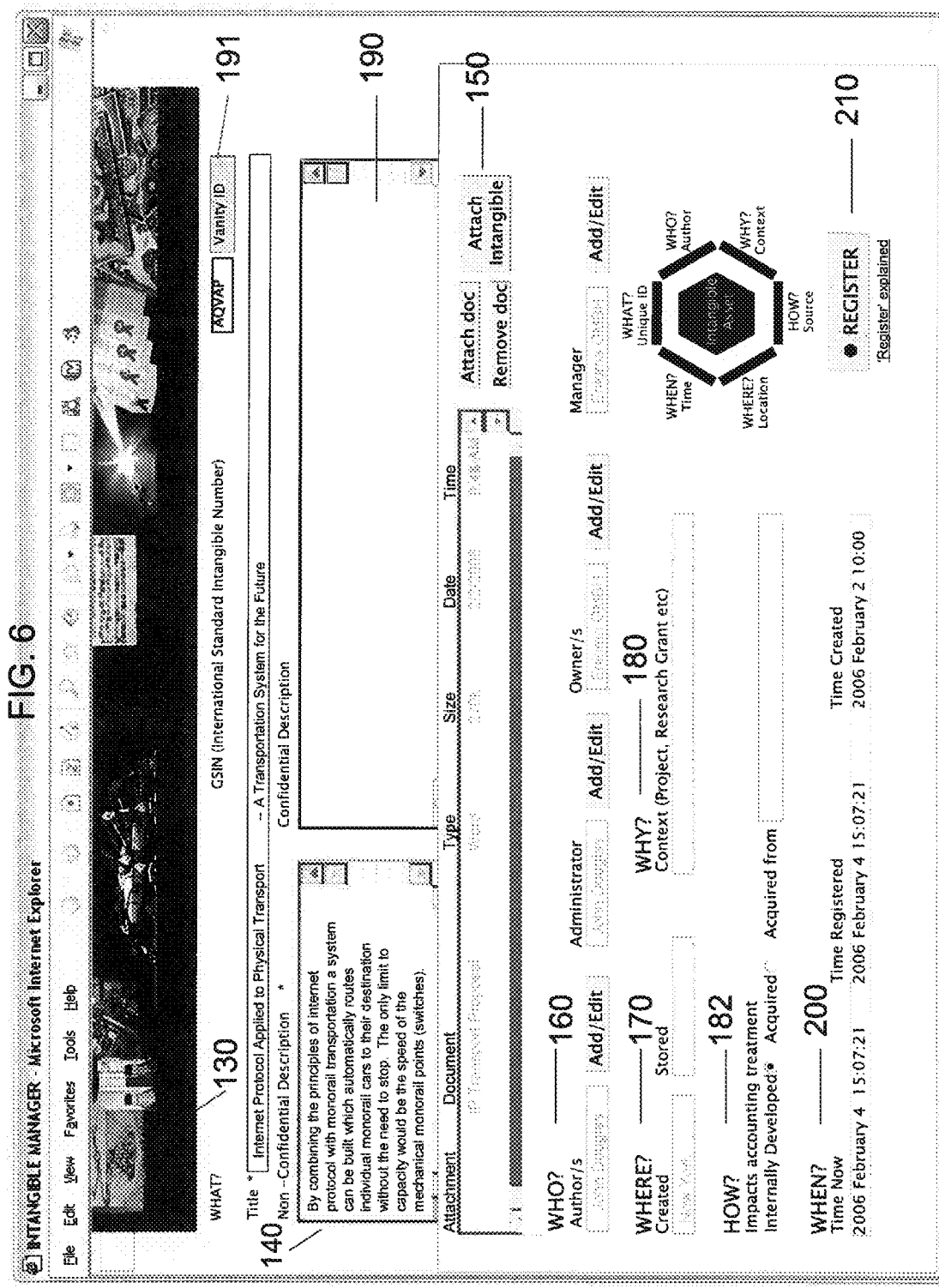
FIG. 6 is an exemplary embodiment of the user interface for the innovate module of the intangible asset management system of the claimed invention, which includes fields and selections to enter the title of the asset, non-confidential and confidential information about the intangible asset as well as tool bars to attach documents including the intangible asset. The user interface also has fields to add and edit authors related to the intangible asset and to enter data as to how the intangible asset was created and when it was updated. The system will automatically or the user can manually issue an international standard intangible asset number (GSIN or ISID) and/or vanity identifier to register the new entry in the database, the user will then be directed to another screen in the innovate module. This new intangible asset can be stored and registered in the database.

Now referring to FIG. 6, it shows one embodiment of a web page interface for the innovate module. When the user opens an intangible asset on the welcome page shown in FIG. 5, the user will be directed to the innovate module (tab highlighted 130). The innovate module includes fields and selections to create a new intangible asset. The user can enter the title of the asset and include different levels of non-confidential description 140 and confidential description 190 about the intangible, which allows other users selected visibility to the confidential description (envelope setting selected in the protect module FIGS. 8, 260 and 270). The description settings will allow certain users access and exclude other. Documents related to the intangible description including other intangibles, component intangible and/or other intangible asset information can be attached and removed 150. The innovate page allows fields for the user to enter 160 the authors of the intangible, administrators, owners, and/or managers, where the intangible asset was created 170 (because law may vary by jurisdiction), why the intangible was created 180, how the intangible asset was created (e.g., internally developed, acquired from or acquired) 182, and when the intangible was created 200 including time created, time now and the time the asset is registered 210 in the database. These fields may be manually or automatically populated. At the moment the intangible is registered, a message digest is created for the intangible and a time and date stamp. In various embodiments, the system will automatically generate an international standard intangible number ISID and issue a vanity identifier number 191 that uniquely identifies the intangible.

Figure 7:
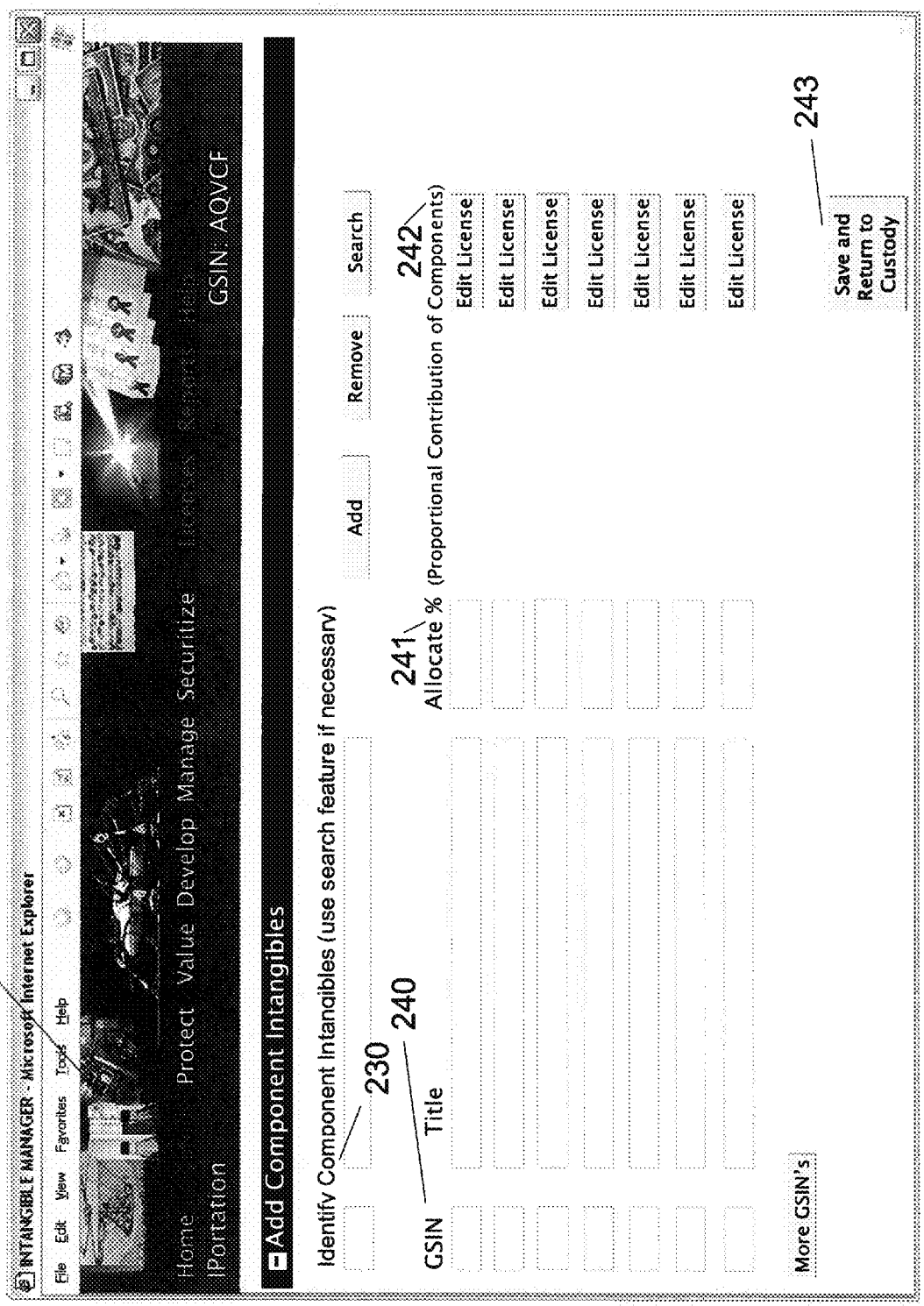
FIG. 7 is an exemplary embodiment of the user interface that allows users to combine innovations to form new innovations, portfolios and projects and to track proportional contribution.

Once an intangible asset is registered, the user will be directed to the page displayed in FIG. 7, which illustrates one embodiment of the user interface of the innovate module. The user can add, remove, or search the database for a component intangible 230. Certain users (e.g., manager, supervisor, GC, IP counsel, etc.) are allowed to view the intangible asset and allocate the percent contribution by author/inventor to the asset 241. The system allows users to enter into a license agreement between authors/inventors 242. This may potentially avoid disputes as to arguments of unauthorized use of an intangible. The user has the option of saving the entry and returning 243 to the innovate screen shown in FIG. 6.

The GSIN and vanity identifiers can be issued many ways. FIG. 24 illustrate an exemplary flow diagram of the creation of an international standard intangible asset number (ISID, GSIN) 900 or vanity identifier 901 to associate the intangible asset or the component intangible asset with the particular number. In the innovate module, the use enters the intangible, the system will automatically issue a GSIN or ISID and determine if the number is reserved on the trusted third party's list, if not, the system will check if the GSIN or ISID is on the client's reserved list, if not the system will issue the next GSIN, save it as the last number and add it to the client reserve list. The user also has the option of saving the GSIN in the license module. In this way, one unique GSIN is issued for the intangible. For vanity identifiers, the pathway is shown 901, where an inquiry is prompted by the user's GSIN, if the vanity identifier is not on the clients reserved list, the system will issue the vanity identifier and add it to the client's reserve list for subsequent use.

Ability to combine innovations: New innovation should extend out from the current frontiers of knowledge. It currently, at best, only extends from the current frontiers of published knowledge. This fact alone accounts for over $300 Billion in wasted R&D effort annually. One of the processes through which innovation evolves is through extension of an existing innovation (or innovations) into a new innovation. For example, one user/inventor can view an existing patent (e.g., a switching technique for monorails) and combine it with another innovation (e.g., internet protocols to send and receive messages) to create a new intangible asset (e.g., automatic switching of monorails utilizing internet protocol based technology to direct the monorail). The system is able to track this process and the underlying economics so that the organization can not only facilitate and track impromptu and organized projects that derive from existing innovations but also to build an econometric model of innovation throughout the enterprise and even extend the model to their partners (suppliers and consumers of innovation as well as advisors) beyond the enterprise. FIG. 7 is an exemplary embodiment of the user interface of the innovate module in which certain users are allowed to view the intangible asset and allocate the percent contribution by author/inventor to the asset and/or combine it with another intangible asset to create a new intangible asset. Another method of creating a portfolio is to conduct a search and the results of that search, or a selected subset of the search results, can be either added to an existing portfolio or be used to create a new one.

This ability to combine intellectual assets is particularly important as they are unique amongst asset classes in that they are non-depleting assets. Normally if an asset such as a physical asset is being deployed it is generating just one set of revenues and cannot generate any more revenues at that time. In the process they typically lose some value (depreciation). Intellectual assets on the other hand can be deployed in many simultaneous uses in different industries, geographies and even applications all generating revenues and each additional use usually increases value (sometimes exponentially as in the Network Effect) rather than depleting value. The system allows this combination in a manner parallel to object oriented approaches in which some properties of the child innovation can be inherited by the parent innovation whereas other properties will not. For instance it may be a third party who thinks of bringing two projects together or it could be one of the innovators or it could even be one innovator combining two or more of their own innovations to create a new innovation. When innovations are combined the Innovation Manager System allows the user to allocate the value of each contribution on a percentage basis. This is of value to capture this recognition of relative value at each point that innovations are combined, to contribute to the econometric model being built of the enterprise, and to be able to generate formal or informal licenses documenting the combination. Users can create custom licenses or can use an automatically created default license that uses the percentage contribution estimate the royalty percentage in an unlimited non-exclusive license. Of course one child innovation can be in any number of parent innovations as the assets are 'non-depleting'. These combinations can have several instances: A new innovation as discussed above

- A new project that creates a convenient and inexpensive vehicle that still allows for economic tracking and recognition of contribution and share of success in the same way that a new company would thus avoiding the need to create new companies as a vehicle for joint ventures
- A new portfolio that can be used for organizational or marketing purposes
- An innovation can be combined with a license to create new functionality such as 'License Offered' or 'Innovation Wanted' in the manner described in the section on access controls.

Protect Module: The protect module, in general, facilitates the appropriate protection for the intangible asset, component intangible and/or intangible asset information. It allows a user to enter, view, edit, and save drafts and/or register intangible asset information in the database and seek the various types of intangible asset protection that are available (e.g., patent, trademark, service mark, trade secret, trade dress, copyright, etc.). The protect module not only allows a user to register the intangible asset, component intangible, and/or intangible asset information, but also allows an authorized users to set security levels both internally (within the entity itself) and externally (to outside entities) for both the less or non-confidential intangible information (e.g., the title and short description referred to as the 'envelope') and (usually higher levels of security) for the confidential component of the intangible information (e.g., license terms and royalties paid). The protect module will also keep unauthorized users from gaining access to the database.

In various embodiments, the protect module incorporates best practices on legal protection and leads users onto the first steps in securing legal protection for the intangible whether it be through copyright, trademark, service mark, patent, or trade secret. In addition, it provides for options related to the use of intellectual property holding companies, and allows the user to identify privileged information (any such records are clearly identified on displays and reports, or in communication related to a privileged intangible the user is restricted to sending to the general counsel). In various embodiments, the user has options of electing to encrypt an intangible record with an offshore server holding the key, which in addition to providing the additional technological protection also adds a level of additional legal protection of the confidentiality by bringing in a jurisdiction with very strict privacy laws.

In various embodiments, the protect module is configured to allow a user to encrypt data related to one or more intangible assets and store a digital certificate required to access the data on a server hosted in one or more of the same or different jurisdictions. In various embodiments, the protect module is configured to copy all of the intangible asset information of the entity to keep a backup copy of all the intangibles stored in the database. In various embodiments, the protect module is configured to transfer ownership and other rights of an intangible asset to a second user which is an intellectual property holding company. The transfer can be as a result of an asset purchase, in which the seller of the intangible registered in the database, will give authorization, for example, to the trusted third party to transfer title to the buyer of the intangible. The transaction can be done on paper or electronically.

In various embodiments, the system allows the option (e.g., through a simple ActiveX control) that will implement the algorithm on the target record for the intangible. In addition, the system allows the user to record influences on the innovation over existing prior art. This helps, for example, the GC, VP, and/or technology transfer unit to better manage the intangible because the prior art is characterized and the prior art is avoided or used to potential license the technology in.

In various embodiments, the system allows various trust levels to be allotted to the user and/or intangible. The trust levels can be set, for example, by the manager, network administrator (e.g., trusted third party), or other authorized user. In various embodiments, the protect module is configured to calculate a trust score for the user and grant or deny access to various levels of the intangible asset information contained in the centralized database based on the user's trust score. For example, a user's trust score may be high enough based on the user's membership to a particular organization, in which case, the user will be allowed access to various modules, various confidential envelopes and/or various user levels of the database. A competitor may be denied access to various modules (e.g. solutions needed module), various levels of the database, various confidential envelopes, or the entire database because the competitor competes with an already existing user.

In various embodiments, the system will allow users to build their trust levels by joining a trust community, which allows users to build trust in their transactions with other users and know what level of trust they are dealing with and thus how much of their intellectual property they can safely reveal to other users. In various embodiments, a user can increase their trust level and thus access to intangible asset information, either as an individual or an organization, in several ways:

They can sign the a NDA/CDA;
They can sign an enhanced NDA at the request of a potential trading partner;
They can post a bond that we will make available through an arrangement with an insurance company partner;
They can post funds into escrow with a trusted third party;
They can build their trust level through a history of transactions conducted with integrity.

In various embodiments, the intangible asset management system includes a security module that gradually establishes a community of trust in which the greater the trust the individual or organization has been able to establish the greater the access that user will enjoy. The security module removes the need for continual signing of CDA/NDA's between various users. Instead there is one CDA/NDA that is binding for the whole community and each member agrees to abide by a set of rules while at the same time the trusted third party provides an audit trail of all activity, viewing of intangible documents and conversations between members. This is particularly important for trade secrets but applies for all intellectual property types.

Figure 8:
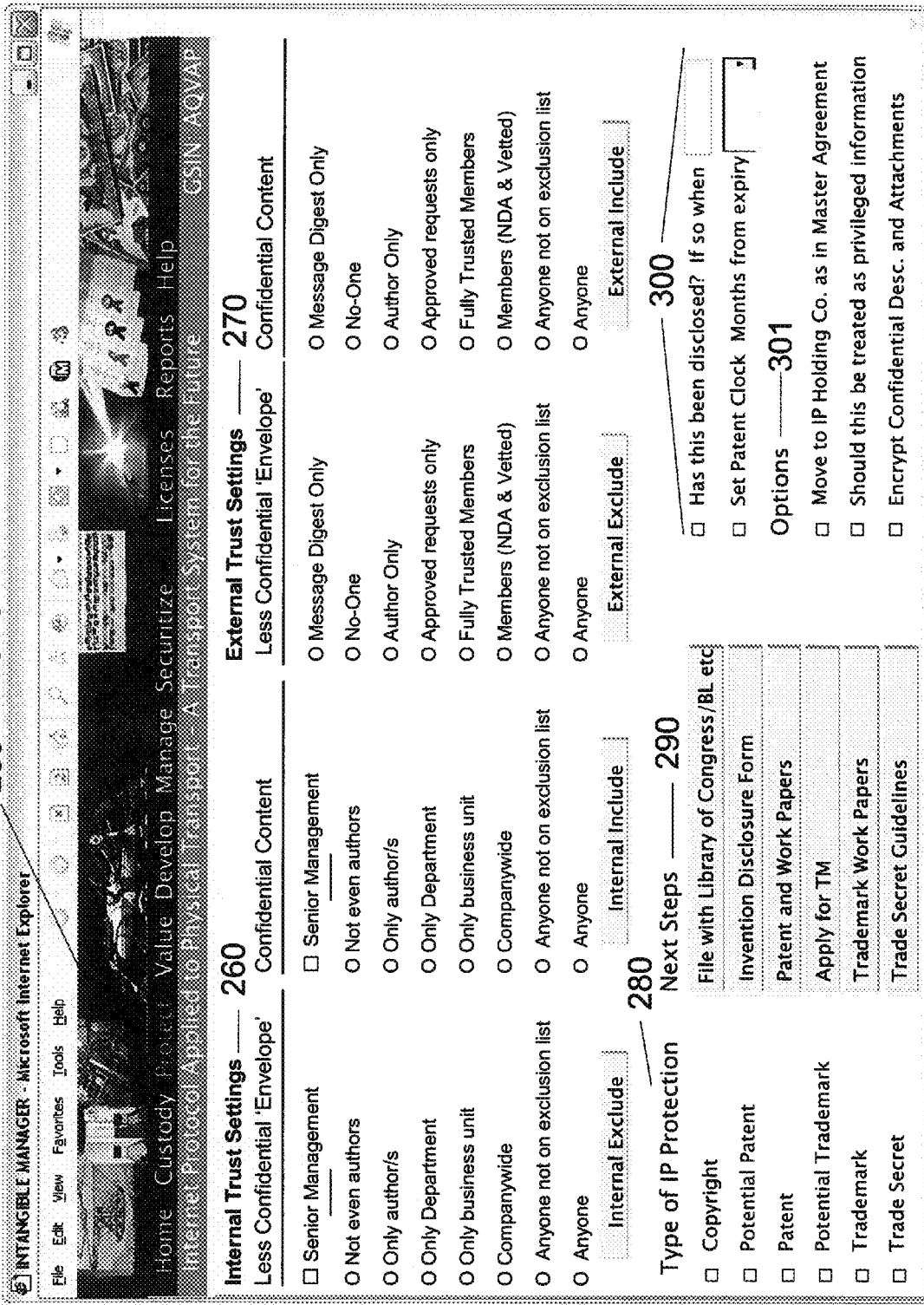
FIG. 8 is an exemplary embodiment of the user interface for the protect module of the intangible asset management system of the claimed invention, which allows a user, in this example, to view patent or copyright records or works in progress for the intangible asset.

Referring to FIG. 8, after entering data into the innovate module, the user can proceed to the protect module (an exemplary embodiment tab highlighted at 250 in FIG. 8). The protect module has fields for the user to select confidentiality levels associated with the intangible asset. For example, internal 260 and external trust settings 270 for various users can be set for the less confidential and confidential envelopes relating to an intangible.

Only selected users will have access to certain portions of the confidential or less confidential envelopes (e.g., senior management, selected authors, departments, business units, users not on the exclusion list, etc.) or the trust setting can be set so that any user registered in the database will have access. For external settings 270, the user may select that only the message digest can be viewed by no one, authors only, approved request only, fully trusted users, users subject to a CDA/NDA, anyone not on the exclusion list. For example, if the external confidential envelope is selected and it includes anyone, then the intangible information will be visible to any user. Likewise, if only the message digest is selected, then users will only be able to see the message digest. In the protect module, the user has the option of recommending what types of intellectual property protection to be selected 280, and select the future steps for the particular intangible asset 290 (e.g., whether filing it with the library of congress or filing out an invention disclosure form, file for a patent, trademark protection, or follow the trade secret guidelines). The user has the options to set the patent clock or patent alert 300 (which will notify the user whether or not a disclosure has been made or when some other deadline is approaching).

When alerts are employed, an alert generator can notify one or more users that a certain predetermined event is approaching for the particular intangible (e.g., deadline to file a patent, expiration of a patent, public disclosure, publication of a patent application, issuance of a patent, trademark or service mark, license exists or has expired, etc.). The alert generator may be used (alone or in conjunction with other modules) to access intangible information and notify one or more users of an approaching deadline (e.g., daily, weekly, monthly, etc.). In various embodiments, the alert generator can be programmed to notify selected users if an intangible is posted, or a solution needed is posted, or upon updated information concerning an intangible. The alert generator, for example, can be programmed to provide an alert to a user by sending an e-mail message, voice mail message, pager message, facsimile message, regular mail message, or other mechanism (or combination of such mechanisms) specified by the user.

In various embodiments, 301 the user can select various options to have the intangible asset moved to an intellectual property holding company, treat the information as privileged and confidential or encrypt the intangible asset description and attachments. Once the entries in the protect module are populated, depending which type of protection is selected in 280 and 290, the system will allow the user to take the next steps in applying for protection.

In accordance with an exemplary embodiment of the claimed invention, the user interface in the protect module of the intangible asset management system allows the user to apply for copyright protection and select which countries to do so. The user will have the option of automatically filing the documents electronically or returning to the protect module home screen to edit the entry. If the user selects the invention disclosure form toolbar, the user will be directed to the automatic invention disclosure form feature in the protect module which provides an invention disclosure form where system completes most of the information required and the user can simply review, edit and submit greatly simplifying a task that is important for the organization but tiresome for many inventors.

An exemplary embodiment of the user interface within the protect module page enables the user to select various patent records related to the intangible asset.

In various embodiments, once a user registers a trademark, the user will be directed to a web page of the protect module and be able either automatically register the trademark with one or more trademark offices or refer the trademark to internal or external counsel for registration save the draft. If the user selects, for example, the patent or trademark work papers tool bar button, the user has the option of selecting and viewing various patent and trademark applications or works in progress and reviewing their records. The user also has the option of returning to the protect module home screen.

If a user indicates that the registered intangible is a trade secret the user will be directed to a web page reminding the user of the trade secret guidelines that should be followed for the trade secret. All documents related to the trade secret will be automatically prominently labeled 'Trade Secret Keep Confidential' for any user that accesses the intangible. The trade secret will be included in the 'Exit Report' described below.

Value Module: In various embodiments, the intangible asset management system comprises a value module. Unlike prior art electronic notebooks, the value module of the intangible asset management system, allows a value to be allocated to the intangible asset, component intangible and/or intangible asset information, either automatically or manually. In various embodiments, the value module includes calculators that automatically calculate and/or fields for the user to enter the value for the intangible (e.g., cost-based, revenue based (DCF) or Black-Scholes based valuation, market value, estimated value, dynamic value, metrics of the entity, etc.). Black-Scholes value comprises a model of the varying value over time for the intangible. Revenue-based valuations are calculated for the intangible using the price/sales ratio, often simply abbreviated PSR.

In various embodiments, the valuation calculators provide the company with an inexpensive way to value their intangibles in real time or at least the strategically important intangibles (e.g., the intangibles being offered for license or sale). The system will also keep valuation histories for each intangible (e.g., earlier valuations, licensing histories, market trends, estimated future valuation, etc.).

In various embodiments, the system allows for various types of valuation that a company can utilize to maintain and report assets in compliance with Financial Standards Accounting Board (FASB) and The International Accounting Standards Board (IASB) rules. In various embodiments, the value for the intangible asset, component intangible and/or intangible asset information include one or more of the values below:

Ve: Estimated Value—estimated value using any methodology to value assets. Several estimates can exist for any intangible although only one is selected to be used in financial reporting (usually by the CFO or controller—usually one method being used consistently);

Vs: Symbiotic Value—the additional value an intangible adds to a combination with other intangibles;

Va: Actual Value—value from based on a sale or license;

Vr: Regressed Value—the value determined by estimating the value of the precursor intangibles (e.g., component intangibles) from one with an actual valuation (also known as recalculated value);

Fo: Optimism Factor—moving average of the actual values divided by the estimated values for any unit or individual;

Vc: Corrected Value—the original estimate adjusted by multiplying with the 'optimism factor; and Vf: Financial Value—this is the value selected by, for example, the CFO if multiple estimates exist. This may be by standardizing a valuation methodology or may be on a case by case basis for each intangible.

In various embodiments, a database of valuation benchmarks (e.g., lifetime value of a credit card subscriber values, value of a patent citation, trademark recognition values, etc.) are tracked from each valuation and aggregated across an industry providing the company or trusted third party with means, averages and standard deviations, which allow more accurate valuations and better estimate of the accuracy of the valuations. For example, one intangible may have several impacting benchmarks, this will allow for easy compliance with FASB 142 and IASB 38, and IFRS 3 which require revaluation of intangibles to determine if there has been an impairment of their value in subsequent years.

In various embodiments, the system and methods provided automates the burdensome process of tracking variables that impact the intangible asset valuation such as discount rate (e.g., a rate that is reduced during the initial period of the loan) that is used in the DCF formula. If this has changed in a subsequent year the system can automatically recalculate the new value. The intangible asset management system, in various embodiments, allows a trusted third party to give a certified valuation of the intangible asset, component intangible, and/or intangible asset information that is stored and tracked in the database.

Figure 9:
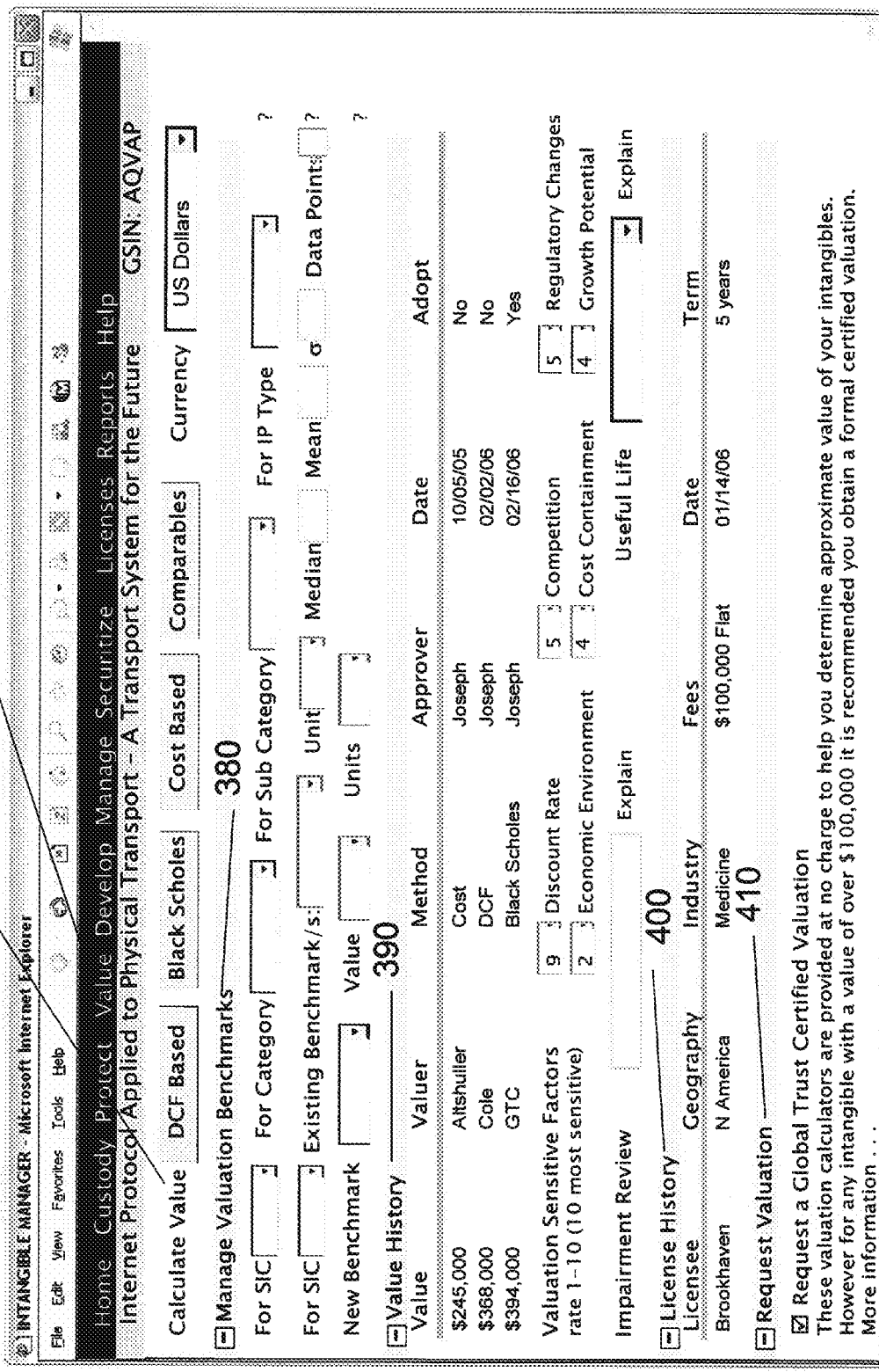
FIG. 9 is an exemplary embodiment of the user interface for the value module of the intangible asset management system of the claimed invention, which has fields for a user, in this example, to select a particular field for calculation of value for the intangible asset, and manage valuation benchmark for the intangibles to make a comparison on value performance as a benchmark. The user also has fields to look at the value and licensing history for the intangible asset and request valuation of the intangible asset from a third party. Once value information is automatically or manually entered in the system, the user will be directed to the value calculator screen as exemplary shown in FIG. 10.

Referring to FIG. 9, it shows an exemplary embodiment of the user interface for the value module of the intangible asset management system, where the value tab is in highlighted 360 when the user is in this module. The value module user interface has fields for a user, in this example, to select a particular calculation of value for the intangible asset. At 370, the user can select one or more tool bars for the value calculator (e.g., DCF based, Black Scholes, Cost based, comparables, type of currency, etc.). The user also has fields to manage valuation benchmarks for the intangible 380, for example, categorize the company's business by SIC number (number assigned to identify a business based on the type of business) or the type of intangible held. The user can also view how the intangible is performing and set new benchmarks. Fields and expansion bars are available to look at the value history for the intangible 390 as well as other metadata for the value (e.g., approver, date, adopt, etc.). Licensing history for the particular intangible is also available 400, where expansion bars allow the user to view metadata for the license (e.g., licensee, geographic location, industry, royalties/fees, dates and terms). This licensing information may be relevant to past, present and future valuations. The user also has the option to have the intangible asset, component intangible and/or intangible asset information valued by a trusted third party 410, where the intangible value can be certified. Once value information is automatically or manually entered into the system, the user will be directed to the value calculator screen shown in FIG. 10.

Figure 10:
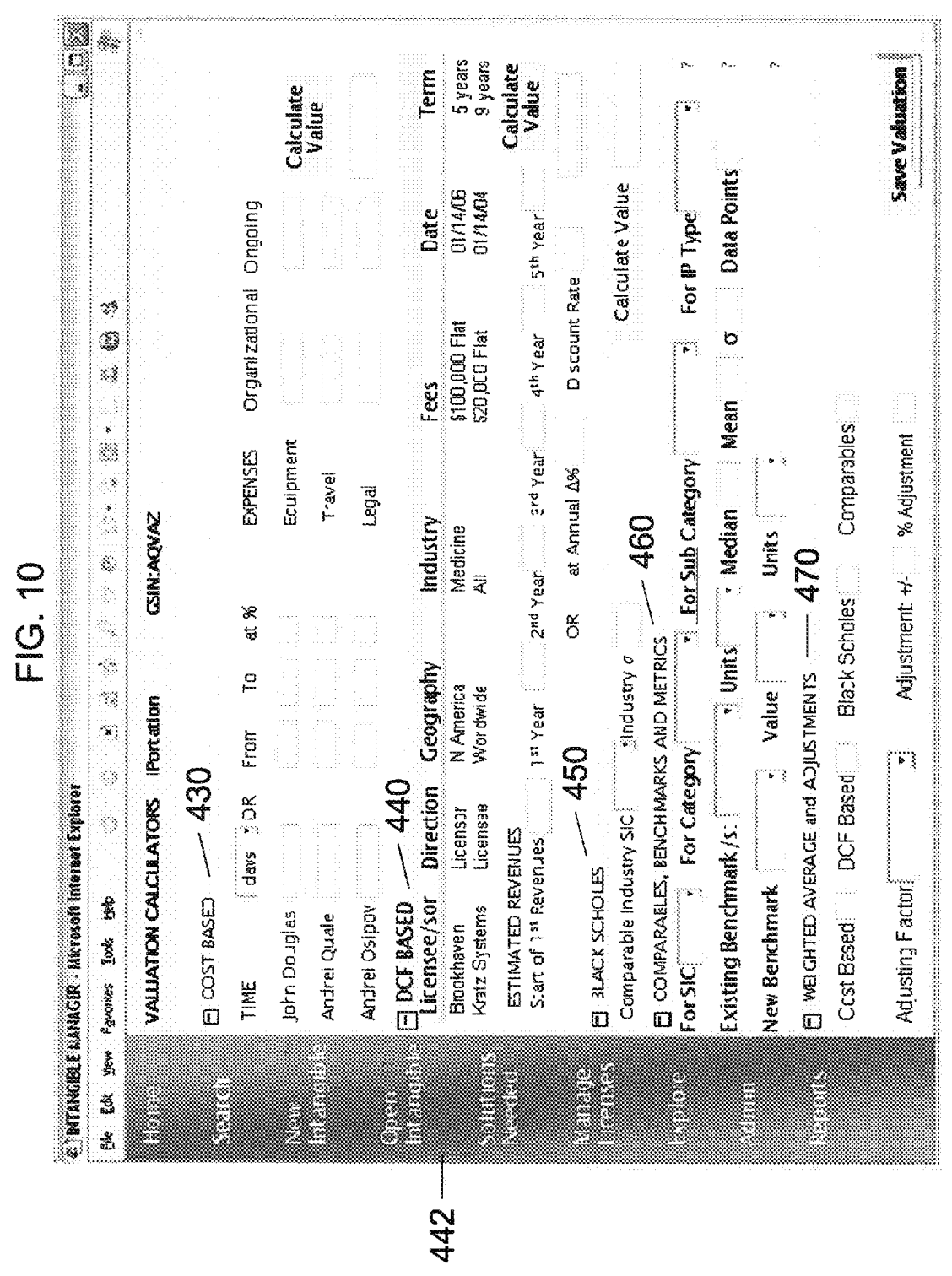

FIG. 10 is an embodiment of the user interface for the value calculator of the intangible asset management system, which has fields for a user, in this example, to insert value data for the intangible (e.g., cost based 430, DCF based 440, Black Scholes 450, comparables, benchmarks, metrics 460, weighted average and adjustments 470). The user also has the option to save the valuation with other metrics for the intangible, which will appear in the value history.

In various embodiments, the value for the intangible asset is obtained using valuation related metrics, regression testing, and/or multivariate analysis to build a database of correlations for each metrics based on capitalization, industry and geography and the system develops weighting factors to combine the metrics for a particular valuation in a weighted average. In various embodiments, as part of the valuation process a collection component is utilized to receive intangible asset information from users or websites to estimate the value of the intangible asset.

In various embodiments, the user can perform a diligence (e.g., a thorough legal and/or financial review) on the intangible and post a value relating to the intangible based on the diligence conducted. This value may be available to a second user, for example a potential buyer, based on the second user's trust score. The buyer can decide whether to buy the intangible or portfolio of intangibles or renegotiate the deal.

Collaborate Module: The Collaborate Module, in general, facilitates developing the intangible asset, component intangible and/or intangible asset information. Unlike prior art inventory database systems or electronic notebooks, where data is only recorded and kept unchanging (other than ageing), the system and methods provided include a database of intangibles, component intangible and/or intangible asset information that allows the tracking of ideas that are continually changing, improving, mutating and merging. The system and methods provided encourage a collaborative and innovative culture that every CEO strives to encourage.

In various embodiments, the system and methods provided facilitate this process through facilitating versioning and collaboration and keeping an audit trail so that appropriate kudos, incentive compensation, royalties, etc. find their way to those who contribute. The system and methods provided break down the silos and "not invented here" problems that plague every organization.

The systems and methods provided, in various embodiments, allow versioning or the creation of a new intangible, while keeping the same ISID and/or vanity identifier but adding post decimal version numbers. In various embodiments, collaboration is achieved by allowing addition field(s) to record suggestions or attach and remove additional documents, all changes tracked by contributor and the time of contribution (using the message digest algorithm, atomic clock and calibrated time stamp of the Innovate Module).

In various embodiments, a new intangible asset is achieved by combining intangible assets, component intangibles, and/or intangible asset information. The default assumption for intangibles belonging to the same company or different users in the same company is that an unlimited, non-exclusive license will be automatically for each intangible although this parameter can be changed using the License Module. Automatic non-exclusive licensees will reduce future disputes as to unauthorized use of an intangible without consent. In addition, the system will allocate proportional contribution, which will be used in regressing values as discussed in the Value Module.

In various embodiments, the Collaborate Module enables reports that allow an innovation index and a collaboration index to be calculated for the organization as a whole, individual departments, projects and/or individual managers. These reports may be aggregated by SIC codes and market cap, which may be utilized to provide economic indicators for the company.

Figure 11:
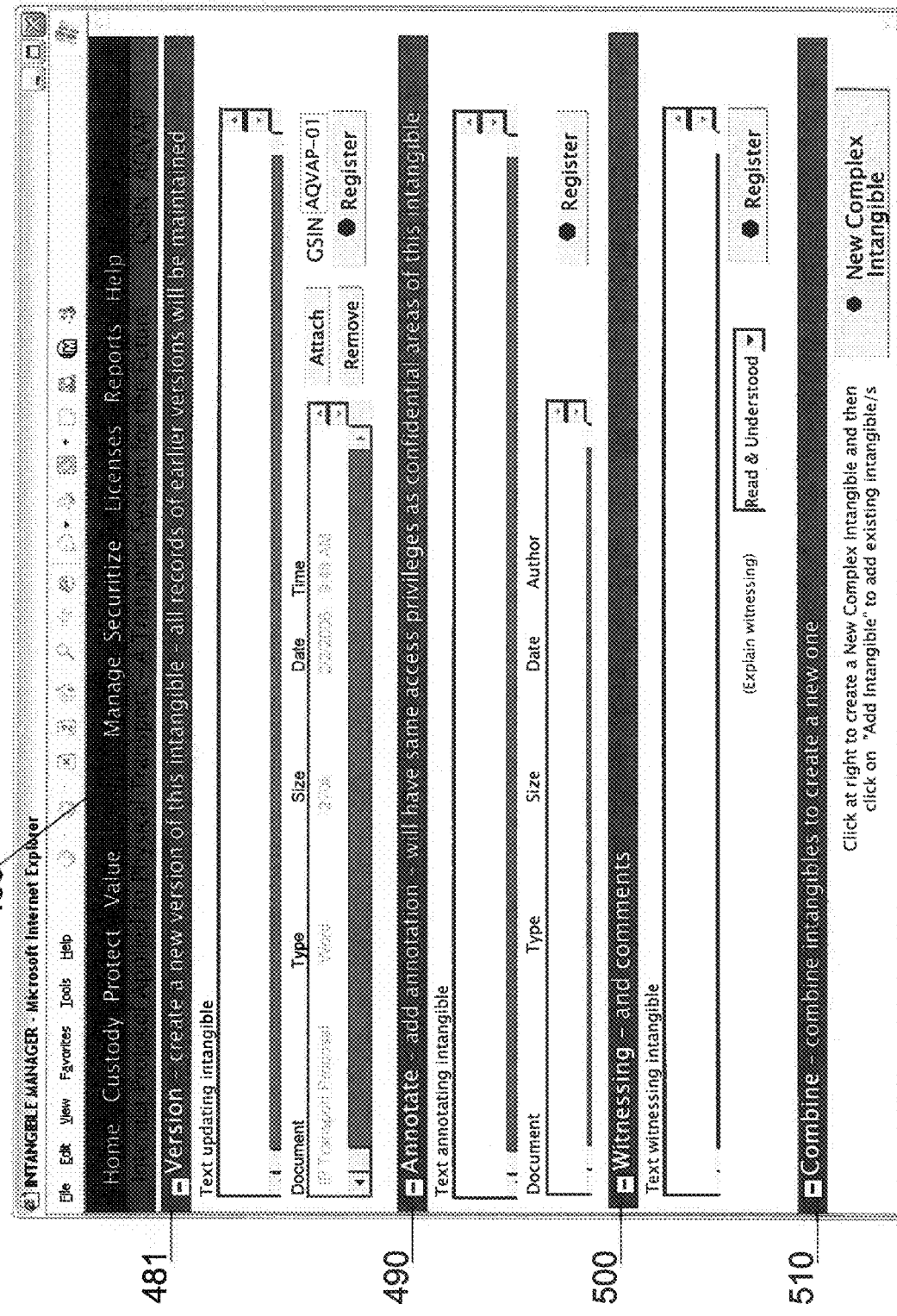
FIG. 11 is an exemplary embodiment of the user interface for the Collaborate module of the intangible asset management system of the claimed invention, which has fields for a user, in this example, to create a new version of an existing intangible asset, annotate an existing intangible and improve the component intangible assets, witness the entry or combine intangible assets to create a brand new intangible asset and register that asset as a new complex asset.

Referring to FIG. 11, it illustrates an exemplary embodiment of the user interface page for the Collaborate Module of the intangible asset management system. The develop tab is highlighted at 480, when the user is in the Collaborate Module. This module has fields and expansion bars for a user, in this example, to create a new version of an existing intangible asset, component intangible asset and/or intangible asset information 480. The new version of the intangible can be created, while the keeping an audit trail of the prior versions. The user can update or place an entry relating to the intangible by, for example, attaching/removing documents and/or entering text relating to the intangible. The user can save the entry, in which case the metadata associated with the intangible will also be saved. Upon saving the entry, the ISID number and/or vanity identifier will have new versions allotted. Typically, the entry may improve the intangible asset, the component intangible, and/or intangible asset information. 490 shows an annotate expansion bar, where the user can add text annotating the intangible, which will be confidential and visible only to users with the required access level, documents can be removed and attached relating to the intangible and the annotation registered in the database. The annotation section allows a user to contribute and get the recognition for the contribution or compensation that they deserve. The entries in the Collaborate Module can be witnessed and the witness can provide comments and electronically sign the entry with the "Disclosed to and Understood by" language for the entry. This allows an easy attestation trail for the entry and can be used to establish dates of invention, inventors and their contribution. In various embodiments, the Collaborate Module includes fields 510 for the user to combine intangible assets, component intangible and/or intangible asset information to create a new complex intangible.

In various embodiments, the Collaborate Module is configured with a tracking component to: track entries and edits among users that annotate and collaborate during the life of the intangible asset, assign new version numbers to intangible asset information that has edits or entries, and/or track changes to the modules.

Manage Module: In various embodiments, the intangible asset management system comprises an manage module (user interface page shown in FIG. 12). As the name implies, this module allows the user to manage their intangibles. In various embodiments, the manage module can be populated with various metrics for an intangible by different individuals, for example, the marketing group (Marketability), General Counsel (Protectability) and by the system itself (Activity) 520. These metrics assist management in deciding what to do with their intangibles and leads to "best practices" analysis and recommendations scatter gram shown in 522. The system tracks its own (the system's) recommendations as well as those of the manager responsible for the intangible and the "approver" for those actions.

In various embodiments, the system generates an activity report derived from compiling the number of user accesses to any intangible from anyone who is not one of the authors, and scoring repeat accesses by the same individual higher (1.5×). The system also factors in a premium for recency (divide each access by the number time since the access) as indicated in the formula below.

$$\Sigma = RTA*/1$$

Where
A=Activity raw score
T=Time since access
R=Repeat factor (1.5× for a repeat from same user)

These raw activity scores are then ranked and the activity score is the decile the intangible is in for activity (10 is the highest).

In various embodiments, the manage module is configured to also notify a user once a new intangible asset is entered into the centralized database that meets the user's area of interest.

Viability scores are derived from the averaging of the Marketability, Protectability and Activity Scores. If one of the first two are not available, a score of 5 is assumed. Innovation metrics are derived from the sum of the Viability scores, with weighting for recency (divide by time since intangible was last accessed by two or more different non-author users in a one month time period). These raw innovation scores are ranked for the group being rated (individual, business unit, company, nation) and the score is the decile in which the raw score falls in.

$$I_R = \Sigma_{all\Gamma s} V$$

Where
$I_R$ is the Innovation Index Raw Score
V is the Viability Index
The Collaboration Index is a function of the average number of authors per intangible and the average number of annotations to an intangible.

$$C_R = F(\alpha n_i, \beta a_i) * V_R)$$

Where
CR is the Collaboration Index Raw Score
$n_i$ is the number of authors for an individual intangible
$a_i$ is the number of annotations for an individual intangible
$\alpha$ is the weighting coefficient for $n_i$
$\beta$ is the weighting coefficient for $a_i$
$V_R$ is the raw Viability score for the individual intangible In addition to the established metrics such as Patent Citation Index, Trademark Recognition Index in the development of the Innovation Manager system additional metrics were developed including activity indices, innovation indices, collaboration indices, white space metrics (number of searches resulting in null hits for a technology space), human factors metrics, global licensing inference (projecting global licensing potential from an existing license in a geography by aggregating data on all existing licenses worldwide for all innovations) and composite value ratios. However up till now all metrics have been used in isolation. The Innovation Manager system has developed a much more sophisticated approach that uses all of the metrics in combination as illustrated in FIG. 36. It uses as inputs commercially available market data 1031, innovation manager aggregated data 1032, established metrics 1033, metrics developed in development of innovation manager 1033, and data on individual licenses derived from the innovation manager database and jurisdictions where the national IP office requires license information to be registered. The license data for each intangible is aggregated to estimate the value of the intangible 1036, the intangibles within the organization are aggregated to determine total intangible value 1037, and added to total physical asset value and total financial asset value to determine estimated total organizational value 1038. The aggregate value of all of the identifiable intellectual assets within an organization is added to the value of the financial assets and the physical assets. This composite value is compared to market values for all publicly quoted companies with the weighting coefficient for each metric being determined historically by running multivariate regressions using various weighting coefficients and lag times to find the best fit. These 'best fitting' weighting coefficients are then used in a production run to determine individual intellectual asset values as well as aggregate organizational value. This process is further refined by determining weighting coefficients for differing organizational types by industry, geography and market capitalization levels as well as for individual intellectual asset type and stage. This enables a much more accurate determination of value and is able to be run on a macro level using either market data as well as metrics internally generated within the Innovation Manager both for individual assets, for the organization and for all organizations (the privacy policy while absolutely respecting confidentiality does allow for the compilation of composite statistics).

In addition the system is building a database of valuation benchmarks such as 'lifetime value of a credit card subscriber', 'value of a patent citation', trademark recognition values' all of which are tracked from each valuation and aggregated across an industry providing the system with means, averages and standard deviations all of which help us not only provide more accurate valuations but better estimate the accuracy of the valuations. For one innovation there may be several impacting benchmarks.

Further adjustments are made historical 'true up' adjustments that are derived by comparing estimates of value determined early in the life cycle of an intellectual asset with more accurate determinations that are available later in their life-cycle once they are generating revenues.

Human Factors Metric: Adjustments are made for the value of the organizational management team. This is determined using a similar method. Market data feeds are used to determine the relative value of the management team. This is done by looking at the historical performance of each member of the management team. The performance of organizations they have been involved with as senior management are compared with industry indices (and lagged as the impact of management actions is usually delayed). Their role is weighted (a CEO has a higher weighting coefficient than a CTO for instance). A score for the individual in each organization he participated in is determined and aggregated to provide an aggregate score for the individual. The individuals in a target organization are then all aggregated into an overall management team score by using the role weighting coefficient. Once again these weighting coefficients and optimum lag times are determined empirically by running a multivariate regression against historical market data.

Adjustments are also made for 'symbiotic value' in the case of composite innovations comprised of two or more child innovations. This symbiotic value can be positive as in the case of a new innovation being realized from a combination of existing innovations or negative in the case of an organization that is combining duplicative research for efficiency purposes.

Having developed a method for determining an accurate estimate of the value of an intellectual asset the system is able to continually update it in its 'dynamic valuation'—for instance any present value formula will use an input that is the current average cost of capital—as this changes as Federal funds rate are changed then this is automatically fed into the algorithms that are calculating value.

Figure 12:
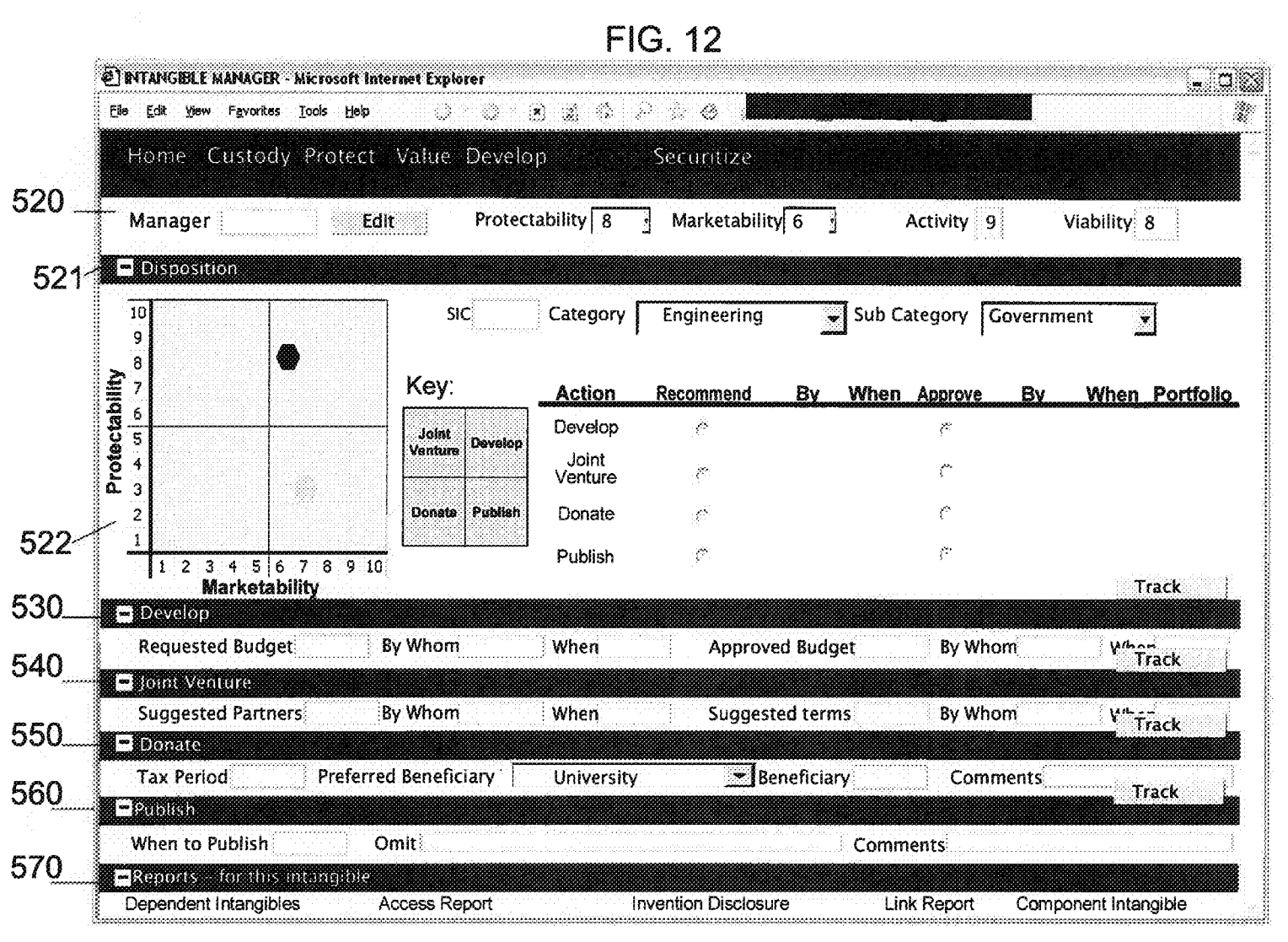

The scores for Marketability and Protectability are used to generate a "disposition decision quadrant" shown in the FIG. 12, 521. Depending on where it falls in the quadrant, a recommendation is made by the system to the manager who may then follow the recommendation or propose another recommendation. All these decisions are tracked as is the subsequent approval. Once a decision for disposition is approved the system automatically implements it through either: Develop 530: Informing manager of approved budget for development of intangible and any other instructions or suggestions (e.g., adequate resources for developing); Joint Venture 540: Posting the intangible for joint venture or licensing, which is a way to advertise to potential partners; Publish 560: Automatically changing all security access to most open so that it is "published" as defined in patent law, which will act as prior art against others; Donate 550: Automatically transferring to a donation portfolio to be transferred to the trusted third party in the accounting period requested by the organization. Instructions may be given for further distribution of the asset to another non-profit entity but timing on this is more flexible, so as to generate tax deductions and reduce legal costs. The manage module also gives the user the option to access reports related to the intangible asset 570.

In various embodiments, the manage module is configured to allow entries and edits from multiple users including the general counsel, marketing group, and has options to send the edited or annotated intangible asset information for final approval by the legal department to legally protect the intangible asset.

Securitize Module: In various embodiments, the intangible asset management system comprises a securitize module. Securitization is a financial technique that pools intangible assets together and, in effect, turns them into a tradeable security. For example, the securitized module allows entities to organize their intangibles into portfolios that can then be used to generate revenue from licensing, be used as collateral for bank loans, placed in a trust fund, or to securitize the intangible portfolio as a special purpose vehicle. Typically, a special purpose vehicle is an entity constructed with a limited purpose or life (e.g., sell or license out the intangible) that would hold legal title over the intangible or portfolio. This may be a way companies can raise capital on the strength of their intangible portfolios, while simultaneously contracting to license back any potential usage they need for their own business. The securitize module combines the financing models of Asset Backed Securities (in this case Intangible Asset Backed Securities or IABS) and sale-leasebacks. In addition, individual intangibles or a portfolio of intangibles can be securitized and shares in this security offered on an exchange.

Figure 13:
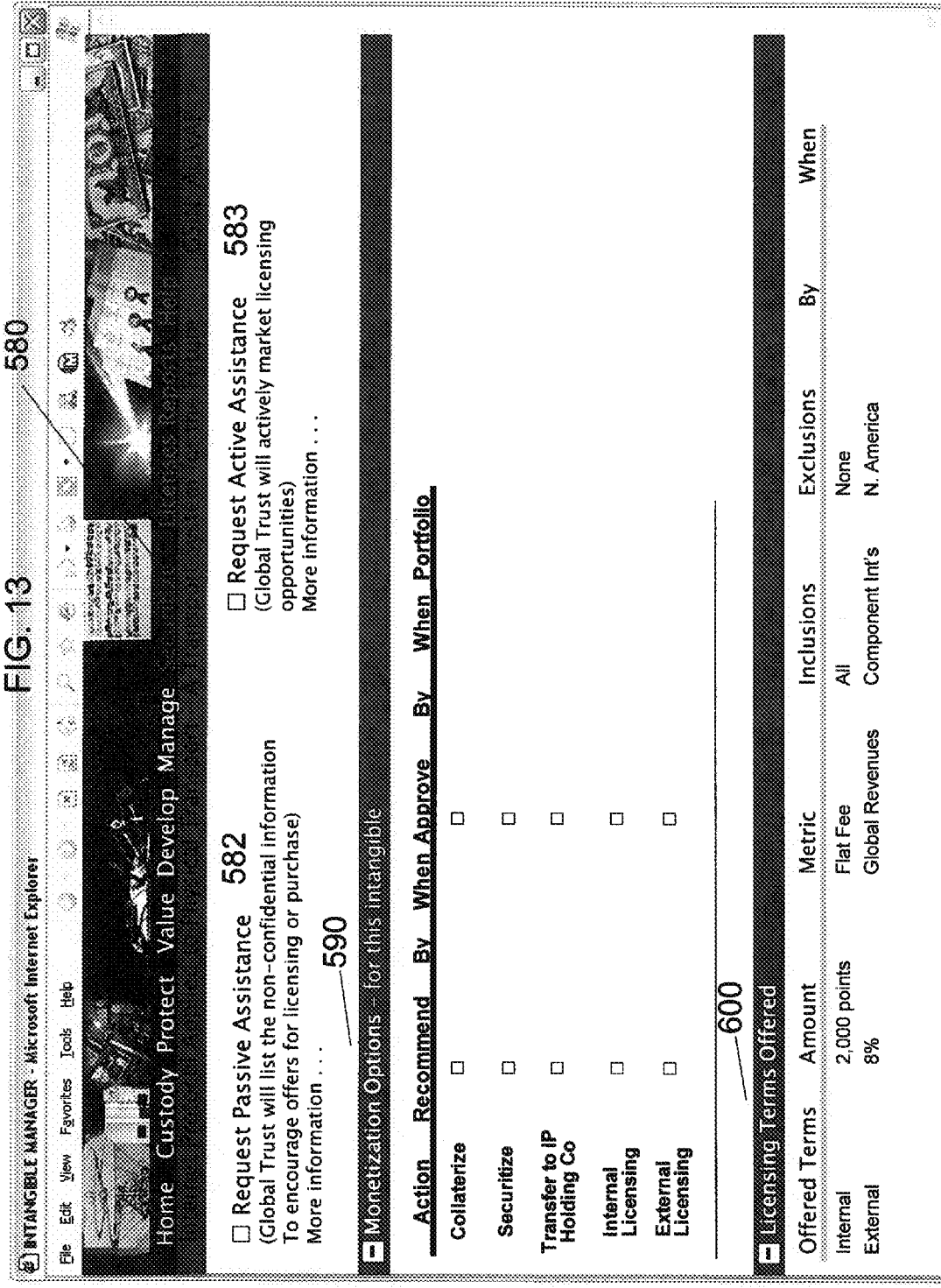
FIG. 13 is an exemplary embodiment of the user interface for the securitize module of the intangible asset management system of the claimed invention, which has fields for a user, in this example, to request a trustee to list non-confidential information associated with the intangible asset or request that the trustee add it to its portfolio and actively market licensing opportunities for the intangible asset. Access to confidential information concerning the asset will be granted based on a second user's trust score. The user will also be able to select monetization option and licensing options for the intangible asset that the trustee can post or use to actively market the intangible asset.

Referring to FIG. 13, an exemplary embodiment of the user interface for the securitize module of the intangible asset management system is shown (tab 680 highlighted). The securitize module has fields for a user, in this example, to request passive assistance 582 from a trustee to list non-confidential information associated with the intangible asset or request active assistance 583, where the trustee can add the intangible to its portfolio and actively market licensing opportunities for the intangible asset (e.g., trusted third party's licensing and technology transfer team). The system also allows access to confidential information concerning the asset depending on the second user's trust score. The user will also be able to select monetization options 590 for the intangible or portfolio of intangibles that can be automatically approved and implemented by the trusted third party (e.g., collaterize, securitize, license the intangible, etc.).

In various embodiments, the user can also select various licensing terms 600 acceptable for licensing the intangible, which the trusted third party can post for other users, possessing the authorized access level, to view and respond. When the user selects a license option, the user will be directed to the license module shown in FIG. 14.

In various embodiments, once the user is optimistic about a particular asset, the user can collaterize, securitize, place in escrow, clear title or fund the entity owning the registered asset. Thus, the systems and methods provided can expedited and maximize value for an entity in real time because the pertinent information is readily available from the database.

License Module: In various embodiments, the intangible asset management system of the claimed invention comprises a license module. Sometimes, the value of an intangible lies in its ability to generate future revenue, which may be partially offset by its own dependence on licensing other intangibles. The license module tracks both licenses that an intangible depends on as well as licenses that it can itself generate for its own use. In addition, the license module tracks ownership (as a special instance of licensing), dependencies and potential conflicts between licenses.

In various embodiments, after leading the user through a series of questions, the license module can generate a license if one does not exist or can attach a license for the organizational archive if one does. Thus, in various embodiments, the intangible asset management systems and methods provided herein builds, tracks and manages a complex network of interrelationships (both internal to the organization and external) that model economic flows generated by the intangibles. Just as intangibles can have a variety of security levels, so do the licenses that join them. This module can determine who has access to various licensing information.

Figure 14:
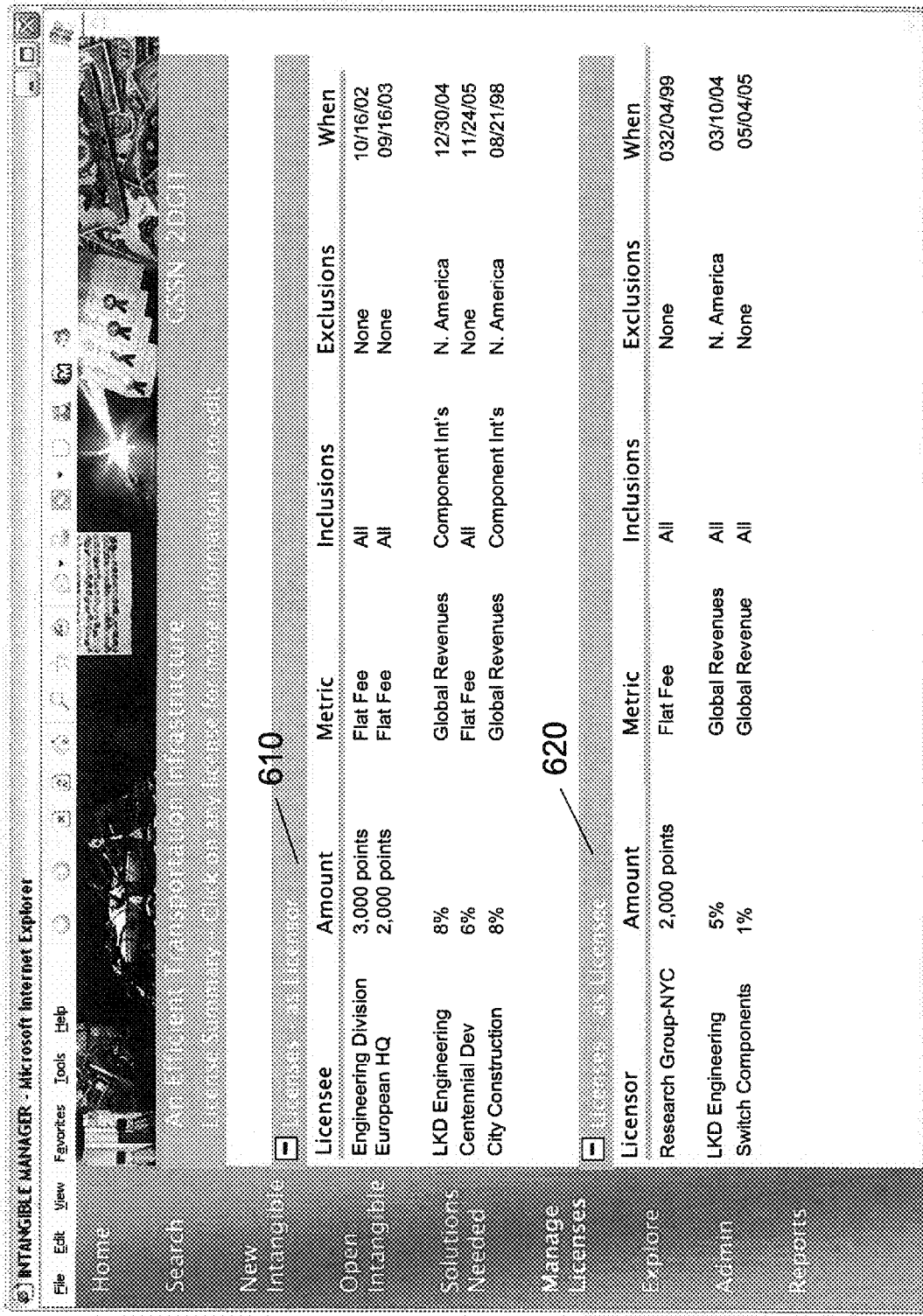
FIG. 14 is an exemplary embodiment of the user interface for the license module of the intangible asset management system of the claimed invention, which has fields for a user, in this example, to view or post licensor and license information for the intangible asset including revenues as well as entities that are excluded from the license (e.g. because of industry conflicts, competitors, etc.).

FIG. 14 is an exemplary embodiment of the user interface for the license module of the intangible asset management system, which has fields for a user, in this example, to view or post licensors 610 and licensees 620 for the intangible asset and information surrounding the license including meta data (e.g., revenues from the license, date, as well as entities that are included/excluded from the license because of, for example, industry conflicts). A prospective licensee or licensor with appropriate access levels to the database will be able to view the posted licensing information.

Figure 15:
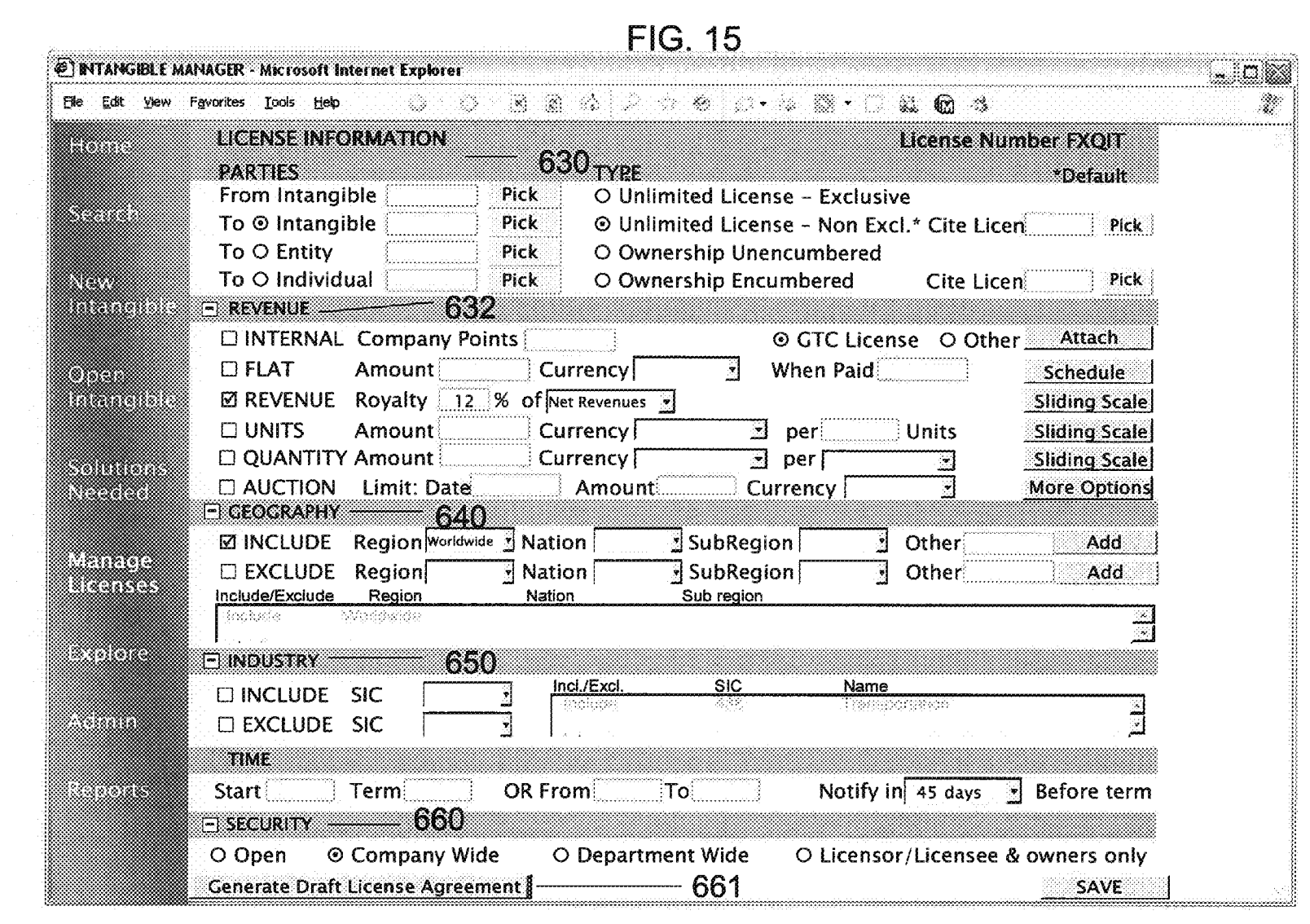

FIG. 15 is an exemplary embodiment of the user interface for the securitize module of the intangible asset management system, which has fields for a user, in this example, to populate, link, and/or track information about the license 630 (e.g., type of license, licenses between intangibles, entities, and/or individuals). There is also a field for selecting various security levels, which grant certain users access to this information 660. Fields for the revenue associated with the license 632, the particular geography for the license 640, and the particular industry for the license 650 can also be viewed and edited. In various embodiments, there is a reports generator that allows various reports to be generated concerning the license including template licensing agreements or collaboration agreements 661. The user may also have access to solutions needed data. The claimed invention also incorporates a license generation system in which the parameters of a license can be entered and an automatic draft license is generated. In addition to greatly facilitating the normal negotiation and analysis of a licensing transaction it allows for the building of an econometric model of enterprise innovation as described below.

Solutions Needed Module: In various embodiments, the intangible asset management system comprises a solutions needed module. Sometimes, the solutions needed module can be viewed as the combination of a special instance of an intangible (one that does not exist yet) and a link (one that does not yet have a licensee). Apart from these distinctions, it can inherit the properties of both. Corporations and governments are increasingly looking to outsource their innovation and the solutions needed module provides a convenient way they can do so in addition to a source of projects for research facilities in corporate, academic and independent research labs or for individuals to investigate. The solutions needed module allows a company to post an award for anyone who can solve a problem that the company has. The award, in various embodiments, can be looked at as a type of licensed in technology to the user in need of a solution. In this way, the company is outsourcing their innovation and then licensing it back in the company.

Figure 16:
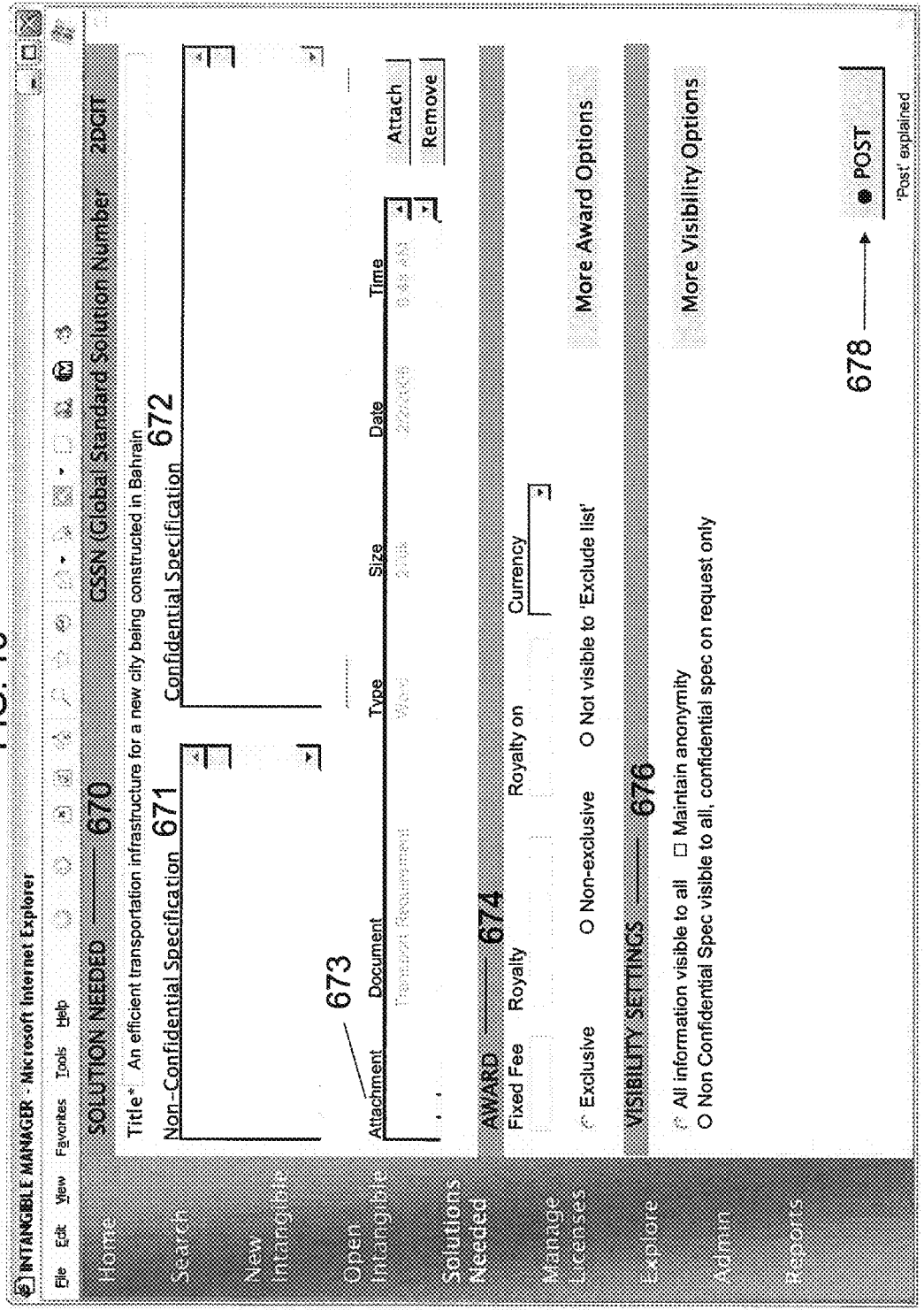
FIG. 16 is an exemplary embodiment of the user interface for the Innovations Needed (or Solutions Needed) module of the intangible asset management system of the claimed invention. The module has fields for a user, in this example, to post the problem that the business needs solved and associated confidential and non-confidential information concerning the problem to be solved and allows the user the option to attach a copy of any related document. The user also has an option to post an award for such intangible asset that solves the problem. Anonymity of the entity with the problem can be set and the user can set the level of visibility of the solutions needed. The solutions needed module fosters collaboration and allows a second user the ability to create an intangible asset, where none existed that solves the problem of another user. After entries are made, certain visibility selections will direct the user to FIG. 17.

FIG. 16 is an exemplary embodiment of the user interface for the solutions needed module of the intangible asset management system. This interface displays, for example, a particular problem that a user faces and there is no existing intangible that provides a solution to the problem. The module has fields for a user, in this example, to post the problem 670 that the business needs solved and the specifications that the solutions will need to meet to qualify as an award. The user will not only be able to post associated confidential 672 and non-confidential information 671 concerning the problem to be solved, but the user will also have the option of attaching a copy of any related document (e.g. NDA/CDA, MTA, collaboration agreement, etc.).

In various embodiments, the user also has an option to post an award 674 for such intangible asset that solves the problem and has the option of selecting options for confidentiality of the information and anonymity of the entity with the problem. The system also allows the user to set the visibility 676 of the solutions needed by other users and post the solution needed 678. This module fosters collaboration and allows a second user the ability to create an intangible asset, where none existed that solves the problem of another user. After entries are made, certain users will be directed to FIG. 17.

Figure 17:
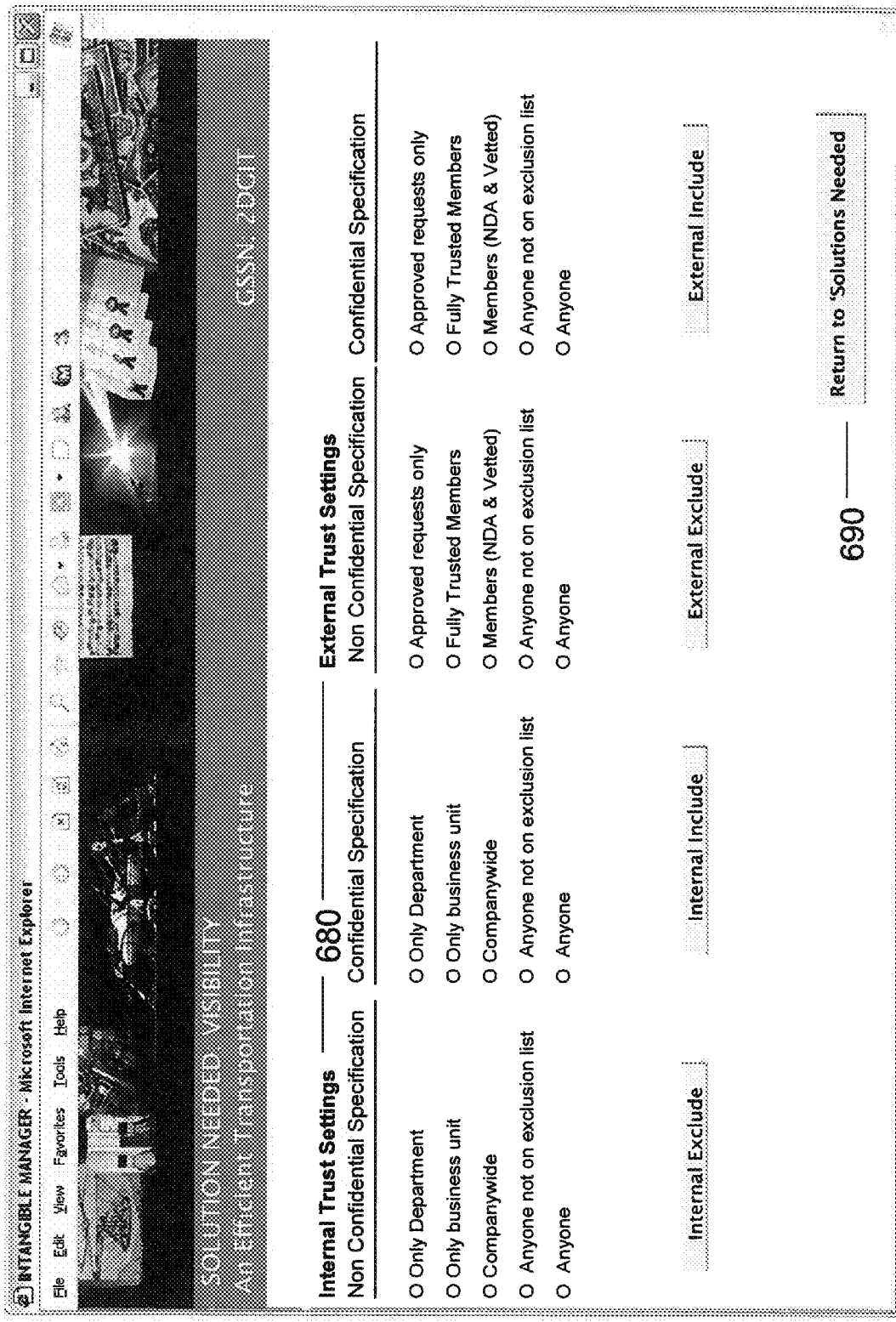
FIG. 17 is an exemplary embodiment of the user interface for the solutions needed module of the intangible asset management system of the claimed invention, after a user populates the solutions needed entries, the user may be directed to fields, in this example, to allot different internal and external trust settings to the standard solution identification number.

FIG. 17 is an exemplary embodiment of the user interface for the solutions needed module of the intangible asset management system, after a user populates the solutions needed entries, the user is directed to fields 680, in this example, to allot different internal and external trust settings to the standard solution identification number. For example, the user can set internal trust settings for a non-confidential specification about the solutions needed so that only a particular department, business unit, company, anyone not on the exclusion list, or anyone can view it or be excluded from viewing it. The same type of setting can be set for the confidential/non-confidential specifications about the solutions needed, except the external setting can be set based on the approval by other users, fully trusted members, members that are vetted or have a CDA/NDA or anyone. The user also has the option of returning 690 to the solutions needed module page in FIG. 16.

Search Module: The intangible asset management system of the claimed invention comprises a search module. As the intangible asset management system database is populated, the information contained in the database will be more valuable on a daily basis. The search module will also provide valuable metadata and aggregate data that will help establish benchmarks for valuation, but also identify potential licensors of the intangible.

Typically, the search module includes a searching component with a search engine provided (alone or in conjunction with other modules) to control the search and retrieval of intangible asset information (e.g., metadata) stored in the database based on search criteria or queries formulated by the system and/or user. A search engine may provide text-based, graphics-based, code-based, or other search/query mechanisms to produce search results to be viewed, accessed, edited, or otherwise output to be saved in the database or viewed by a user. In one embodiment, for example, the search module performs searches based on input data such as: ISID or vanity identifier, keywords; text or graphics in select fields (e.g., title, author, licensee, different segments or information fields of documents, etc.); Boolean logic characters, or other search criteria (e.g., date restrictions, etc.).

Figure 18:
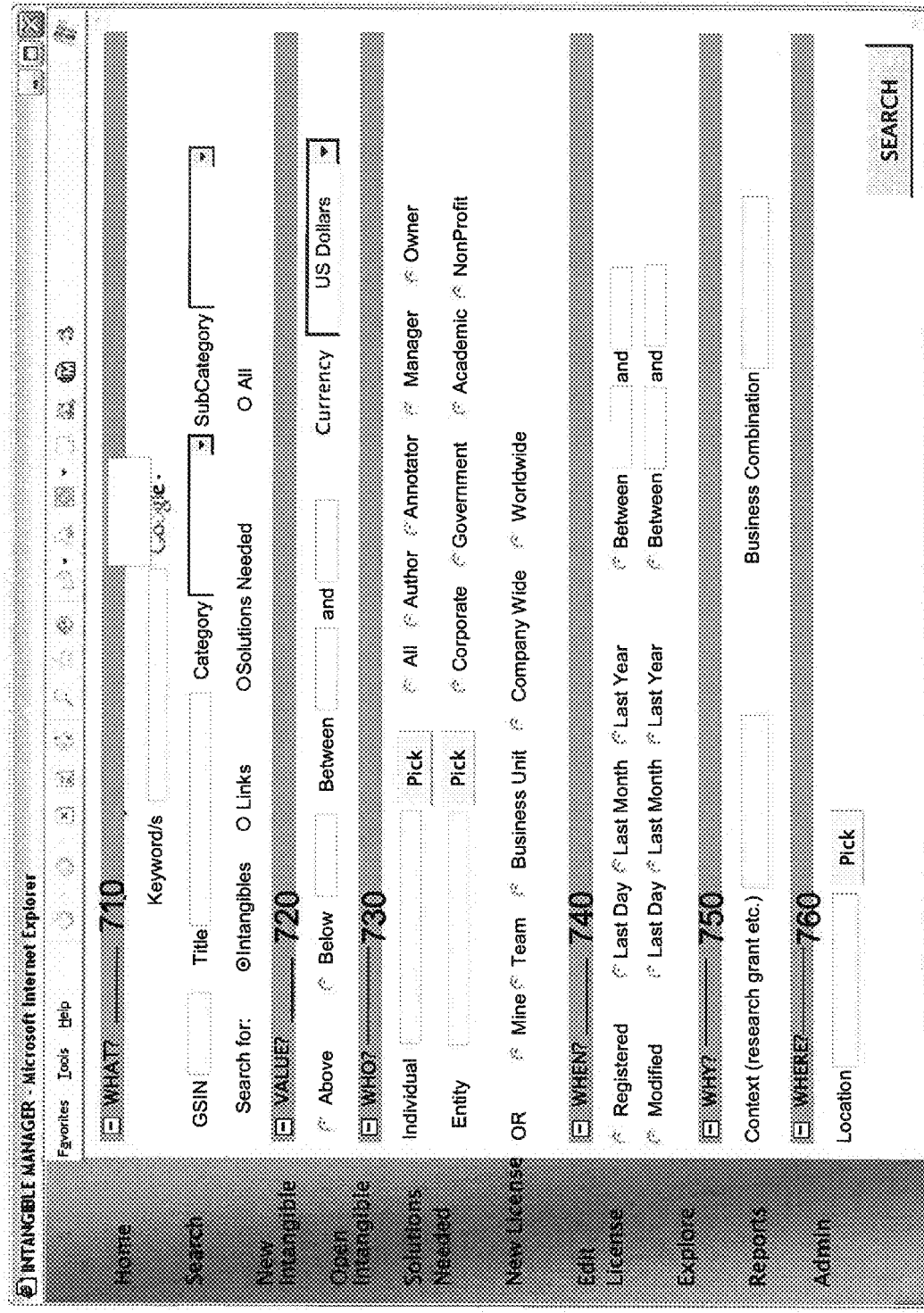
FIG. 18 is an exemplary embodiment of the user interface that enables the user to search for any innovation or license using any criteria or combination of criteria.

FIG. 18 is an exemplary embodiment of the user interface for the search module of the intangible asset management system, which has fields for a user, in this example, to search selected fields using parameters such as keywords of the intangible asset title, GSIN, intangible, links, solutions needed or all fields shown in 710. The user also has options to search by value 720 of the intangible asset or problem to be solved. The database can also be searched by the particular user 730 (e.g., individual, entity, author, annotator, manager owner, corporate, government, academic, nonprofit, team member, business unit, companywide, worldwide, etc.). In various embodiments, the user can also search the database as to when the intangible was registered and/or modified and restrict the field of search to certain dates. Searches can be conducted based on the context 750 the intangible was registered (e.g., research grant, business, target company acquired), which may be important for tax purposes as well as searches conducted by location 760 of the entity. The results of searches, or a selected subset of the results, can be used to either create a 'New Portfolio' or add to an 'Existing Portfolio'.

In various embodiments, the search engine is programmed to permit editing or refinement of the search criteria or query to perform additional searches on different data sets or the data set produced from the initial search results. Results of the search or query are compiled for storage, display, or other output to the user.

FIG. 31 is an embodiment of the user interface in the search module of the intangible asset manager where a user can open an intangible asset based on 880 the title and/or GSIN or ISID. The results for that search can then be opened for that intangible 881. If null searches are collected, the user can use this information to potentially create an intangible asset portfolio in the area where there are no intangible assets "white space".

FIG. 32 is an exemplary embodiment of the user interface in the search module of the intangible asset manager where a user can open a license or search the database by licensor/licensee or title 890 and open the license 891.

In various embodiments, the server or computer makes the search results (and any available underlying documents listed) available for viewing or other output (e.g., print, e-mail, fax, etc.) by the user (or user interface). The search results may be ordered, sorted, and saved in accordance with one or more known order preferences set by a user (e.g., date, alphabetical by title, inventor, assignee, relevancy, weighted relevancy, scoring formula, etc.). In accordance with one embodiment, the resulting information (i.e., results and/or available underlying documents) may be downloaded in one or more textual/graphical formats (e.g., RTF, PDF, TIFF, etc.), or set for alternative delivery to one or more specified locations (e.g., via e-mail, fax, regular mail, courier, etc.) in any desired format (e.g., print, storage on electronic media such as CD-ROM, etc.). The user may view viewing the search results and underlying documents at the user interface, which allows viewing of one or more documents on the same display, as well as viewing of one or more portions or segments, summaries, or information fields of different documents (e.g., message envelope, text, author/inventor, etc.) separately or together so as to facilitate analysis of the search results. In various embodiments, all documents are OCR searchable.

The results of the search may include a list of intangibles stored locally or remotely on the database or there may be links to resources on remote storage systems accessible over an external network or there may be other links or data identifying a location or resource (on or off-line) of information (e.g., message envelope, text, author/inventor, etc.) corresponding to the search criteria or query.

Figure 19:
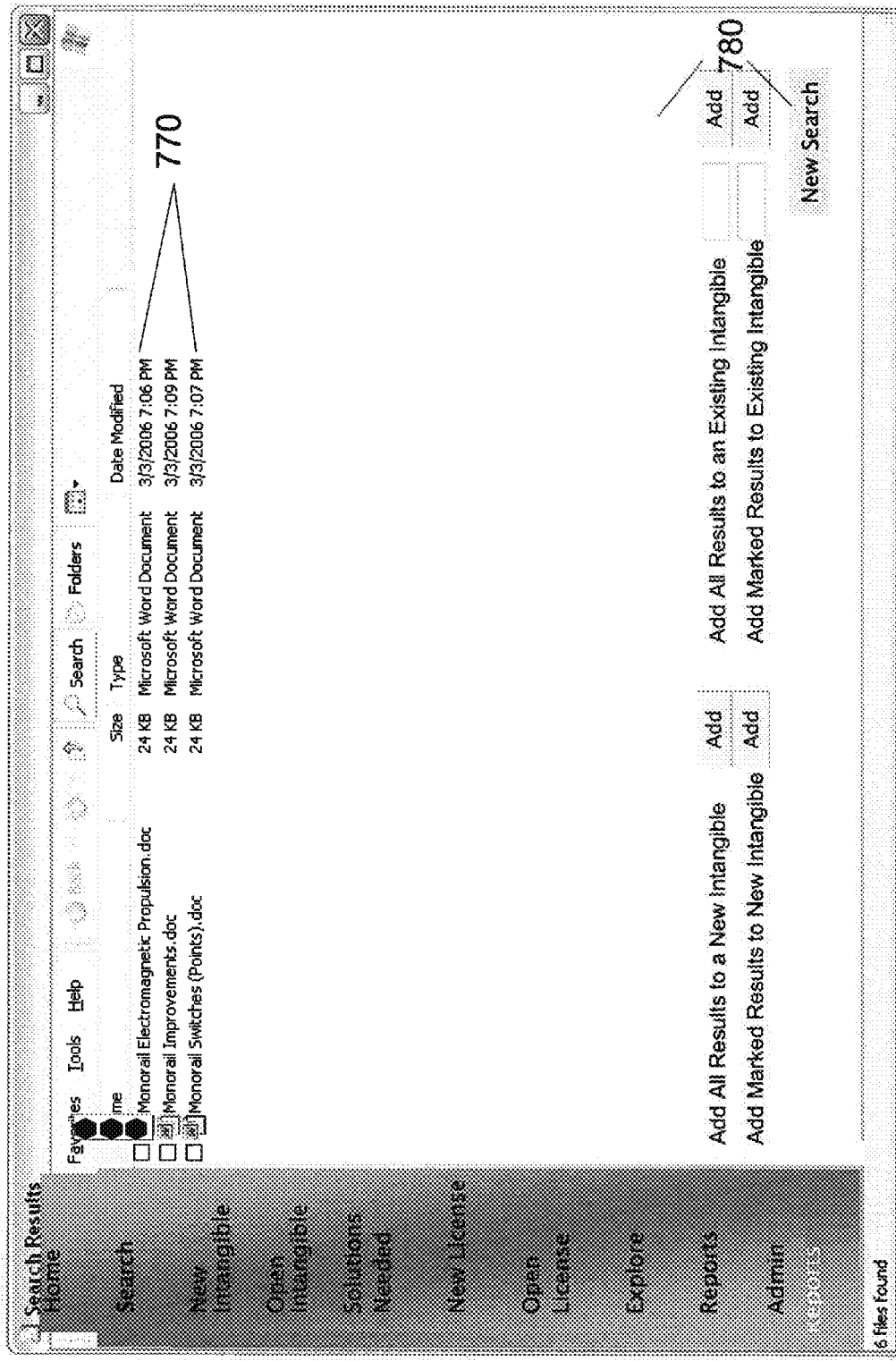
FIG. 19 is an exemplary embodiment of the user interface for the search module, which displays typical results for selected search fields of the intangible asset manager. The user can organize the results according whether the intangible assets are simple or more complex and the user interface gives the option for the user to search or link the results to other areas of the database.

FIG. 19 is an exemplary embodiment of the user interface for the search module, which displays a typical summary list 770 (in explore type format) for selected search fields of the intangible asset manager. The summary list can be opened for more detail by clicking on the appropriate file. The search results can also be used partially or in their entirety to create or add to portfolios such as licensing, securitizing or licensing portfolios by clicking on tool bars at 780. The add bars allows a user to add the results to develop a new intangible asset or associate it with an existing intangible asset to further populate the database. If null results come up in a search, this may be an area for white space to be identified and a company can beginning its R&D in this area, or a solutions needed can be posted in the database and the appropriate technology licensed in. In one embodiment, the search results are saved and cannot be deleted.

Figure 20:
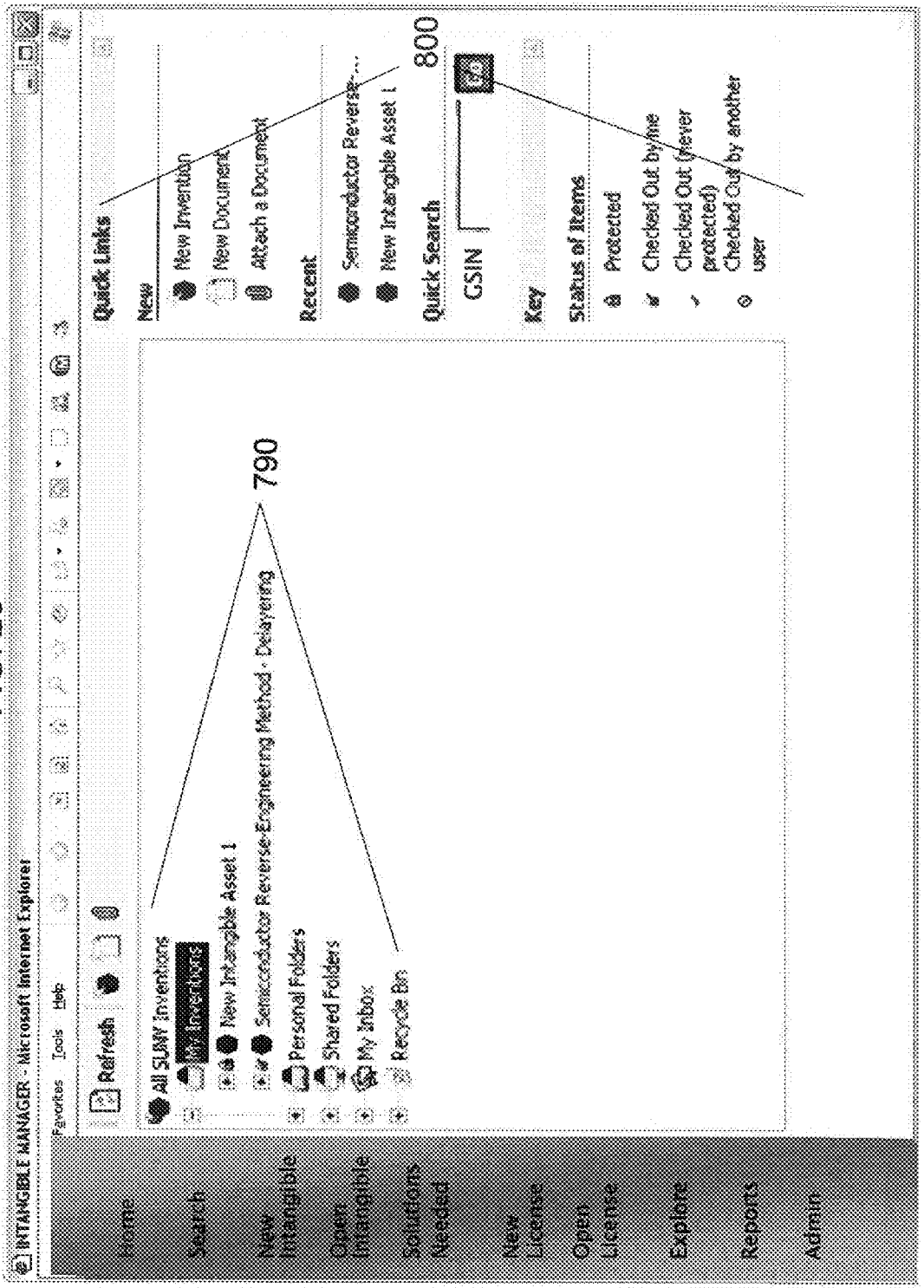
FIG. 20 is an exemplary embodiment of the user interface for the reports module, which allows a user to display their intellectual assets organized in portfolios in an hierarchical tree structure (with logos denoting innovations and portfolios of innovations.

FIG. 20 is an exemplary embodiment of the user interface for the search module, which displays typical results for selected search fields of the intangible asset manager. Intangibles can be managed through an explore window 790, where the simple intangibles are shown as hexagons and the compound/complex intangibles (those with component intangibles or combinations of intangibles) are shown as folders with hexagons inside. Shortcuts can be created so that one intangible can include several portfolios or compound/complex intangibles. The user can organize the results according to whether the intangible assets are simple or more complex and the user interface gives the option for the user to search or link to other areas of the database.

In various embodiments, the search module provides all module level search and posting display features. It allows users to locate intangibles registered within the system based on full text search of the description fields, and through the use of keywords, which can be applied to all searchable fields and used to post results. Search results may be sorted, grouped or filtered by registration date, last modification date, author, manager, location, business unit, etc.

In various embodiments, the module provides four modes of operation which are:
  Basic keyword/full text search: This is the simplest mode and includes a standard search term input box and a button to execute the search.
  Advanced search: Advanced search mode is an enhancement over basic search in that additional search features can be selected. Additional options allow the user to specify specific intangible types, value ranges, date ranges, and presents logical AND/OR logic for multiple keywords or phrases.
  Paged Results display: When a search has been executed, the results are displayed as a list which includes a small icon indicating the posting type, the posting title and summary, the asking price, the date the posting was posted and/or expiration date, and the posting entity's user identification field. Result sets that exceed the maximum number of intangibles registered allowed per page will cause the module to display page forward/back navigation elements at the top and bottom of each page, along with the number of pages in the result set.

Reports Module: The intangible asset management system of the claimed invention, in various embodiments, can have a reports module (alone or in conjunction with other modules) in generating reports concerning the intangible asset, a component intangible, a portfolio of intangible assets and/or intangible asset information. Reports module, for example, may be programmed to allow users to create and store templates or other forms (e.g., CDA, NDAs, template license agreements, etc.), which can be populated during report generation. Reports may then be generated manually or automatically from selected data sets (e.g., Vanity identifier, ISID, inventor, user, licensee, licensor, intangible asset portfolio, etc.), or from contents of one or more workspace folders.

In various embodiments, the reports module includes a reports generator capable of creating and storing multiple reports. Reports will be defined using reporting tool libraries which streamline creation and execution such as Microsoft SQL reporting services or Data Dynamics. The reports module typically will have three modes for an authorized user to generate reports:
  Stored report list: This will be the default mode displayed to the authorized user. It will display a list of pre-defined or "Canned" reports, along with any reports that the current user may have defined and saved.
  Report generator: This mode will allow the user to define, test, and save reports for individual use to create custom reports. The data within any report is again filtered to only include that information that the user generating the report has access to.
  Report Display: This mode will display a generated report to the user. Reports will be printable, and will be formatted according to the system's UI constraints.

In various embodiments, the reports module allows a non-technical user without HTML knowledge to attach, delete, export and modify documents in formats such as Microsoft Word, Word Perfect, Power point, Excel, Access and/or Portable Document Format.

The stored reports include the following reports (grouped by likely user): INVENTOR: Innovations Registered, Access Reports (who has accessed an intangible), UnWitnessed Items, IP Clocks (reminders on important deadlines such as time since disclosure or time since provisional filed), Template (customized innovate modules for research data entry for example)
MANAGER/PI: Disposition, Internal Development, JV, Publish, Donate, Dept Metrics, Dept ROI, Overlap Report/Keyword, Overlap Report/Industry Code, Overlap Report/Category
INTERNAL OR EXTERNAL COUNSEL: Disclosure Forms Pending, Pipeline by IP Type, NDA Report, Exit Report, FINANCIAL, Innovation Values, Innovations by Acquisition, Export to Excel Pivot, Output to Accounting, Compliance Report
SENIOR MANAGER: Innovation Dashboard, Innovation Metrics, Collaboration Metrics, Top Innovations, Top Innovators, Top Collaborator
MARKETING: Portfolios, Requests In, Requests Out,
TECH TRANSFER: License Report, Encumbrances, Economic Flows, Av Royalty Rates Org, Av Royalty Rates Industry, Av Royalty Geography In various embodiments, the reports generator can focus on the intangibles as well as the links/licenses between them. In particular, the reports generator looks at the economic flows that both are generated by an intangible and, in addition, are also needed by an intangible (in terms of licenses for component intangibles that it is dependent on). This allows for much more sophisticated financial analysis and planning as well as being better able to determine the true return on investment of a project, department or individual.

If a user selects a links report from page in FIG. 27, the user will be direct to the report page shown in FIG. 21. This figure is an embodiment of a link flow chart report generated by the system, which describes the percentage licensing/sales links associated with a particular intangible asset or component intangible 820. On the left hand side 821, the user can select what information is displayed on the report. It is intended to generate these reports by using an inter-application facility to extract the necessary information from the database and transfer it to a program that can graphically portray the data in flow diagrams (e.g., Visio, PowerPoint, Excel, etc.) and the links between the intangibles.

The reports generator can also generate reports that are friendly to the CEO. For example, CEO's are concerned about how to increase the levels of innovation and collaboration in their organizations. But before they increase these, they must first be able to measure them. The intangible asset management system can prepare reports with metrics on innovation and collaboration for the whole organization or for individual business units within the organization. They can determine who is really adding value to the organization and who is just writing memos and having meetings.

If a CEO selects an executive report (innovation dashboard) from the web page in FIG. 27, the search module will gather data based on the query as to innovation within the company and the user will be direct to the report page shown in FIG. 22, which is an embodiment of a typical CEO's report generated for the company by the reports module. Shown graphically in a dashboard are economic flows for the intangibles, e.g., what proportion of the value or revenue is generated from the intangible asset 830, what are the major related intangible metric 840 (e.g., innovative and collaborative index, total intangibles and intangible revenues), who are the most contributors and what are the most important ideas contributed to the company 845. The CEO can use the report to establish award programs and to link incentive compensation to the behavior that he wants to incent-innovation and collaboration.

The intangible management system and methods can also generate exit reports that the CEO, GC, Human Resources, Patent counsel, etc. can use during exit interviews when employees are leaving the company. In the reports module interface, the user selects the exit reports for the individual employee, the search module will gather data based on the query as to all the intangibles that the employee had access to and the reports module will generate an exit report, an example is shown in FIG. 23, which details the intangibles the employee created while employed. The report will have a notice for the employee to acknowledge that the intangibles are the property of the company and will provide a signature line and date for the employee to sign 850. The report will also indicate the trade secrets that the employee accessed while employed and the report will provide a notice that the employee acknowledges that they are confidential to the company and provides a signature line and date for the employee to sign 860. The exit reports can be generated for the employee to sign before receiving the compensation package. In this way, the system reduces disputes as to what was invented while employed and what is company property.

Intangible Exchange Module and Value Funds: In various embodiments, the intangible asset management system database comprises an intangible exchange module, which allows a new client to establish an account to acquire or exchange intangible assets. FIG. 26 illustrates a flow diagram showing the pathway for establishing a new client account for accessing the intangible asset management system. The new client first establishes a trust level before access to the database is granted or the trust level increased by the trusted third party. This trust level can be granted from signing CDA/NDA or other agreements to abide by certain rules. Other ways to have the appropriate trust levels to access the database include, for example, placing funds in a bond or escrow, joining a particular industrial organization (e.g., a consortium) or society, etc. The new client, depending on the trust level, will be able to search the database modules, review results, contact licensors, negotiate access terms, and clear and settle accounts using the database.

In various embodiments, the intangible exchange management system utilizes BizTalk to efficiently and effectively integrate systems, employees, and trading partners. It can be fully integrated with Microsoft Visio, and can provide a robust platform through which server-to-server communications, long transactions, and data transformation can be automated using virtually any communication protocol.

In various embodiments, the intangible asset exchange module allows the user to register the intangible asset or a solution-needed component in the centralized database. FIG. 27 illustrates an exemplary flow of the intangible exchange, where a trusted third party Global Trust Company) maintains the intangible asset exchange. Sellers (e.g., corporations, government, academia, individuals are granted access to the database and submit the intangible. The submission on the database can be information about the IP, which can have a non-proprietary description associated with it and a message digest. This information is stored on the database and a potential buyer (e.g., corporation, government) can access the database based on their trust level or sign an NDA/CDA to get access. The buyer can search the database to determine what IP they are looking to acquire or license in or out. The deals exchange can be captured on the database.

In accordance with an exemplary embodiment of the claimed invention, systems and methods for managing intangible assets to maximize their value are provided. The systems and methods provide real time intangible asset information that allows efficient ways to manage intangible assets (particularly intellectual property) to maximize their value in the market place and during the lifecycle of the intangible asset. In various embodiments, the systems and methods provided allow a company's intangible asset or intangible asset portfolio to be securitized or retained in the innovate of a trusted third party and traded among buyers to realize maximum profit for the company. In various embodiments, the systems and methods allow users to seek intangible assets that can solve a problem for the user or seek users that need solutions to which their intangible asset addresses.

The Innovation Manager system is a tool that does this in an efficient, easy and integrated manner. It is designed as an open system and can interface easily with any other applications in use whether document management, docketing, ERP or lab networks. FIG. 1 diagram below shows the main components and participants of the system and how users interact with each other in a many to many relationship with all communication controlled and monitored by the central audit and access control module 1.

The attestation trail and time stamping is essential as much of patent litigation comes down to who thought of what and when. Innovation by its nature is mutable so subsequent versions of the innovation can be stored but earlier versions are kept in the system unchanged to maintain the attestation trail. Even if the administrator elects to delete an innovation the system commits to maintaining every message digest ever generated within the system so that if the original document is produced it can be validated against the digest.

Others (one's peers, the Principal Investigator) can annotate the innovation and unlike the current situation where users hold back as users compete for the same research dollars with the system there is an audit trail of each of their contributions so if there suggestion adds significant value that is tracked in the metrics and can be reflected in their incentive compensation. In the case of the Principal Investigator users can sign the innovation just as users would an entry in the lab notebook. The system creates a timeline for each innovation in which the user can review date of the original innovation, it's witnessing and subsequent annotations or new versions.

One major feature of the Innovate Module is that there are two parts:

The Marketing Abstract that does not include highly confidential material and typically has a wider distribution reflected in a relatively open "access setting".

The Proprietary Content details proprietary information, documents and images and typically is intended for much less open distribution.

The level of access can be determined by how far up the hierarchy access is provided as illustrated in FIG. 2.

In addition the system is 21 CFR Part 11 compliant which enables pharmaceutical, food and other companies to comply with these requirements.

The system can complete an Invention Disclosure Form for the innovator using the data already entered and prompting the innovator for any further information that may be required. A feature only available to the authors of an innovation is to create a new version of the innovation (while maintaining the original which is vital in the event of a patent dispute).

A further mechanism enables a member to reach out to an innovation that users do not have access to a request further access—even while maintaining anonymity if necessary. This mechanism is described in FIG. 4.

The Innovate module: provides the functionality of the lab notebook but with the many advantages of being digital including much stronger attestation trail, ease of adding attachments and the ability to search. For those that miss the traditional lab notebook the system can print out a lab notebook for any researcher on a regular basis and bind them.

Templates: Users can also use the system for data collection in the course of research (users can even use a custom template for data gathering in large experiments). The advantage of this for organizations is that it greatly reduces the opportunity for scientific fraud (which is surprisingly a significant problem) as most of the fraud occurs after the research in the analysis of data where inconvenient data is sometimes discarded as an 'artifact'. The company will also produce a hand held interface so the data can be gathered even in difficult environments such as a biohazard lab.

Simple Email Registration of Intangibles: A further convenience that will be provided to the researcher to make it even easier to register ideas is that the system will allow an email to be sent or forwarded to a predetermined email address such as organization@iddex.com in which case the system will record it as an innovation with the subject line as the title, the message text as the Marketing Abstract and the attachments as the Proprietary Content. In the future a service will also be provided that will allow a number to be conference in and the conversation will be recorded and also registered as an innovation thus building an audit trail of each person's contribution on the call (this feature was developed as a response to an actual problem at major university in which two teams brought together by management would not communicate because participants are afraid users would not get the appropriate credit.

Electronic Suggestion Box and WhistleBlower Channel: Innovation is not confined to the laboratory so the Innovate module is designed to capture innovation wherever it occurs—the shop floor, conference room, factory or even sometimes the board room. As such it would function as, and be referred to as, a Suggestion Box. This feature can also be used as a mail box for whistleblowers as required under Sarbannes-Oxley and has the advantage that employees can submit comments anonymously and yet management could still contact them without compromising the employees confidentiality with a message such as "management is concerned, would like to learn more and will assure you there will be no reprisal".

In the License Module once the parameters have been entered the user has the option of calculating the present value of that license if users wish.

Navigation Column: In addition to the modules that manage innovation throughout its life cycle the system has additional functionality designed to assist user navigation, provide comprehensive reports and facilitate the licensing of innovation to other parties. The Navigation Column is present in every screen and enables quick access to recently viewed Innovations, Licenses, Portfolios, and Innovations Wanted. It also allows the user to open a new innovations, innovations wanted, licenses or portfolios. The last panel enables the user to flag an item (Innovation, License, Portfolio or Innovation Wanted) for the attention of someone in a particular role such as legal, finance or marketing. Items flagged in this way show at the top of relevant item list with a flag to its left. Once viewed the flag goes grey. The navigation column is illustrated on the right in FIG. 4.

Sophisticated Access Controls: This 'Innovation Paradox' represents a significant waste for the global economy and results from the concerns that owners of intellectual assets have about not wanting to lose the competitive advantage that the intellectual asset provides. Some would argue that if your competitor is paying a license fee for using your intellectual asset then it more than compensates for any competitive loss suffered.

Further graduations of these alternatives are available through the use of the 'Hierarchical Access Controls' as illustrated in FIG. 32 that shows how access for the 'Marketing Abstract' and 'Proprietary Content' components of the innovation's information can be set to just the authors of the innovation 1006, the department they work in 1007, the business unit 1008, the organization 1009, the 'trusted community' of those who have signed the standard NDA 1010 and public (anyone) 1011. In addition in FIG. 33 'Specific Include/Exclude' for both the 'Marketing Abstract' and the 'Proprietary Content' for each intellectual asset.

Another access control feature of the invention is to allow owners of intellectual assets to exclude on a specific basis certain individuals or organizations that they do not wish to have access to their innovation. This is illustrated in FIG. 33 No. 1012 that also shows the hierarchical access described above and how it works in combination with the specific include/exclude 1011 and how the hierarchical access is set in the system for the Marketing Abstract 1013 and the Proprietary Content 1014. The benefit of this is that once the IP owner is reassured that the users they are concerned about (such as competitors or ex-employees) will not have access to the intellectual asset in question then they are able to set the access levels much higher (more accessible) enabling more potential licensees, joint venture partners or investors to have access. The user can be confident that users will not see this as each new user when setting up an account is asked to confirm their identity with a government issued ID. Although fraud is still possible it has now been elevated to a serious offense. In addition each user has the opportunity to both sign an NDA that covers all activity, communication and disclosure made on the system and agreeing to the rules of the community which are designed to ensure fair and equitable practices and provides for censure or exclusion of those that are not prepared to abide by these rules.

The converse feature of this invention is that users can specify particular users who will have access who would not normally have access. This would apply for instance to an organization's IP lawyer or advertising agency for instance. However, even when the user is able to exclude certain users, there is still a reluctance to publish information on intellectual assets. Another feature of the invention overcomes this problem by allowing the owner of the intellectual assets to keep full confidentiality for their intellectual assets yet still be able to be contacted by potential licensees (or joint venture partners). This is achieved by allowing a keyword scan of the confidential material. This is illustrated in FIG. 43. The system allowing traditional Open Innovation with the 'Innovation Offered' feature 1017 and the "Innovation Wanted" feature 1018 is shown but in addition the system can allow the benefits of Open Innovation while still maintaining the confidentiality and anonymity of Closed Innovation. This is achieved through two features of the system called 'New in Interest Area' 1019 (essentially the finding of potential licensors) and 'Indications of Interest' 1020 (essentially the finding of potential licensees). The keyword scans are compared to the keyword interest profiles that each user creates when they establish their account (and can periodically update if they wish). If there is a match an entry appears for the potential licensee in their navigation bar under the 'New in your Interest Area' section 1021 but only the keyword that triggered the match is identified (if the user has access rights to the marketing abstract then they will be able to view that as well). They will not know what the intellectual asset is or who owns it. All they will know is that somewhere in the world an intellectual asset exists that may be of interest to the user. They will however have the opportunity to send a message to the owner to express an interest in the intellectual asset and request access to further information on this—in doing this the user can maintain their anonymity or waive it if they don't mind and think it may make the owner of the intellectual asset more willing to provide further information. When the owner replies they also have the opportunity to either waive or maintain the anonymity. In this way an owner of an intellectual asset, even a trade secret, is able to receive expressions of interest from potential licensees without in any way compromising their confidentiality. The owner of the innovation will see the interest from the potential licensee as an 'Indication of Interest' showing on their Navigation Bar. In this 'Indication of Interest' feature the communication has been initiated by the potential licensee. In the marketing module the same service can be initiated by the potential licensor in the feature referred to as 'Find Potential Licensees'. The owner of an intellectual asset can search the global database to find any organization or individual that has keywords in their 'interest profile' that match keywords in the owners' description of their intellectual asset (the 'Innovation'). The report generated will provide a list of potential licensees. Some of these potential licensees will be identified by name if they have waived their anonymity but in many cases the report will simply show the keywords that resulted in the match, the industry, and broad geography of the potential licensee. In this feature it is the owner of the intellectual asset that can use the link provided in this report to contact the potential licensee and again they may waive or maintain their anonymity as may the counterparty. It is anticipated that in most instances both parties will waive their anonymity and negotiate with each other openly once they are reassured that neither is a direct competitor of the other.

These features change the decision between open or closed innovation modes from a binary decision to a graduated scale ranging from:

Most Closed Innovation
Not even the keyword scan allowed
Keyword scan allowed but no access for Proprietary Content or Marketing Abstract
Marketing Abstract accessible to signatories of the standard NDA
Proprietary Content accessible to signatories of the NDA
Marketing Abstract accessible to all
Proprietary Content accessible to all
Most Open Innovation All of these options related to access controls are available not just for the intellectual assets ('Innovations') but also for 'Licenses', 'Innovations Wanted' (essentially a combination of an 'Innovation' that does not yet exist and a 'License' that has all the relevant parameters completed except for the Licensor) and an 'Innovation Offered' (essentially an 'Innovation' that does exist combined with a 'License' in which all relevant parameters are completed with the exception of the Licensee). In addition they are effective within the organization and its departments and business units as well as between organizations. An audit trail is also maintained of all access and the initial registration of any asset or subsequent version of the asset has a very strong attestation trail that includes a message digest (digital fingerprint) of all innovation related data and metadata as well as a time stamp from a calibrated and authenticated server. These features either alone or in combination are able to solve the fundamental problem of making innovation liquid and fungible which is that in hiding an innovation from potential competitors the owners effectively hide it from all potential licensees, investors and joint venture partners even though most of these are in no way competitive. Intellectual assets can be licensed much earlier in their lifecycle and the owner or inventor can license them while they are still a trade secret and not have to wait for a patent to be issued before licensing. By using the Innovation Manager system everyone wins—the potential licensee, the potential licensor, as well as potential partners and projects and of course the global economy. The following paragraphs summarize how these features of the invention are embodied in the Innovation Manager system.

Innovation Offered: An innovation may be offered for licensing at preset license terms. This is effectively an innovation with a license that has a licensor but no licensee. Some companies (including IBM) like to offer license terms and have found it increases licensee interest to eliminate the negotiation phase.

Innovation Wanted: This is a request for a solution to an innovation need. It is effectively an innovation that does not yet exist combined with a license that has a licensee but no licensor. As more and more corporations are moving towards outsourcing portions of their R&D this provides a mechanism to do so (as a 'buy side' to the exchange). The 'award' for the individual or organization that solves this need can be structured as a flat fee award or a royalty and can be exclusive or non exclusive. In fact by using by using the license module the user can structure any level of complexity in the award including geographical and industry inclusions and exclusions.

The way 'Innovation Offered' and Innovation Wanted' work together to create the beginning of an exchange. This exchange is further developed through the next two modules.

New in Area of Interest (Potential Licensor): By adding keywords and industries of interest in the member profile each member can be made aware of any new innovation that might be of interest to them even if it is confidential. It shows in the 'New in Interest Area' panel and by clicking on the link the member will see the marketing abstract (if that is available to them—if it isn't users will just have the link and the keyword that triggered the hit) and can request additional information under the NDA that is already signed.

Indication of Interest (Potential Licensee): An 'Indication of Interest' is a notification that another member of the trusted community has expressed interest in licensing one of your innovations. The member can review the request, grant access to the confidential portion and even offer licensing terms—while still maintaining anonymity if required.

Administrative Module: Every system needs to be administered and in addition to the central administration of the system each organization (or level within an organization) can enable an administrator who will have access to the Administrator Module. This module allows the designated administrator to create or close accounts of individual members (or use Active Directory or LDAP in large organizations to enable all employees) and set their access levels and roles. In addition the administrator can set default and mandatory settings for their members and in this way guide or enforce organizational policy on a wide range of issues. Users can also upload their logo so that all of their members will see the organizational logo when they log on ('White Labelling').

Legal Infrastructure: Another unique feature of the Innovation Manager system is that it has a complete legal infrastructure underpinning every activity. Some aspects such as confidentiality are binding on all members, others can be made binding at the election of the organizational administrator. This enhances the system by allowing the system to effect instructions made by individual managers such as 'transfer to IP holding company' or 'donate for tax benefit'. The legal agreements include:

- A Global the system Non Disclosure Agreement (NDA or CDA) that covers all activity on the system thus eliminating the time consuming steps of exchanging agreements and each party checking with their own counsel
- A strict Privacy Policy (while providing very strict privacy and adhering to EU safe harbor policy the system retain the right to compile aggregate statistical data that each member can use to compare their own data to an industry norm
- Rules of Membership that members may agree to that cover respect for the IP of others and appropriate behavior in the marketplace (users need to agree to this but their access could be much more restricted if users do not)
- A standard license agreement that the system encourages members to use as it automatically generates a draft license from the entered parameters and enables an econometric model to be built
- Arbitration procedures to keep litigation costs to a minimum FIG. 28 is an exemplary embodiment illustrating the intangible asset value fund, where intangible assets or portfolios of intangible assets saved in the database can be invested in by way of an investment fund. The intangible asset value fund uses an algorithm that adds the value of the intellectual assets to the book value to get the total estimated value. This total estimated value is then expressed as a ratio to the market value with a lag. Those companies with a high ratio of total estimated value to market value are bought by the fund in a long position and a short position is taken for those companies with a low ratio. When these ratios return to close to the median then the positions (either long or short are closed).

FIG. 29 is an exemplary embodiment illustrating the intangible asset fund where investors can invest in individual intangible assets or portfolios of intangible assets. Investors may, in one embodiment initially only purchase an option to buy or license the intangible assets or portfolios of intangible assets and then subsequently, possibly based on further analysis of those assets, exercise the option to complete the purchase or license.

FIG. 30 is an embodiment illustrating how the intangible asset management system can be used to create a freedom to operate (FTO) fund, where various industry participants can participate in the fund by investing in the fund which would in turn acquire rights to certain intellectual assets that the fund would deem important to that industry. The fund could agree to license these assets to the fund investors for defensive purposes. A trusted third party may also manage the FTO fund. A trusted third party may also manage the FTO fund 914. The intangible information is kept on a central database 916.

FIG. 37 illustrates a method for offering a systematic service for the securitization of a client's intangible assets. Used as a module of the Innovation Manager system enables the complex process a securitization to be much more easily accomplished thus making this facility open to a wider group of clients. Investors 1040 can invest in a fund established by a party using the Innovation Manager who can then use those funds to buy or license IP from clients 1042 of the Innovation Manager system. This IP is transferred to a special purpose vehicle 1041 (one is established as part of the innovation manager for such transactions) that then in turn licenses 1043 the IP to other clients 1044 of the Innovation Manager system or third parties. The funds are then paid into escrow (typically via a 'lock box' arrangement and used to make payments typically in the priority shown in the figure.

Clearing and Settlement Services: These services have been well developed for financial services products such as stocks and bonds but such services for intellectual assets are largely non-existent. The invention includes an integrated system, illustrated in FIG. 35 that ensures and largely automates the interaction between the seller (or licensor) 1022 and the buyer (or licensee) 1023 of the intellectual asset/s 1024 for the agreed payment 1025 via an escrow or trust service 1027. The necessary business processes would then be implemented 1028 to ensure an equitable clearing and settlement of the transaction 1029. The clearance services that the system would either provide or ensure that a third party had provided would include:

- Trade comparisons (agreement on trade terms, contract verification and adherence to any escrow agreements)
- Net Settlements where needed
- Record Keeping and Statements The settlement services that the system would either provide or ensure that a third party would provide include:

- Innovate of security certificates
- Reissue of certificate in buyers name
- Immobilization of certificates
- Dematerialization where necessary
- Transfer of Ownership by book entry
- Confirmation of Trade The tasks involved in both of these services include:

- Vet Intangible (is title clear, is it insured, has it been witnessed)
- Vet posting member (if new—if an existing member the system will need to check currency of information on record)
- Vet counterparty member
- Send certificate to issuer (or their agent) for re-issuance in buyers name
- Provide innovate for security and payment
- Ensure terms of trade are met
- Release security to purchasers and payment to seller
- Confirm transaction to all relevant parties including Clients Release Security and Funds to Buyer and Seller respectively Update license/ownership data Contribute to aggregate data for analytics If the transaction is being cleared and settled by an approved third party platform then the system will need to confirm all applicable procedures, policies and regulations are being followed.

It should be noted that many of these tasks can be processed in parallel and some can be automated allowing the system to comply with the Group of Thirty recommendations.

The Innovation Manager system in accordance with an exemplary embodiment of the claimed invention allows insurers to manage their own risks that have up to now largely kept them out of the intellectual asset insurance market place. These risks are summarized below. Broadly available patent litigation insurance would cure the crisis in the patent world as patent litigation insurance would level the playing field and allow individuals and small and medium sized companies to defend their hard won rights. The reason PLI is so rarely available is because the risks involved in insuring patent litigation are particularly challenging in several ways:

Adverse selection—The patents that seek out coverage tend to be the ones that are most likely to be involved in litigation. One way to mitigate this problem is to aggregate patents covered so that the risk is spread across many patents.

The risk factors associated with a patent change continually and rapidly. This can be due to a variety of factors including activity in the general area of the patent—if similar patents are being litigated the chances that the covered patent will be litigated increase significantly. One of the major factors is value. If a patent has a low value then it is much less likely to be litigated but as soon as its value increases so does the risk of litigation and also the size of the potential awards.

Secure Communication Channel—Although patents themselves are public documents the ancillary documents that describe its use are often not. This ancillary know-how is often kept confidential but needs to be available for the insurer as does the steady stream of new metadata related to the patent. The insurer needs to be in secure contact with the inventor, the CFO the GC and the manager of the organization that owns the patent.

Clients Best Practices—Clients usually have poor or inconsistent risk management practices which greatly increase the risks of IP litigation and adverse outcomes.

The Innovation manager system is able to resolve these issues through a combination of features that in combination make effective risk management for this asset class possible. These are summarized below:

Total Portfolio—each client must cover whole portfolio

Phased in Coverage—co-pay decreases with number of total policies

Deferred Risk Assessment—TRA only conducted if litigation is immanent

Client Best Practices—clients can significantly reduce risk by following IP best practices Secure Communication—insurer needs secure communication channel with several executives within the client organization Extensive Risk Analysis—wide geographic disparity in IP litigation risks and costs require extensive analysis Dynamic Metrics—insure needs to track ongoing metrics related to covered IP These elements work together to provide a solution that addresses the issues of both the insuree and the insurer.

Legal Infrastructure: Another unique feature of the Innovation Manager system is that it has a complete legal infrastructure underpinning every activity. Some aspects such as confidentiality are binding on all members, others can be made binding at the election of the organizational administrator. This enhances the system by allowing the system to effect instructions made by individual managers such as 'transfer to IP holding company' or 'donate for tax benefit'. The legal agreements include:

A Global the system Non Disclosure Agreement (NDA or CDA) that covers all activity on the system thus eliminating the time consuming steps of exchanging agreements and each party checking with their own counsel A strict Privacy Policy (while providing very strict privacy and adhering to EU safe harbor policy the system retain the right to compile aggregate statistical data that each member can use to compare their own data to an industry norm Rules of Membership that members may agree to that cover respect for the IP of others and appropriate behavior in the marketplace (users need to agree to this but their access could be much more restricted if users do not)

A standard license agreement that the system encourage members to use that as the systemll as being automatically generated enables an econometric model to be built Arbitration procedures to keep litigation costs to a minimum It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

The invention claimed is:

1. A network-based intellectual property asset management system for storing, managing, disseminating and sharing intellectual property asset information among users over a communications network, comprising:

a server connected to the communications network and comprising a processor;

a client processor based device to access the server over the communications network to enter, view, and edit an intellectual property information associated with a user;

a centralized database connected to the communications network to store the intellectual property information of a plurality of users;

wherein the server receives the intellectual property information from the user via the client processor based device, the processor of the server processes each intellectual property information through a hash function to provide a message digest, and the server stores the intellectual property information and the message digest in the centralized database, thereby providing a digital fingerprint and an attestation trail for each intellectual property information stored in the centralized database;

wherein the processor of the server aggregates all of the message digests to provide a system level message digest and stores the system level message digest in the centralized database, thereby providing an attestation trail for the centralized database;

wherein the server transmits the system level message digest to a third party for storage or publication to prevent tampering and to maintain integrity of the centralized database; and wherein the server issues a license to the user to combine the intellectual property information of another user with the intellectual property information of the user to generate a new intellectual property asset under terms established by the another user.

2. The system of claim 1, wherein the processor of the server processes the intellectual property information based on a category through the hash function to provide different categories of message digests and the server stores the categories of message digests in the centralized database, thereby providing the attestation trail for the different categories of intellectual property information stored in the centralized database.

3. The system of claim 2, wherein the processor of the server aggregates the categories of message digests to provide the system level message digest and the server stores the system level message digest in the centralized database, thereby providing the attestation trail for the centralized database.

4. The system of claim 1, wherein the user is an entity or organization; wherein the server organizes the intellectual property information of the entity based on an access level associated with each intellectual property information of the entity, thereby providing different level of access to the intellectual property information to different users from the same organization; and wherein the server maintains an access log information for each intellectual property information.

5. The system of claim 1, wherein the server stores the intellectual property information with a time stamp and a unique identifier in the centralized database such that the intellectual property information, the time stamp, and the identifier cannot be separated.

6. The system of claim 1, wherein the server is accessed by the user using the processor based device over the communications network to associate a confidentiality level to each intellectual property information associated with the user; and wherein the processor based server organizes the intellectual property information based on the confidentiality level and provides the intellectual property information in response to an inquiry from another user based on the confidentiality level associated with the intellectual property information.

7. The system of claim 6, wherein the server issues a license to non-confidential intellectual property information of the user to the other user under the terms established by the user.

8. The system of claim 7, wherein the license is a license to combine the intellectual property information of the user with the intellectual property information of the other user to generate a new intellectual property asset; and wherein the server maintains a context information identifying a collaborative relationship between the user and the other user.

9. The system of claim 1, wherein the server tracks a value associated with each intellectual property information; and wherein the value is an estimated value, a market value or a calculated value.

10. The system of claim 1, wherein the server facilitates purchase, sale or trading of the intellectual property information between different users.

11. A non-transitory computer readable storage medium comprising computer executable code for storing, managing, disseminating and sharing intellectual property asset information among users over a communications network, said computer executable comprising instructions for:
receiving a request to access by a server from a processor based client device over the communications network to enter, view, and edit an intellectual property information associated with a user, the server comprising a processor;
receiving by the server the intellectual property information from the user via a client processor based device over a communications network;
processing each intellectual property information through a hash function to provide a message digest by a processor of the server;
storing the intellectual property information and the message digest in a centralized database comprising the intellectual property information from a plurality of users, thereby providing a digital fingerprint and an attestation trail for each intellectual property information stored in the centralized database;
aggregating all of the message digests to provide a system level message digest by the processor of the server;
storing the system level message digest in the centralized database, thereby providing an attestation trail for the centralized database;
transmitting the system level message digest to a third party for storage or publication to prevent tampering and to maintain integrity of the centralized database; and
issuing a license to the user to combine the intellectual property information of another user with the intellectual property information of the user to generate a new intellectual property asset under terms established by the another user.

12. A computer-implemented method for storing, managing, disseminating and sharing intellectual property asset information among users over a communications network, comprising the steps of:
receiving a request to access by a server from a processor based client device over the communications network to enter, view, and edit an intellectual property information associated with a user, the server comprising a processor;
receiving by the server the intellectual property information from the user via a client processor based device over a communications network;
processing each intellectual property information through a hash function to provide a message digest by a processor of the server;
storing the intellectual property information and the message digest in a centralized database comprising the intellectual property information from a plurality of users, thereby providing a digital fingerprint and an attestation trail for each intellectual property information stored in the centralized database;
aggregating all of the message digests to provide a system level message digest by the processor of the server;
storing the system level message digest in the centralized database, thereby providing an attestation trail for the centralized database;
transmitting the system level message digest to a third party for storage or publication to prevent tampering and to maintain integrity of the centralized database; and
issuing a license to the user to combine the intellectual property information of another user with the intellectual property information of the user to generate a new intellectual property asset under terms established by the another user.

13. The method of claim 12, further comprising the steps of processing the intellectual property information based on a category through the hash function to provide different categories of message digests by the processor of the server;
storing the categories of message digests in the centralized database, thereby providing the attestation trail for the different categories of intellectual property information stored in the centralized database; and aggregating the categories of message digests to provide the system level message digest by the processor of the server.

14. The method of claim 12, wherein the user is an entity or organization; and further comprising the steps of organizing the intellectual property information of the entity based on an access level associated with each intellectual property information of the entity by the server, thereby providing different level of access to the intellectual property information to different users from the same organization; and maintaining an access log information for each intellectual property information.

15. The method of claim 12, further comprising the step of storing the intellectual property information with a time stamp and a unique identifier in the centralized database such that the intellectual property information, the time stamp, and the identifier cannot be separated.

16. The method of claim 12, further comprising the steps of:
- accessing the server by the user using the processor based device over the communications network to associate a confidentiality level to each intellectual property information associated with the user;
- organizing the intellectual property information based on the confidentiality level by the server; and
- providing the intellectual property information in response to an inquiry from another user based on the confidentiality level associated with the intellectual property information.

17. The method of claim 16, further comprising the step of issuing a license to non-confidential intellectual property information of the user to the other user by the server under the terms established by the user.

18. The method of claim 17, wherein the license is a license to combine the intellectual property information of the user with the intellectual property information of the other user to generate a new intellectual property asset; and further comprising the step of maintaining a context information identifying a collaborative relationship between the user and the other user.

19. The method of claim 12, further comprising the step of tracking a value associated with each intellectual property information by the server; and wherein the value is an estimated value, a market value or a calculated value.

20. The method of claim 12, further comprising the step of facilitating a purchase, sale or trading of the intellectual property information between different users by the server.

* * * * *